United States Patent
Nishimura et al.

(10) Patent No.: US 6,816,870 B1
(45) Date of Patent: Nov. 9, 2004

(54) INFORMATION PROCESSING METHOD AND APPARATUS FOR DISPLAYING LABELS

(75) Inventors: Takanori Nishimura, Kanagawa (JP); Takayuki Kori, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/573,904

(22) Filed: May 18, 2000

(30) Foreign Application Priority Data

May 21, 1999 (JP) .......................... P11-142519

(51) Int. Cl.⁷ .............................. G06F 17/30
(52) U.S. Cl. ................ 707/104.1; 707/103 Z; 345/760; 345/764; 345/770
(58) Field of Search .............. 707/103 R, 103, 707/103 Y, 103 Z, 104.1, 100; 345/349, 348, 760, 761, 762, 763, 764, 770; 715/501.1

(56) References Cited

U.S. PATENT DOCUMENTS

| | | | | |
|---|---|---|---|---|
| 5,877,765 A | * | 3/1999 | Dickman et al. | 345/349 |
| 5,880,730 A | * | 3/1999 | Durand | 345/348 |
| 5,890,170 A | * | 3/1999 | Sidana | 707/501 |
| 5,895,471 A | * | 4/1999 | King et al. | 707/104 |
| 6,154,771 A | * | 11/2000 | Rangan et al. | 709/217 |
| 6,192,165 B1 | * | 2/2001 | Irons | 382/306 |
| 6,233,591 B1 | * | 5/2001 | Sherman et al. | 707/501 |
| 6,237,030 B1 | * | 5/2001 | Adams et al. | 709/218 |
| 6,256,631 B1 | * | 7/2001 | Malcolm | 707/10 |
| 6,272,505 B1 | * | 8/2001 | De La Huerga | 707/501 |
| 6,278,448 B1 | * | 8/2001 | Brown et al. | 345/333 |
| 6,327,586 B1 | * | 12/2001 | Kisiel | 707/2 |
| 6,421,694 B1 | * | 7/2002 | Nawaz et al. | 707/526 |
| 6,483,500 B1 | * | 11/2002 | Choi et al. | 345/184 |

* cited by examiner

Primary Examiner—Greta Robinson
Assistant Examiner—Cheryl Lewis
(74) Attorney, Agent, or Firm—Oblon, Spivak, McClelland, Maier & Neustadt, P.C.

(57) ABSTRACT

An information processing method, apparatus, and medium, in which pre-set processing can be executed on a label bonded as a tag sheet on a desk top screen of a personal computer. It is desirable that, if a large amount of information is pasted on a label, the information that has been pasted can be recognized, whilst the information other than text, speech, or picture information can be pasted indirectly. To this end, the link information, representing an object, such as text, picture, or sound, and other files, is generated. A label in which the object information or the link information can be pasted is stored. The label state is regenerated and, based on the link information, the object and other files are acquired.

16 Claims, 73 Drawing Sheets

ROTARY ENCODER OUTPUT
RIGHT ROTATION
SIGNAL A 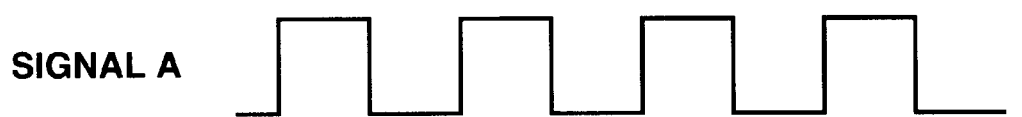
SIGNAL B 
LEFT ROTATION
SIGNAL A 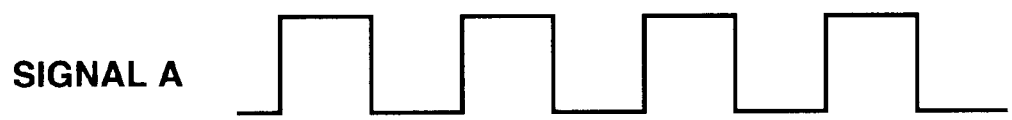
SIGNAL B 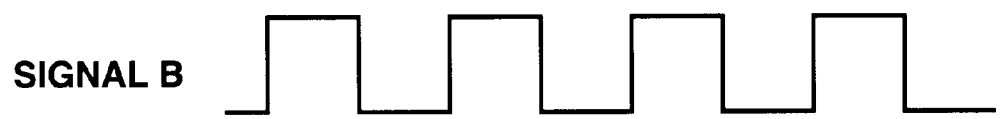
FIG.16

PROJECT PROPERTY [?] [X]

THIS LABEL CURRENTLY EXISTS-PROPAERTY OTHER
THAN START OF VALIDITY PERIOD CAN BE SET

LABEL NO.: 0      NUMBER OF TIMES OF HYSTERESIS: 7

VALIDITY PERIOD:
1999/04/01 20:09:05 — 1999/04/01 20:20:09
☑ CONTINUE

☐ PERIODICALLY REPRETED LABLES
(PERIODIC REPETITION)

-- REPEAT SET --
REPEAT:
NEXT DISPLAY START TIME:        NEXT DISPLAY END TIME:
1999/01/01 00:00:00  —  1999/12/25 00:00:00

☐ ALARM
-- ALARM SET --
○ BEFORE
○ AFTER
ALARM TIME : 1999/04/01 12:00:00

OK     CANCEL     HELP(H)

FIG.50

```
┌─────────────────────────────────────────────┐
│ DELETE FUTURE LABEL                     [X] │
│ SELECT OPERATION FROM LABEL END             │
│   TIME SETTING OR LABEL DELETION            │
│ LABEL OREPATING TIME :  1999/03/18 12:15:00 │
│ LABEL END TIME:         1999/03/18 12:15:00 │
│ (OPERATION TIME)                            │
│                                             │
│    ⊙  SET OPERATIONTIME TO END TIME         │
│    ○  DELETE LABELS COMPLETELY              │
│                                             │
│    ┌────────┐   ┌────────┐   ┌─────────┐    │
│    │   OK   │   │ CANCEL │   │ HELP(H) │    │
│    └────────┘   └────────┘   └─────────┘    │
└─────────────────────────────────────────────┘
```

FIG.61

FIG.62

INFORMATION PROCESSING METHOD AND APPARATUS FOR DISPLAYING LABELS

BACKGROUND OF THE INVENTION

1. Field of the Invention

This invention relates to an information processing method and apparatus, and a medium. More particularly, it relates to an information processing method and apparatus, and a medium in which pre-set processing can be executed on a label bonded as a tag sheet on a desk top screen of a personal computer.

2. Description of Related Art

It has hitherto been a frequent practice to attach a tag sheet as an eye-mark for paper documents, to write a memo on the tag sheet, and to paste it somewhere for use as a reminder. An application program for implementing that idea on a desktop screen of a personal computer has been proposed by the present Assignee. In actuality, a personal computer on which such an application program is pre-installed is on sale. In the following description, a tag sheet displayed on the desktop screen is called a label, and an application program for displaying a label on the desktop is called label software. In such a label, not only text, such as letters, but also speech or pictures, can be handled by exploiting the fact that the label software is an application program on a personal computer. However, a paper tag sheet cannot handle speech or pictures, including moving pictures.

FIG. 1 shows an exemplary representation of a label on the desktop screen. In this figure, not only text, such as letters, but also letters or pictures, can be pasted on the label L. Meanwhile, the label L in a lower portion of FIG. 1 shows the state in which a picture has been pasted in position. If the speech, etc. is pasted on the label L, and a playback button PB, for example, is clicked, e.g., with a mouse, the speech can be reproduced. On the other hand, if a stop button SB is clicked, such as with a mouse, the speech reproduction can be halted.

With the application program (label software) for pasting the label on the desktop, the operation of preparing, moving and deleting the label is possible. Moreover, changes in the text or pictures or speech recording can be performed on the label.

Meanwhile, it may occasionally be desirable to paste a variety of information, such as an extremely large amount of text, speech, or pictures on a label on a desktop. However, since the label that can be displayed on the desktop screen can be enlarged only to the size of the desktop screen, it is extremely difficult to display all the information on a label.

On the other hand, in conventional label software, the information that can be pasted on the label is only text, speech, and pictures, while other information cannot be pasted.

SUMMARY OF THE INVENTION

It is therefore an object of the present invention to provide an information processing method and apparatus and a medium in which the information pasted on a label can be recognized, even if a large number of the information is pasted thereon, and in which the information other than the text, speech and the picture can be pasted e.g., indirectly.

In one aspect, the present invention provides an information processing apparatus comprising: (1) link information generating means for generating the link information indirectly representing the object information and/or other information; (2) storage means for storing the information of a pre-set processing unit into which said object information and/or other information can be pasted; (3) regenerating means for regenerating the state of said pre-set processing unit; and (4) acquisition means for acquiring said object information and/or other information based on said link information.

In another aspect, the present invention provides an information processing method comprising:

a link information generating step for generating the link information indirectly representing the object information and/or other information;

a storage step for storing the information of a pre-set processing unit in which said object information and/or other information can be pasted;

a regenerating step for regenerating the state of said pre-set processing unit; and an acquisition step for acquiring said object information and/or other information based on said link information.

In yet another aspect, the present invention provides a medium for permitting an information processing apparatus to execute a program including a link information generating step for generating the link information indirectly representing the object information and/or other information;

a storage step for storing the information of a pre-set processing unit in which said object information and/or other information can be pasted;

a regenerating step for regenerating the state of said pre-set processing unit; and an acquisition step for acquiring said object information and/or other information based on said link information.

With the information processing method and apparatus and the medium according to the present invention, the link information, indirectly representing the object information and/or the other information is generated, and the information of a pre-set processing unit, in which to paste the object information and/or the link information, is stored. The state of the pre-set processing unit is regenerated and the object information and/or the other information is acquired based on the link information. By so doing, if a large number of the information is pasted on e.g., a label as a pre-set processing unit, it becomes possible to recognize which information has been pasted. In addition, the information other than the text, speech or the picture can be pasted indirectly.

BRIEF DESCRIPTION OF THE DRAWINGS

FIG. 16 is a timing chart for illustrating the operation of the rotation detection unit shown in FIG. 14.

FIG. 50 shows an exemplary display of a label property dialog.

FIG. 61 shows an exemplary display of a future label deletion diagram.

FIG. 62 shows an exemplary display of an alarm dialog in link pasting.

DESCRIPTION OF THE PREFERRED EMBODIMENTS

Figure 1:
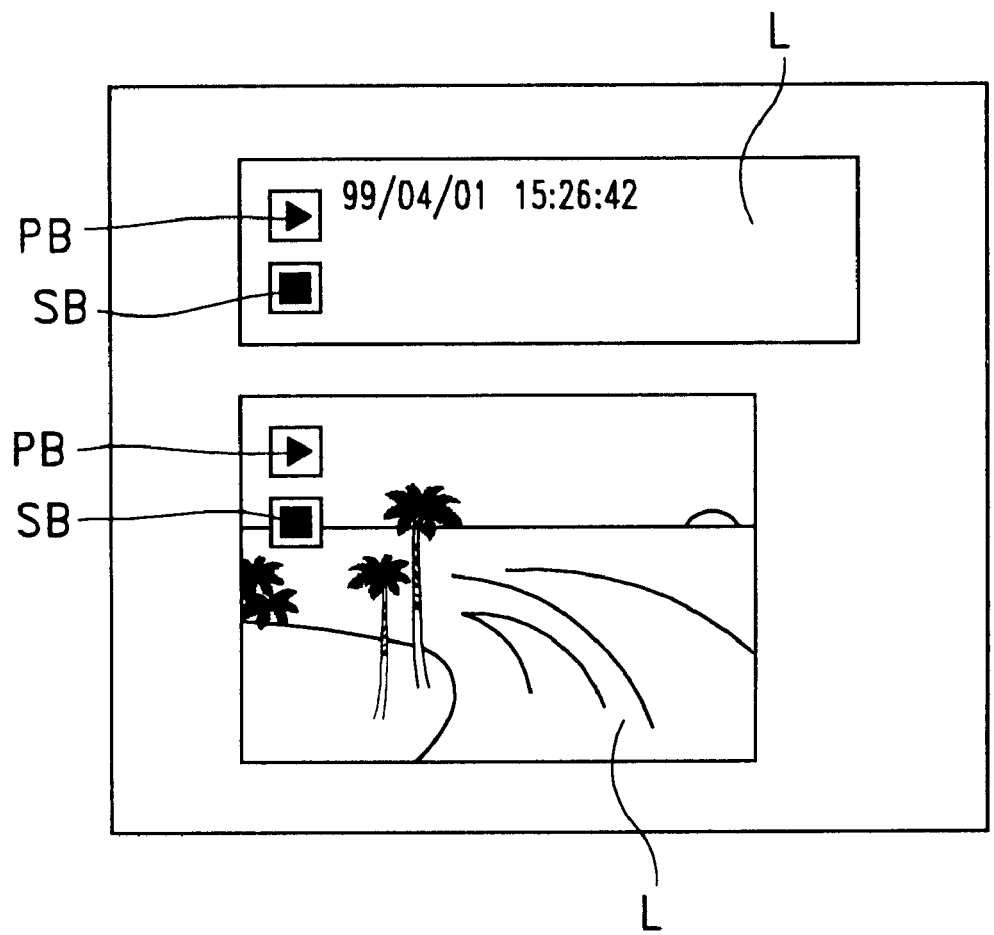
FIG. 1 shows an example of a tag sheet (label) pasted on the desktop.

Referring to the drawings, preferred embodiments of the present invention will be explained in detail.

Figure 2:
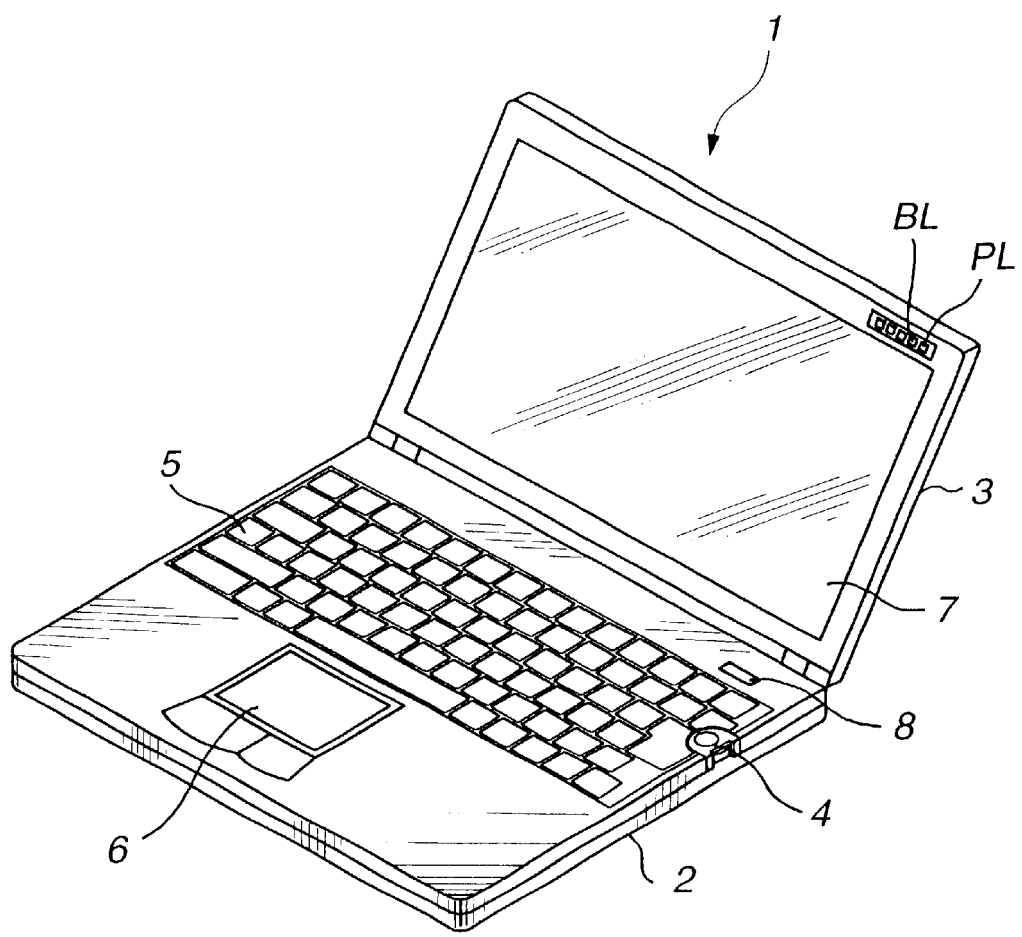
FIG. 2 is a perspective view showing a notebook type personal computer embodying the present invention.
Figure 3:
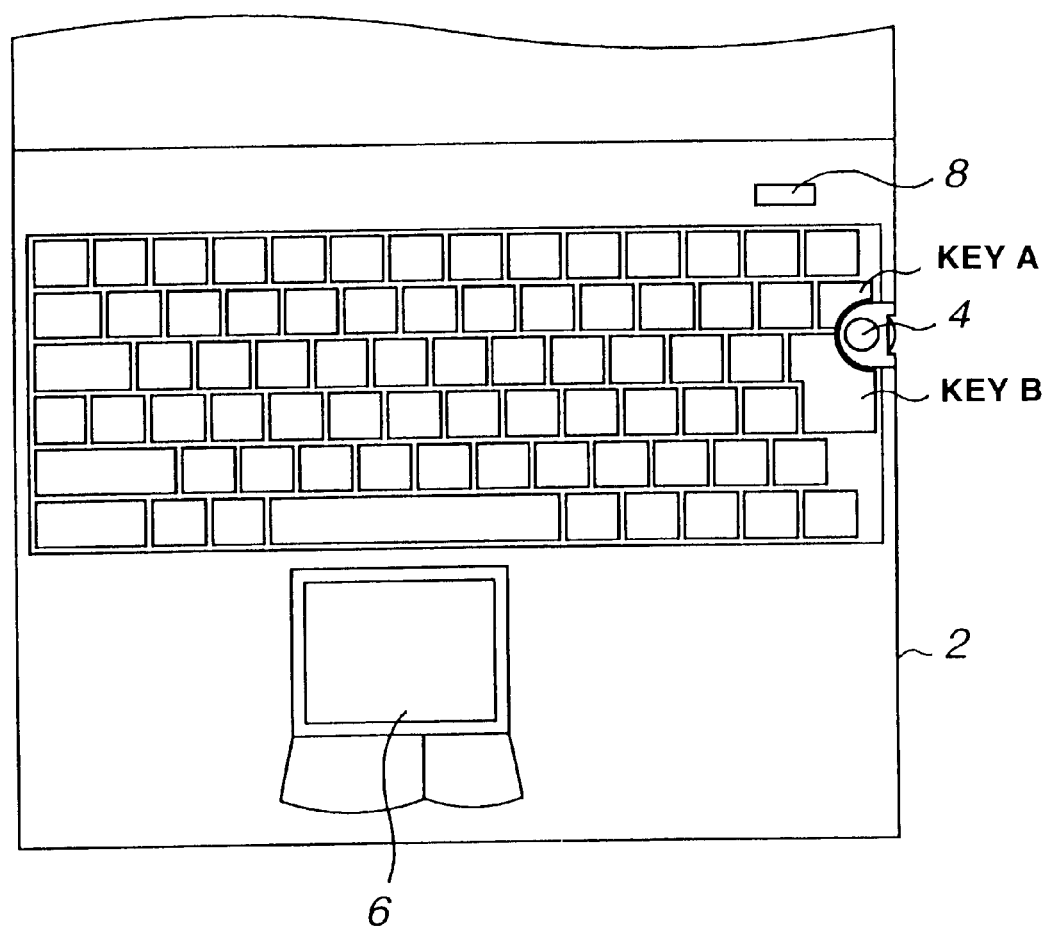
FIG. 3 is a plan view showing a main body portion of the notebook type personal computer shown in FIG. 2.
Figure 4:
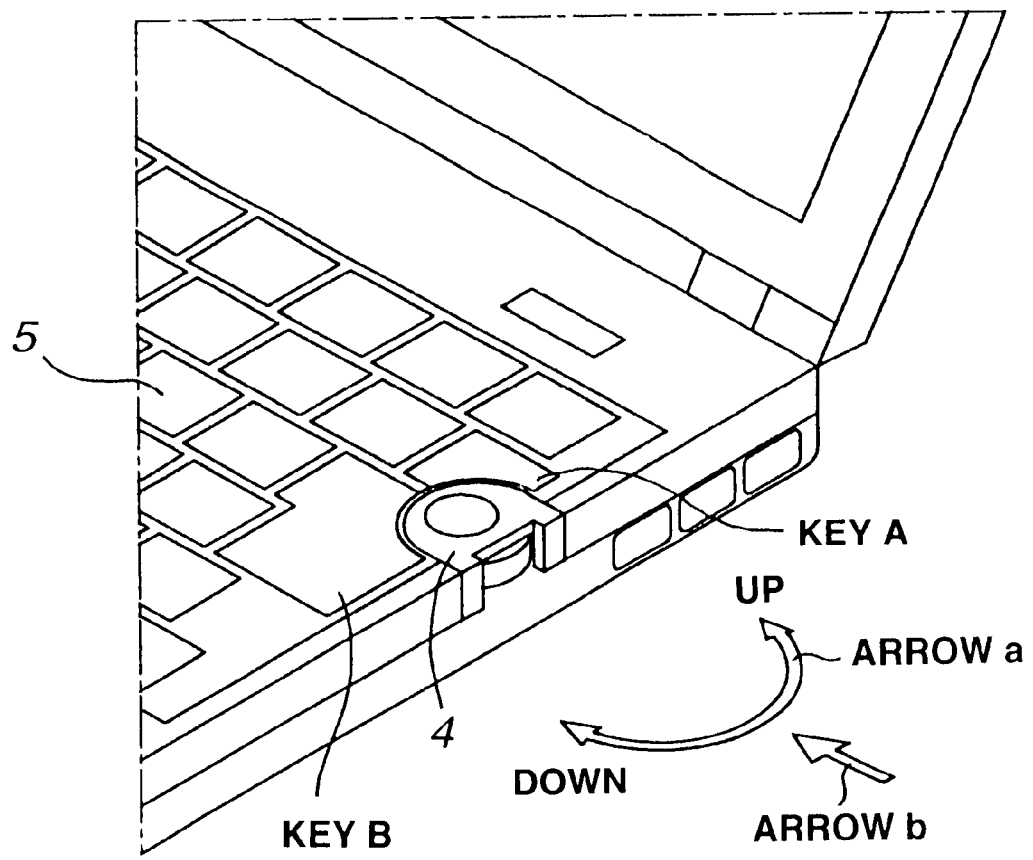
FIG. 4 is an enlarged view showing a jog dial essential to the present invention.
Figure 5:
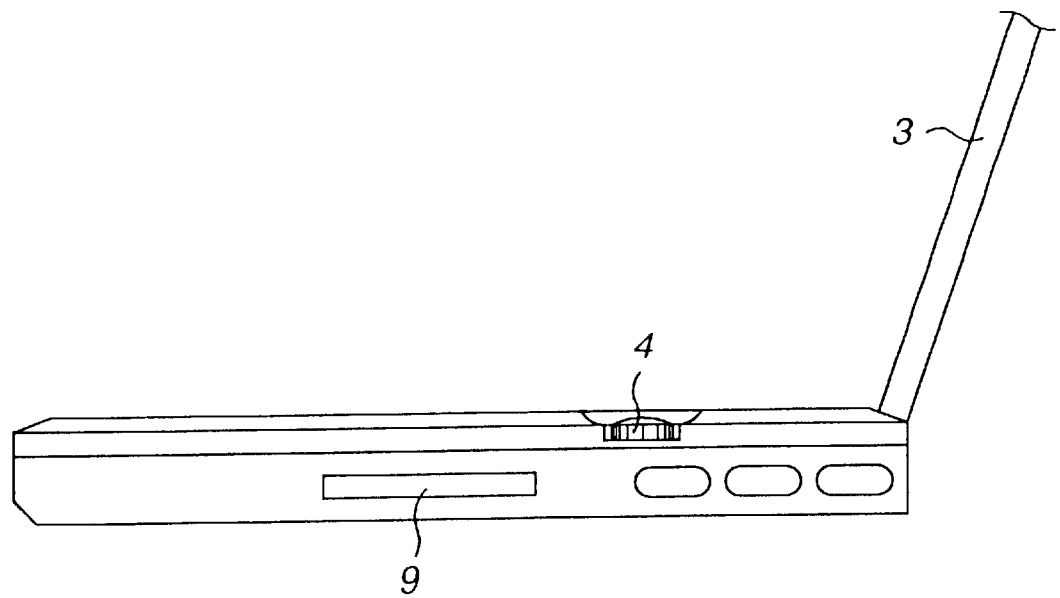
FIG. 5 is a side view of the jog dial side of the main body portion.

FIGS. 2 to 5 illustrate the appearance of a notebook personal computer 1 as an example of application of the apparatus and the method for processing the information according to the present invention. This notebook personal computer 1 is basically constituted by a main body portion 2 and a display portion 3 that can be opened/closed with respect to this main body portion 2. FIG. 2 shows the appearance of the notebook personal computer 1 with the display portion 3 being opened relative to the main body portion 2. FIG. 3 shows the plan view of the main body portion 2 and FIG. 4 shows an enlarged view the vicinity of a jog dial 4, as later explained, constituting the essential portions of the present invention. FIG. 5 is a side view of the side of the jog dial 4 of the main body portion 2.

On the upper surface of the main body portion 2, there are provided a keyboard 5, acted upon when various letters or symbols are to be inputted, a touch pad 6 as a pointing device acted upon for causing mouse cursor movement, and a power source switch 8.

On the front side of the display portion 3, there is provided an LCD (liquid crystal display) 7 for demonstrating a picture. On the right upper side of the display portion 3, there are provided a power source lamp PL, a battery lamp BL, a message lamp ML and other LED lamps.

Referring to the setting positions of the jog dial 4 in detail, the jog 4 is built in a space between keys A and B (rightmost key) on the keyboard 5 on the main body portion 2, on substantially the same level as the keys A and B.

The jog dial 4 executes pre-set processing responsive to the rotating actuation as indicated by arrow a in FIG. 4, while executing pre-set processing responsive to the movement actuation as indicated by arrow b in FIG. 4. The pre-set processing executed by the jog dial 4 will be explained subsequently.

The structure of this jog dial 4 is first explained.

The jog dial 4 includes a rotary encoding unit 12 and a push switch unit 13 on a contact mounting substrate 11. The rotary encoding unit 12 is adapted for being moved in the horizontal direction within a pre-set range, whilst the push switch unit 13 is fixed.

Figure 7:
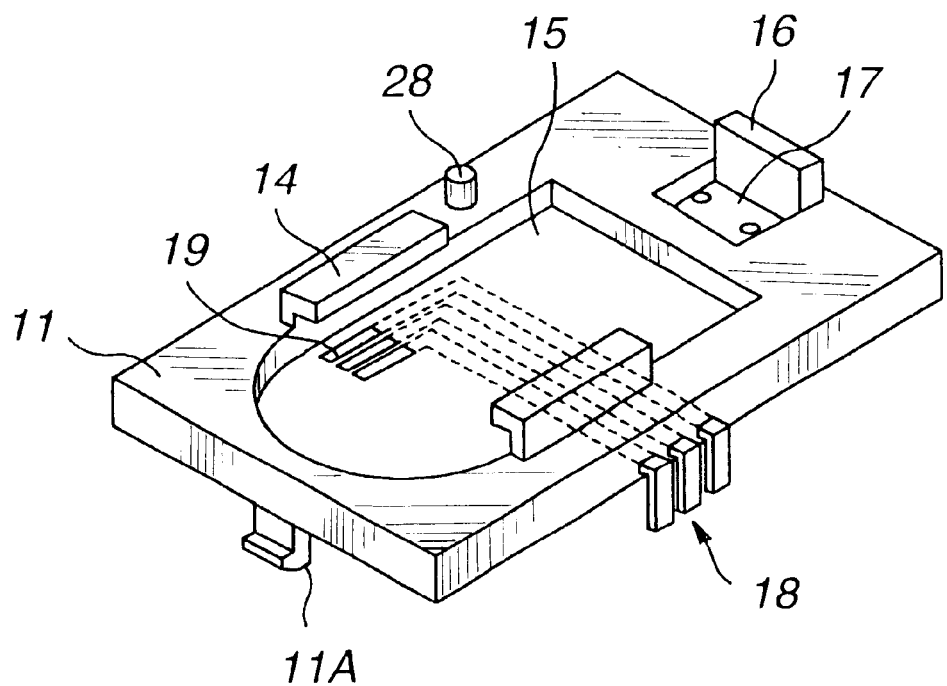
FIG. 7 is a perspective view showing a contact mounting substrate essential to the jog dial shown in FIG. 6.

Referring to FIG. 7, the contact mounting substrate 11 includes a contact plate 19 comprising a molded resin member in the form of a flat plate having recesses 15, 17 and a terminal 18. The recess 15 has a guide rail 14 for movement of the rotary encoding unit 12, while the recess 17 has a retention wall section 16 for mobilizing the push switch unit 13. The terminal 18 serves for transmitting electrical signals of the rotary encoding unit 12 to outside.

Figure 6:
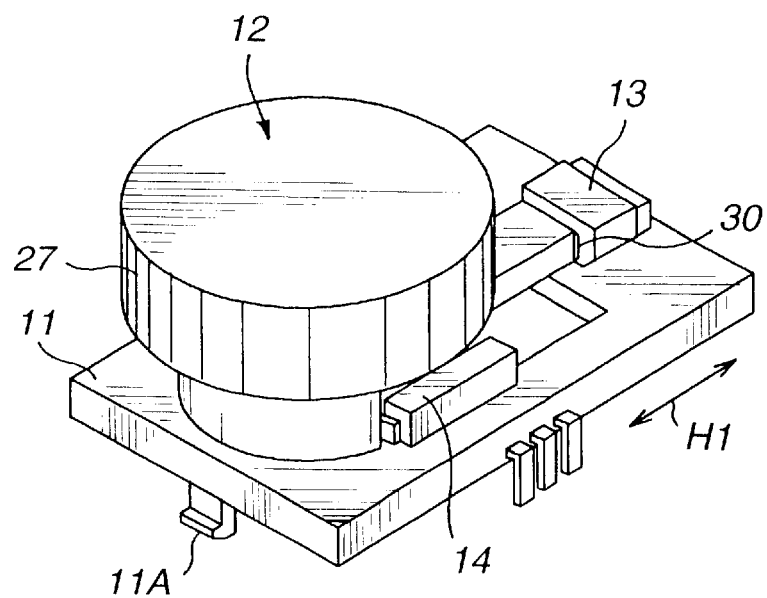
FIG. 6 is a perspective view of the jog dial.
Figure 8:
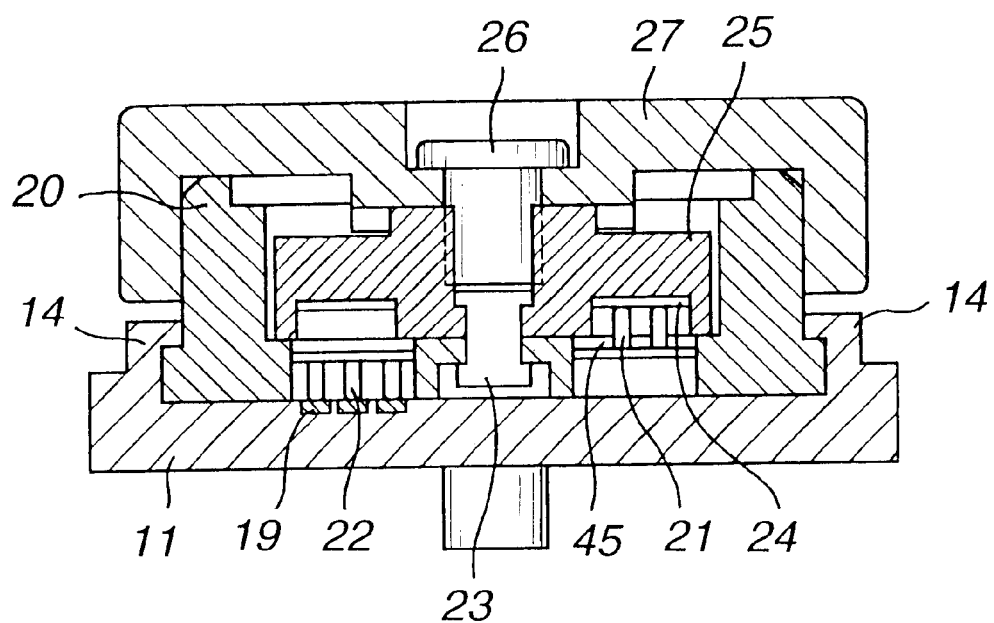
FIG. 8 is a front cross-sectional view of the jog dial.
Figure 9:
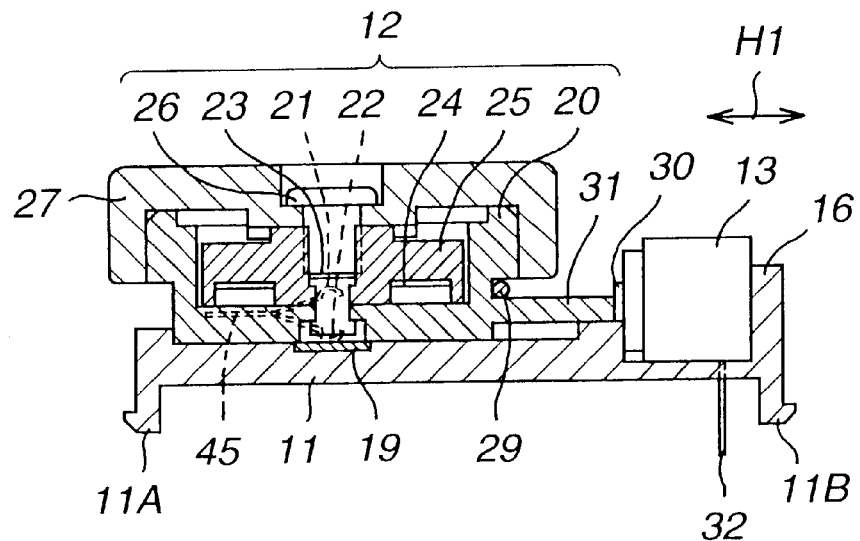
FIG. 9 is a side cross-sectional view of the jog dial.

Referring to FIGS. 8 and 9, the rotary encoding unit 12 includes a box-shaped casing 20 of molded resin fitted in the recess 15 of the contact mounting substrate 11 and retained for movement within a pre-set range in the horizontal direction as indicated by arrow H1 in FIGS. 6 and 9, and elastic contact legs 21, 22 protruded upwards and downwards from an elastic contact member 45 mounted by insert molding on the bottom surface of the box-shaped casing 20. The rotary encoding unit 12 also includes a rotary member 25 of synthetic resin retained for rotational movement by a columnar shaft 23 formed integrally with the mid portion of the box-shaped casing 20 and which includes a disc-shaped radial contact plate 24 on the lower surface of which is elastically contacted the elastic contact leg 21, and a peripheral actuating type circular knob 27 mounted by a screw 26 over the rotary member 25 for rotationally actuating the rotary member 25. With the rotary encoding unit 12, the lateral surface of the box-shaped casing 20 is pushed in the horizontal direction by a torsion coil spring 29 positioned by a pin-shaped projection 28 on the contact mounting substrate 11 (see FIGS. 7 and 11) so that the rotary encoding unit 12 is biased to a position spaced in a normal state apart from the push switch unit 13. Moreover, the elastic contact leg 22, protruded downwards from the bottom surface of the box-shaped casing 20, is in elastic contact with the contact plate 19 of the contact mounting substrate 11.

The push switch unit 13 is secured by fitting in the recess 17 in the contact mounting substrate 11 so that an actuating button 30 faces the rotary encoding unit 12, with the rear end of the button compressing against the retention wall section 16. 19, as shown in FIGS. 6 and 7.

A driving projection 31 formed integrally with the box-shaped casing 20 of the rotary encoding unit 12 compresses against the distal end of the actuating button 30 of the push switch unit 13, as shown in FIG. 9. The foregoing is the structure of the jog dial. When the jog dial is to be mounted on an electronic equipment, legs 11A, 11B on the lower surface of the contact mounting substrate 11, the connection terminal 18 of the rotary encoding unit 12 and a connection terminal 32 of the push switch unit 13 are introduced and soldered in mounting openings 33A, 34B, 35 and 36 of a printed circuit board 33 of the electronic equipment, with the jog dial being mounted in position with the end of the peripheral actuating knob 27 of the rotary encoding unit 12 opposite to the push switch unit 13 protruding from a gap of an exterior casing 37 of the electronic equipment.

Figure 10:
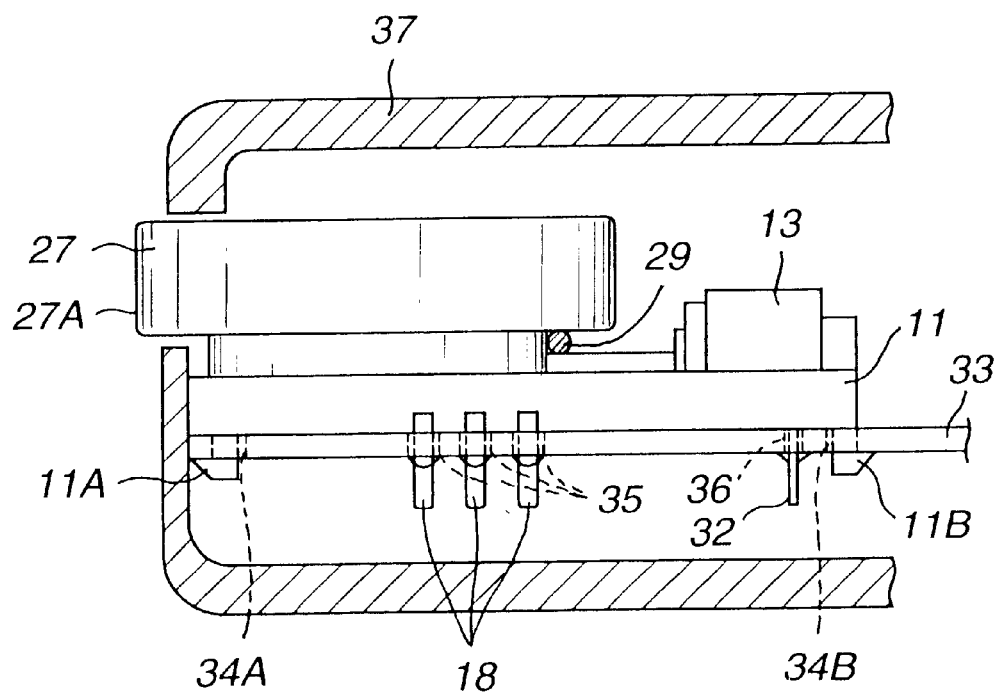
FIG. 10 is a side view of an equipment for illustrating the mounting state of the jog dial thereon.
Figure 11:
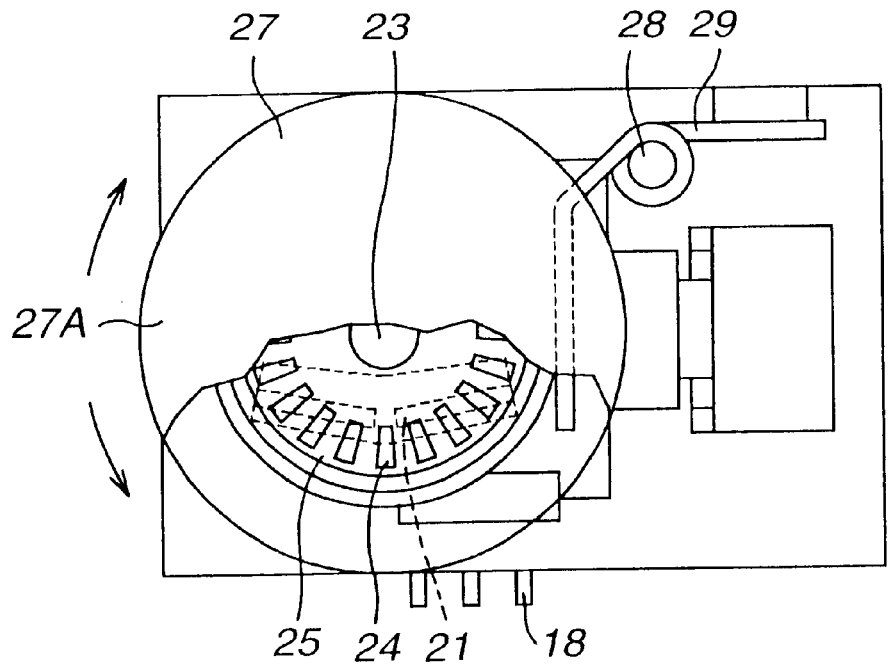
FIG. 11 is a top plan view showing a rotary encoder constituting the jog dial.

The operation of the jog dial is explained. Referring first to FIGS. 10 and 11, a protruding portion 27A from the exterior casing 37 of the peripheral actuating knob 27 mounted on the upper end of the rotary encoding unit 12 is acted upon by a tangential force so as to perform a rotational movement, whereby the rotary member 25 is rotated about the center columnar shaft 23 of the box-shaped casing 20 as the center of rotation. The upper elastic contact leg 21 then slides in elastic contact with the radial contact plate 24 provided on its lower surface. This sliding contact portion generates pulse signals timed to the rotational actuation of the peripheral actuating knob 27.

The generated pulse signals are transmitted from the upper elastic contact leg 21 to the lower elastic contact leg 22 and thence to the contact plate 19 on the contact mounting substrate 11 to which is elastically contacted the elastic contact leg 22. The pulse signals are then transmitted to the circuit of the printed circuit board 33 of the electronic equipment through the terminal 18 for external connection.

Figure 12:
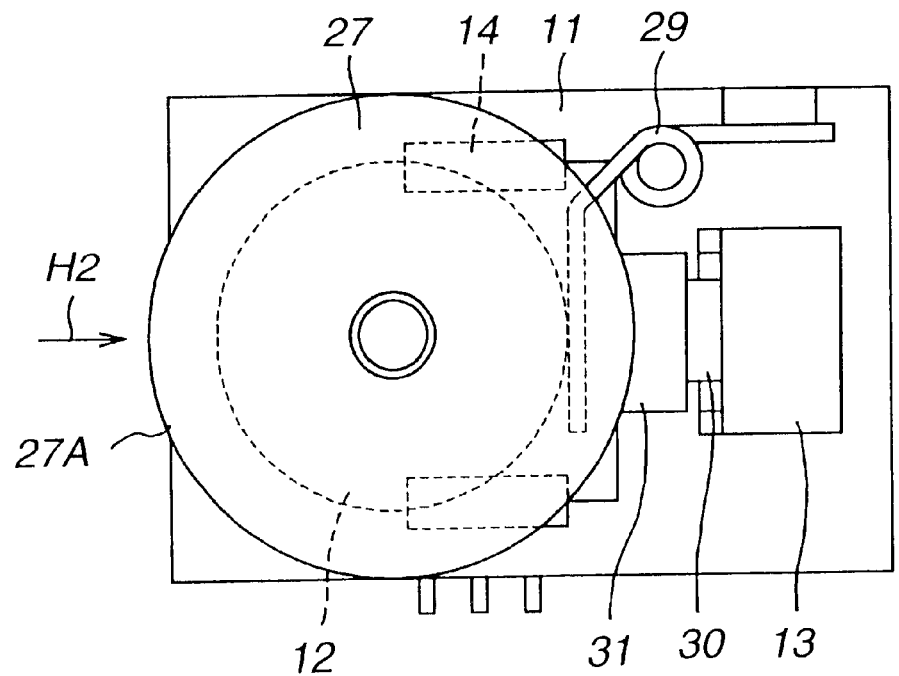
FIG. 12 is a top plan view showing push switch portion of the jog dial.
Figure 13:
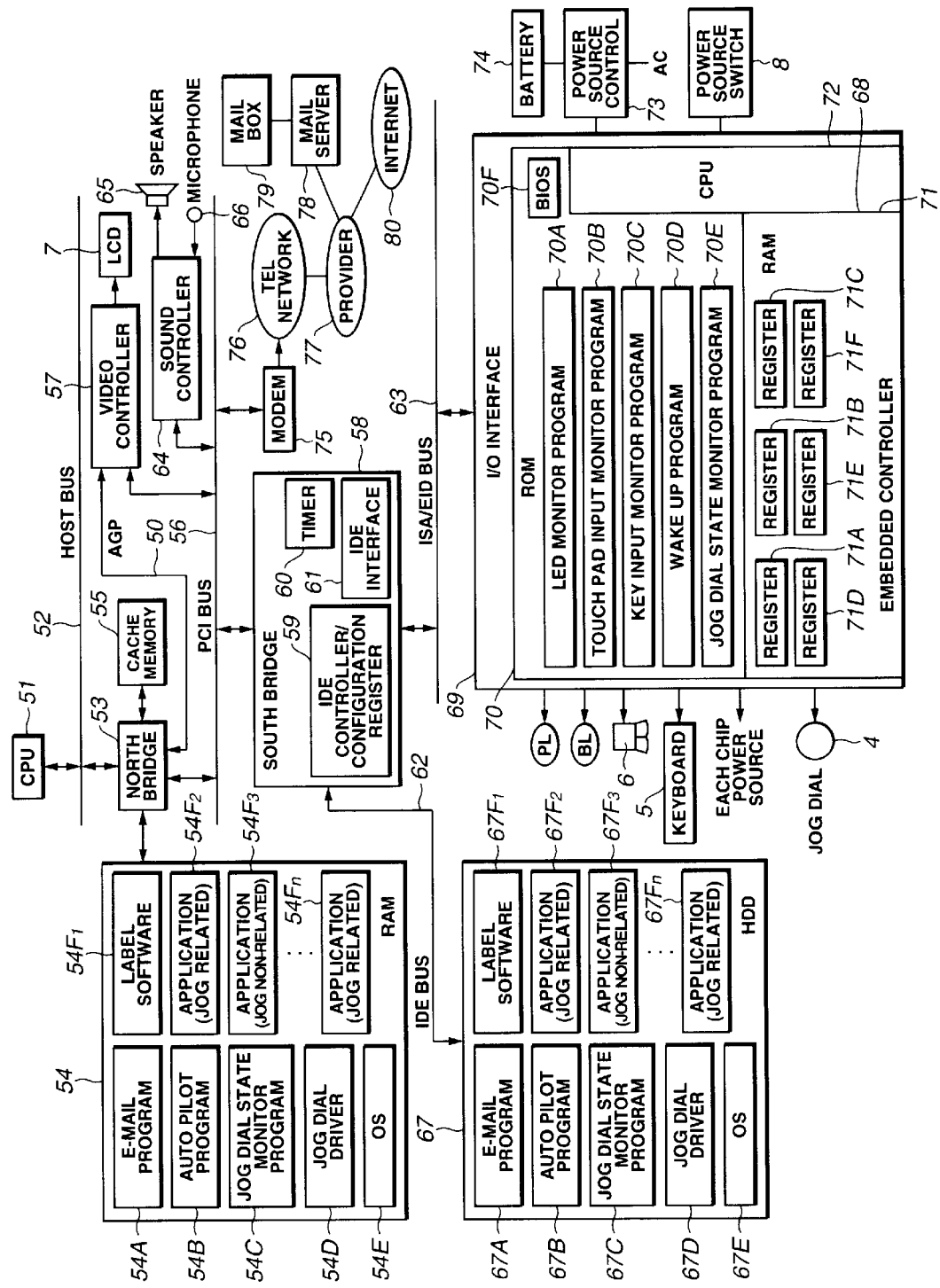
FIG. 13 is an electrical circuit diagram of the notebook type personal computer shown in perspective in FIG. 2.

The protruding portion 27A of the peripheral actuating knob 27 then is acted upon with a thrusting force in the horizontal direction interconnecting the center of the knob and the push switch unit 13, as indicated by arrow H2, against the biasing force of the torsion coil spring 29 provided on the contact mounting substrate 11, as shown in FIG. 12, to cause movement of the entire rotary encoding unit 12 in the horizontal direction along the guide rail unit 14 of the contact mounting substrate 11 to push the actuating button 30 with the projection 31 provided on the box-shaped casing 20. The resulting signal is transmitted to the circuitry of the printed circuit board 33 of the electronic equipment through a connection terminal 21 shown in FIG. 10.

If the thrusting force applied to the peripheral actuating knob 27 is removed, the rotary encoding unit 12 is pushed back under the elastic recoiling force of the torsion coil spring 29 of the contact mounting substrate 11 to resume the state shown in FIG. 11.

In the above-described structure, the elastic contact leg 22, protruded downwards from the bottom surface of the box-shaped casing 20 of the rotary encoding unit 12, elastically contacts the contact plate 19 of the contact mounting substrate 11, as means for transmitting the electrical signals of the rotary encoding unit 12 to the contact plate 18 of the contact mounting substrate 11. Alternatively, the elastic contact leg may be protruded from the contact mounting substrate 11 so as to be elastically contacted with the contact plate on the bottom surface of the box-shaped casing 20. The foregoing is the explanation of the structure and the operation of the jog dial 4 provided on the right lateral surface of the main body portion 2.

Of course, the jog dial 4 may be provided on the left lateral surface of the main body portion 2. The jog dial 4 may also be arranged centrally of the front surface of the main body portion 2 so that the jog dial 4 can be actuated with a thumb finger as the touch pad 6 is actuated with the index finger. The jog dial may also be arranged on the left or right surface of the display portion 3 carrying the LCD 7, or along the left or right edge of the touch pad 6. The jog dial may also be arranged longitudinally between left and right buttons or longitudinally between G and H keys of the keyboard unit 5. The jog dial may also be arranged in an angled direction to permit facilitated actuation with respective fingers without distinction as to longitudinal or transverse directions. The jog dial 4 may also be arranged at a position permitting actuation with a thumb finger on a lateral surface of the mouse as the pointing device. An exemplary electrical structure of the notebook personal computer 1 is explained with reference to FIG. 2. a central processing unit (CPU) 11 comprises e.g., Pentium (trademark) of INTEL INC., and is connected to a host bus 52. To the host bus 52 is connected a north bridge 53 which in turn is connected to a PCI bus 56. The north bridge 53 comprises e.g., 400BX manufactured by INTEL. INC., and is adapted for controlling the CPU 51 or the main memory 54 with its periphery. The north bridge 53 and the south bridge 58, as later explained, constitute a so-called chip set.

The north bridge 53 also is connected to a main memory 54 and to a cache memory 55 adapted for caching data used by the CPU 51. Although not shown, a first-order cache memory is enclosed in the CPU 51.

The main memory 54 comprises e.g., a DRAM (dynamic read-only memory) adapted for storing the programs executed by the CPU 51 or data necessary for the operation by the CPU 51. Specifically, at the time point of end of startup, an E-mail program 54A, an auto-pilot program 54B, a jog dial state monitor program 54C, a jog dial driver 54D, an operating program (OS) 54E and other application programs 54F1 to 54Fn are transferred from an HDD 70 for storage in the main memory 54.

The E-mail program 54A is a program for exchanging communication text over the network with communication networks, such as telephone network 76, over a modem 75, which will be explained subsequently. The E-mail program 54A also has the function of acquiring oncoming mails as a specified function. This oncoming mail acquiring function inquires whether or not a mail addressed to the user has arrived at the mail box 79 to a mail server 78 of a provider 77 and acquired a mail addressed to the user, if any.

The auto-pilot program 54B sequentially starts pre-set plural processing operations or programs to perform the processing.

The OS (basic program software) 541E, typified by the Windows 95 or Windows 98 (trademarks) by MICROSOFT INC. or MAC OS (trademark) by APPLE COMPUTER INC., controls the basic operations of the computers.

The jog dial state monitor program 54C receives the notice from the respective application as to whether or not the applications are adapted for coping with the jog dial. If the notice is affirmative, the jog dial state monitor program 54C operates to demonstrate what can be done by actuating the jog dial 4. The jog dial state monitor program 54C is usually in a state of awaiting an event of the jog dial 4 and owns a list for receiving notices from the application. The jog dial state monitor program 54C is responsive to the actuation of the jog dial state monitor program 54C to execute various functions.

A video controller 57 is connected to a PCI bus 56 and is adapted for controlling the display on the LCD 7 on the display portion 3.

To the PCI bus 56 is connected a sound controller 64 adapted for capturing an input from a microphone 66 or supplying audio signals to a speaker 65. To the PCI bus 56 is also connected a modem 75 which can be connected over a public telephone network 76 or an Internet service provider 77 to a communication network 80, such as Internet, or to a mail server 78.

To the PCI bus 56 is also connected the south bridge 58 comprising e.g., PIIX4E of INTEL INC. and which is adapted for controlling various I/O (input/output). That is, the south bridge 58 comprises an IDE (Integrated Drive Electronics) controller/configuration register 59, timer circuit 60 and an IDE interface 61, and is adapted for controlling a device connected to the IDE bus 62 or a device connected via an IS A/EIO (Industry Standard Architecture/Extended Input Output) bus 63 or an embedded controller 68.

The IDE controller/configuration register 59 is made up of two IDE controllers, namely a so-called primary IDE controller and a secondary IDE controller, and a configuration register. These IDE controllers are not shown for simplicity of the drawings.

The primary IDE controller is connected over the IDE bus 62 to a connector, not shown. An HDD 67 is connected to the connector. When bay devices, as so-called IDE devices, such as CD-ROM drive, second HDD or FDD, not shown, are loaded over other IDE buses, the secondary IDE controller is electrically connected to connectors of the loaded bay devices.

Meanwhile, the HDD 67 has stored therein plural application programs 67F1 to 67Fn, in addition to the auto-pilot program 67B, auto-pilot program 54B, jog dial state monitor program 54C, jog dial driver 54D and the OS (basic program software) 67E. The above-mentioned respective programs 67A, 67B, 67C, 67D, 67E and 67F1 to Fn in the HDD 67 are sequentially transferred to the RAM 54 for storage therein during the startup (bootstrap) process.

To the ISA/EIO bus 63 is also connected an embedded controller 68 which comprises a micro-controller and which is used as an I/O controller. That is, the embedded controller 68 is constructed by an interconnection of an I/O interface 69, a ROM 70, a RAM 71 and a CPU 72.

In the ROM 70, there are stored from the outset a LED control program 70A, a touchpad input monitor program 70B, a key input monitor program 70C, a wakeup program 70D and a jog dial state monitor program 70E.

The LED control program 70A is a program for controlling the lighting of a lamp, such as a power source lamp PL, a battery lamp BL, a message lamp ML, if necessary, or other LEDs. The touchpad input monitor program 70B is a program for monitoring the user input from the touch pad 6. The key input monitor program 70C is a program for monitoring the input from the keyboard 5 or other key switches. The wakeup program 70D is a program for checking, based on current time data supplied from a timer circuit 60 within the south bridge 58, whether or not the time is the pre-set time and, should the time be the pre-set time, various chip power sources are managed for starting pre-set processing operations or programs.

The jog dial state monitor program 70E is a program for perpetually monitoring whether the rotary encoding unit 12 of the jog dial 4 has been rotated or pressed. The jog dial state monitor program 70E will be explained in detail subsequently.

In the ROM 70 is further written BIOS (basic input/output system) 70F. The BIOS is a basic input/output system, that is a software program controlling data exchange (input/output) between the OS or the application software and peripherals, such as display, keyboard or HDD.

The RAM 71 includes registers for a touchpad input status, a key input status and for time setting, and a jog dial status monitor I/O register, as registers 71A to 71F. For example, an LED control register 71A controls the lighting of a message lamp ML displaying the instantaneous rising state of the E-mail on thrusting the jog dial 4 as explained later. The key input status register 71C stores an actuating key flag when the jog dial 4 is pushed for one-touch operation as later explained. The time setting register 71D is able to set optional time.

To the embedded controller 68 are connected the jog dial 4, touch pad 6 and the keyboard 5 through a connector, not shown, to output signals associated with the operations of the jog dial 4, touch pad 6 and the keyboard 4 to the ISA/EIO bus 63. To the embedded controller 68 are also connected the power source lamp PL, battery lamp BL, message lamp ML and other LED lamps.

To the embedded controller 68 is also connected a power source control circuit 73 in turn connected to an enclosed battery 74 or an AC power source. The power source control circuit 73 furnishes the necessary power to each block, while managing control to charge secondary batteries of the peripherals. The embedded controller 68 also monitors a power source switch 8 operated on turning the power source on or off The embedded controller 68 is able to execute the above-mentioned programs 70A to 70E by an internal power source at all times even when the power source 8 is turned off. That is, the above-mentioned programs are running at all times even if no windows are opened on the LCD 7 of the display portion 3. That is, the embedded controller 68 executes the jog dial state monitor program 70E at all times even when the power source switch 8 is off or the OS54 is not started on the CPU 51. In particular, the embedded controller 68 furnishes the function of a programable power key (PPK) to the notebook personal computer 1 even if the computer is not provided with a dedicated key, such that the desired software or the script file can be started simply when the user pushes the jog dial 4 in the power saving mode or in a power down state.

Figure 14:
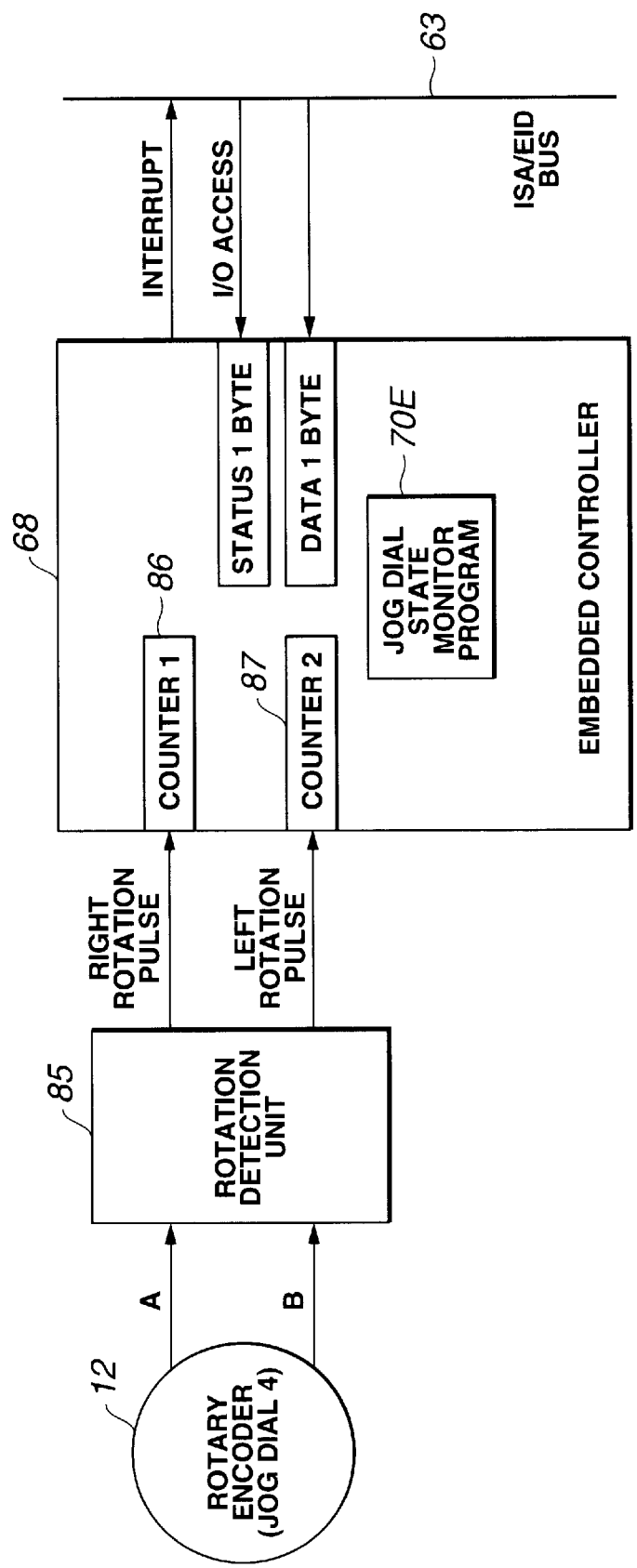
FIG. 14 shows a hardware structure in which an embedded controller is monitoring the state of the rotary encoder portion of the jog dial through a rotation detection unit.
Figure 15:
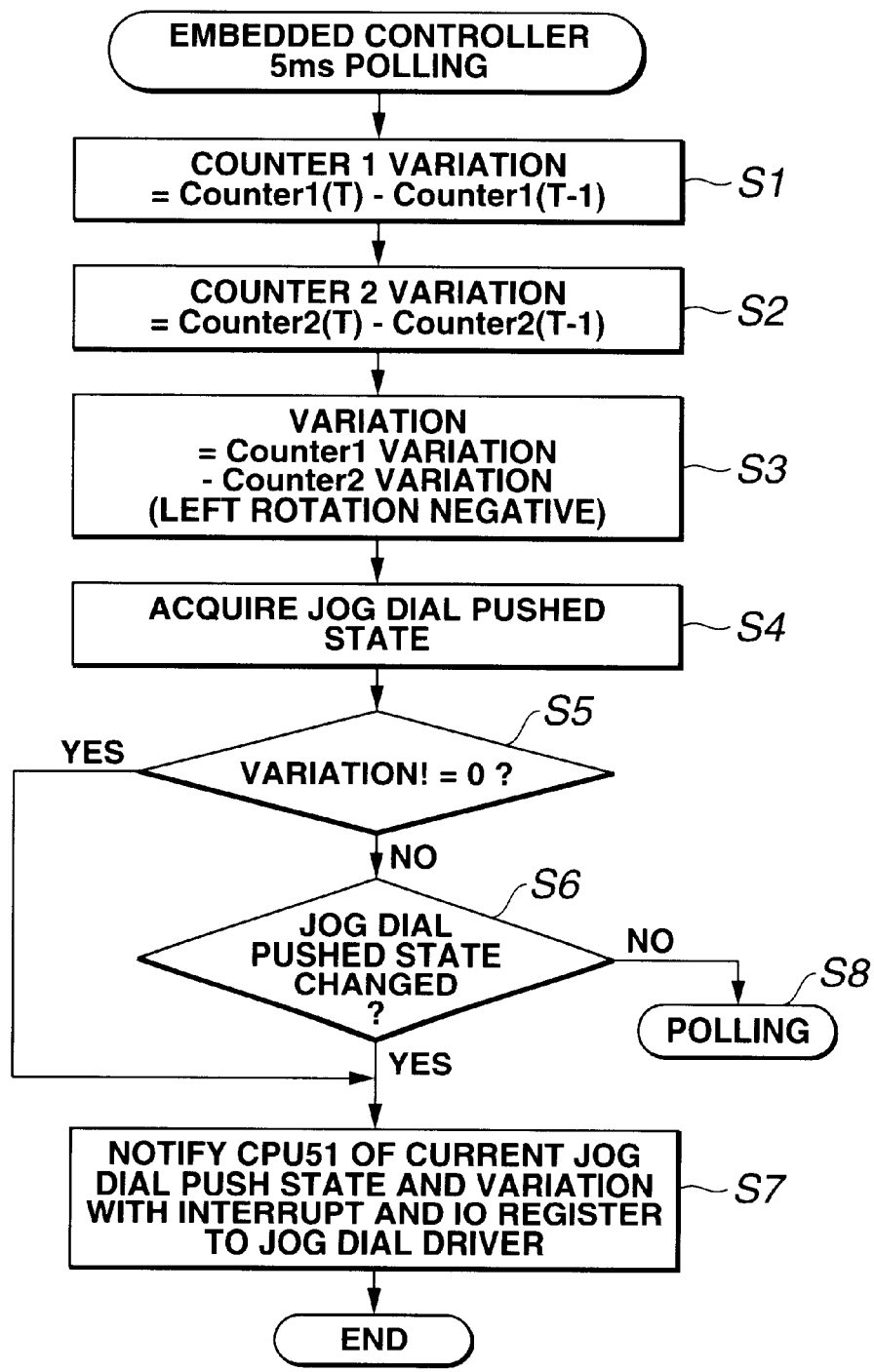
FIG. 15 is a flowchart showing the state in which the embedded controller has executed the jog dial state monitor program.

Referring to FIGS. 14 to 16, the operation of the e48 on execution of the jog dial state monitor program 70E is explained. FIG. 14 shows the hardware configuration for monitoring of the state of the rotary encoding unit 12 of the jog dial 4 by the embedded controller 68 through a rotation sensor 85. FIG. 15 shows a flowchart for illustrating the execution of the jog dial state monitor program 70E by the embedded controller 68. FIG. 16 shows a timing chart for illustrating the operation of the rotation sensor 85 shown in FIG. 14.

When the rotary encoding unit 12 of the jog dial 4 is rotated towards left or right, the rotation sensor 85 detects whether the rotation of the rotary encoding unit 12 is the leftward rotation or the rightward rotation, based on the timing of the signals A and B shown in FIG. 16. If the rotation of the rotary encoding unit 12 is detected to be the rightward rotation, the rotation sensor 85 sends a rightward rotation pulse to a counter (1) 86 of the embedded controller 68. Conversely, should the rotation of the rotary encoding unit 12 be detected to be the leftward rotation, the rotation sensor 85 sends a leftward rotation pulse to a counter (2) 87 of the embedded controller 68.

The embedded controller 68 executes the jog dial state monitor program 70E to monitor the variation of the counter (1) 86 and the counter (2) 87, difference therebetween and whether or not the jog dial 4 has been pushed, by polling at intervals of 5 ms.

First, at step S1 in FIG. 15, the count value counter 1(T-1) at time T-1 is subtracted from the count value Counter 1 (T) at current time T of the rightward rotation pulse to find the variation Counter 1 of the count value of a counter 87.

Then, at step S2, the count value Counter 1(T-1) at time T-1 is subtracted from the count value Counter 1 (T) at current time T of the leftward rotation pulse to find the variation Counter 2 of the count value of a counter 87.

At step S3, the difference between the variations of the count values, that is the difference between the variation Counter 1 and the variation Counter 2, is found. If this difference between the variations is negative, the rotation is leftward.

On the other hand, the pressed state of the jog dial 4 is acquired at step S4. At step S5, the variations as found at step S3 are checked. At step S6, it is checked whether or not the pressed state of the jog dial 4 has been changed. If it is verified that the variation is detected at step S5, or that the pressed state has been changed at step S6, the current pressed state of the jog dial 4 and the variation are notified by interrupt through an I/O register 71F to the jog dial driver 54D, started by the CPU 51.

If there is no change at step S6 in the pressed state of the jog dial 4, the program moves to step S8, where the polling is terminated and the processing as from step S1 is repeated after lapse of 5 ms.

Figure 17:
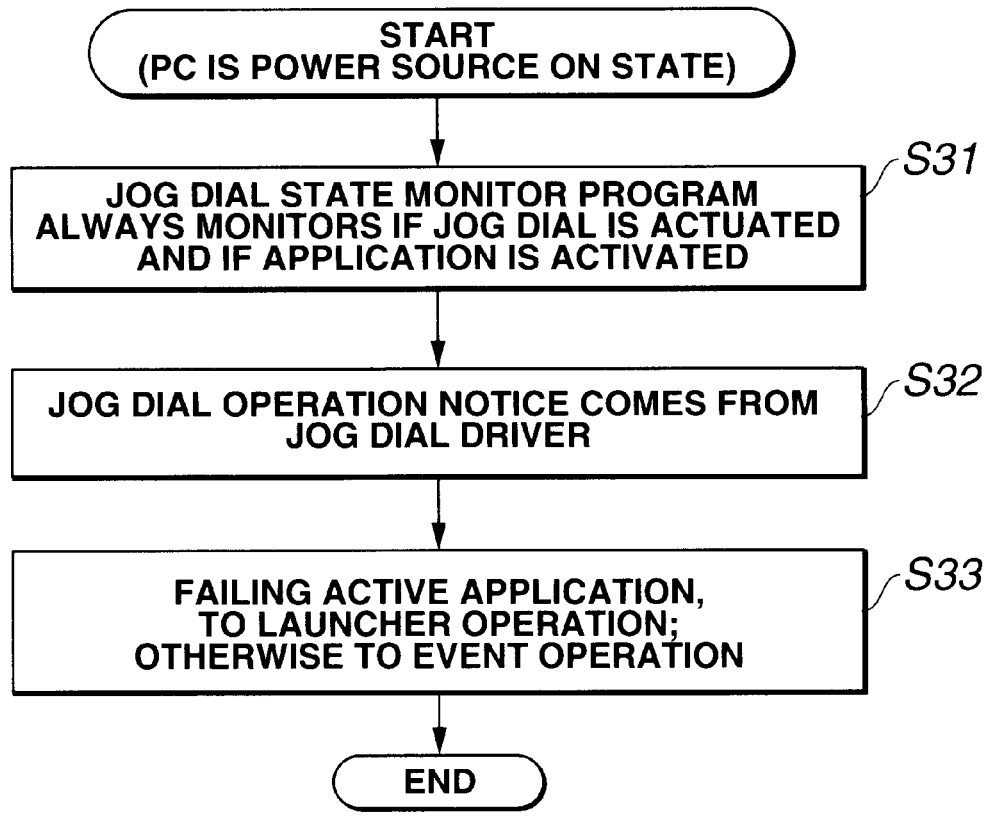
FIG. 17 is a flowchart for illustrating the jog dial state monitor program executed by CPU of the notebook type personal computer after turning on of a power source switch.

After the power source switch 8 is turned on, the CPU 51 executes the jog dial state monitor program 54C in accordance with the procedure shown in FIG. 17.

That is, at step S31, it is perpetually monitored whether or not the jog dial 4 has been acted upon. It is also monitored whether or not the E-mail program 54A or other applications 54F1 to 54Fn have been activated. Here, the state of the jog dial 4 is monitored to monitor the processing from the jog dial state monitor program 70E on the side of the CPU 51 through the jog dial driver 54D, with the operation being substantially the same as the operation explained with reference to FIG. 14.

If a notice on the operation of the jog dial 4 is sent at step S32 from the jog dial driver 54D, the program moves to step S33 where it is verified whether or not there is any active application. If there is no active application, the program proceeds to the launcher operation and, if otherwise, to an event operation. The launcher operation means the operation of selecting the registered application.

The launcher operation is explained briefly. This launcher operation is valid on the condition that there is currently no active application, as described above. In the jog dial menu are displayed applications previously registered in the launcher list. In the launcher list, there are registered application associated with the jog dial.

When the launcher operation is executed, the jog dial menu indicating the launcher state is demonstrated on the LCD 7. In the jog dial menu, there is displayed and started a list of applications associated with the jog dial.

Assume that, when the pre-set OS54E has been started by the CPU 51, there is no activated application, and the user has pressed the jog dial 4 once in the direction indicated by arrow b in FIG. 4. The pushed state of the jog dial 4 then is received by the jog dial driver 54D by the forwarding of the flag state through the I/O register by interrupt, as explained with reference to FIGS. 14 to 16. So, the jog dial driver 54D routes an actuation notice to the jog dial state monitor program 54C similarly executed by the CPU 51.

Figure 18:
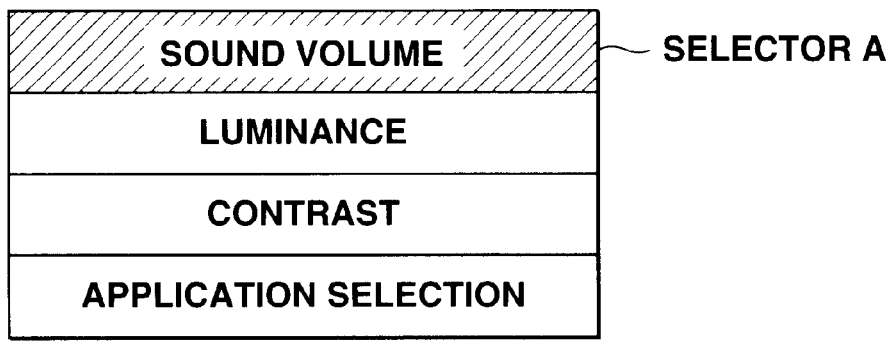
FIG. 18 illustrates an exemplary display of jog dial menu.

The CPU 51 then starts the application program pre-registered in the launcher list in association with the jog dial for adjusting the volume of the speaker 65, luminance of the LCD 7 and its contrast and selecting the application, so that a jog dial menu shown in FIG. 18 is demonstrated on the LCD 7 of the display portion 3 shown in FIG. 2. In this jog dial menu, there re displayed menu items "sound volume", "luminance", "contrast" and "selection of the application", associated with the processing operations of the sound volume adjustment, adjustment of luminance on the display portion, contrast adjustment and the selection of the application. In this example, the selector A is displayed as the initial state on the menu item "sound volume".

When the user then scrolls, that is rotates, the jog dial 4 in the direction indicated by arrow a in FIG. 4, for causing the movement of the selector A, the embedded controller 68 executes the calculations, explained with reference to FIG. 15, in accordance with the jog dial state monitor program 70E, and notifies the calculated variation to the jog dial driver 54D executed on the CPU 51.

The jog dial driver 54D then routes an actuation notice to the jog dial state monitor program 54C so that the CPU 51 causes the selector A to be shifted to a menu item desired to be executed by the user. If, when the jog dial menu of FIG. 17 is displayed on the LCD 7, that is when the selector A is demonstrated on the "sound volume", the user rotates, that is scrolls, the jog dial 4 downwards a pre-set distance or angle as indicated by arrow a in FIG. 4, the selector A shifts to the menu item "luminance". If the user rotates the jog dial 4 further downwards, the selector A shifts to the menu item "selection of the application", as shown in FIG. 20.

If, as a result of the rotating actuation by the user of the jog dial 4, the selector A has shifted to the menu item corresponding to the desired processing, the user pushes the jog dial 4 down in the direction indicated by arrow b in FIG.

Figure 19:
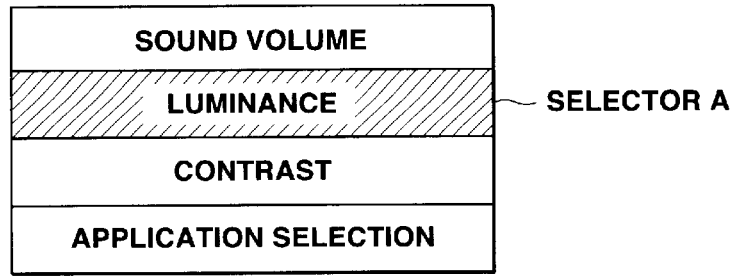
FIG. 19 illustrates another exemplary display of jog dial menu.
Figure 21:
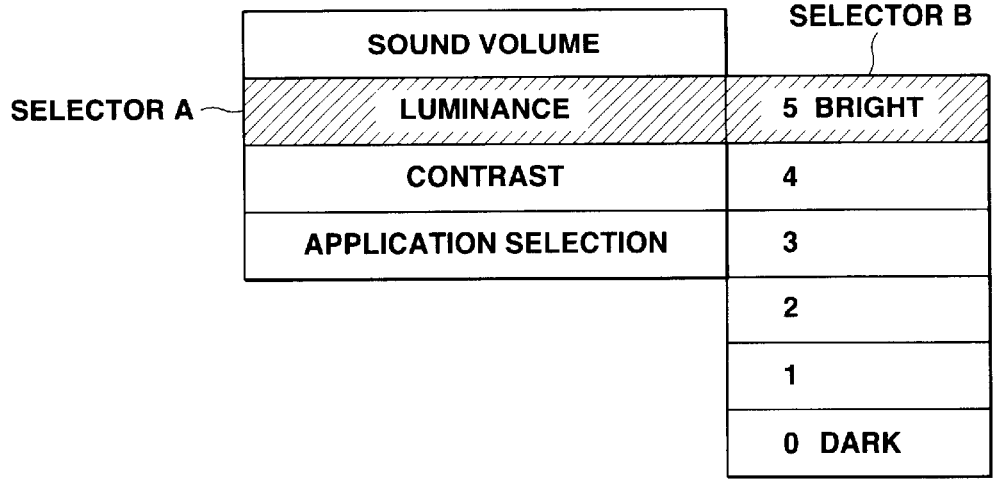
FIG. 21 illustrates an exemplary display of sub-menu.

4, by way of performing the selecting operation. So, if the selector A is displayed on the menu item "luminance", as shown for example in FIG. 19, the sub-menu associated with the menu item "luminance" is displayed, as shown in FIG. 21. In the present example, six sub-menus "5" to "0", corresponding to the sub-menu "5" selected when the luminance is to be maximum through to the sub-menu "0" selected when the luminance is to be minimum, are displayed. The amount of the variation of the jog dial 4 corresponding to the rotating processing of the jog dial 4 by the user is found by the processing by the embedded controller 68 shown in FIG. 15 and is sent to the jog dial driver 54D, while being monitored by the jog dial state monitor program 54C, to cause movement of the selector B.

Figure 20:
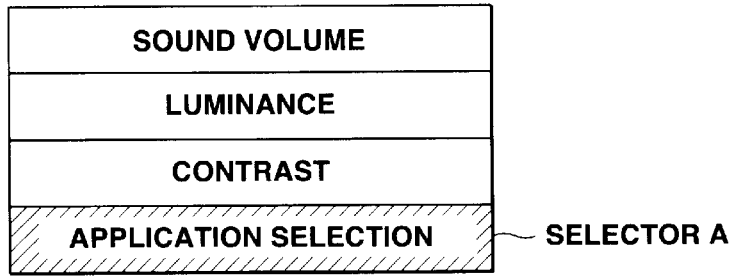
FIG. 20 illustrates still another exemplary display of jog dial menu.
Figure 22:
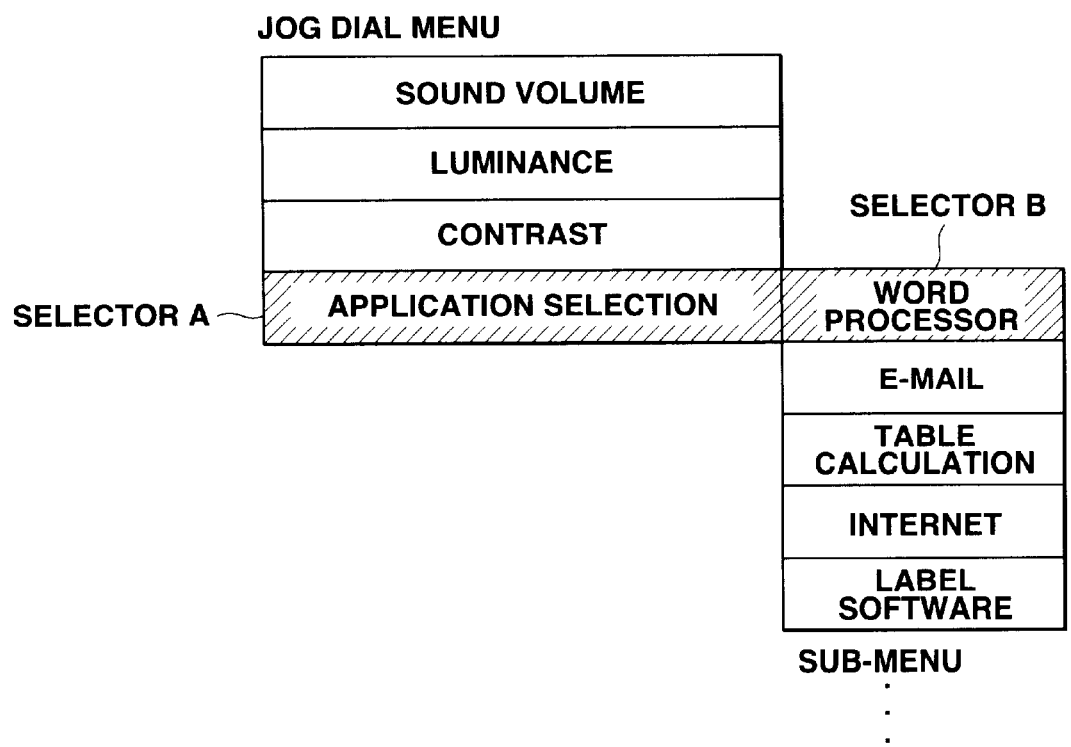
FIG. 22 illustrates another exemplary display of sub-menu.

On the other hand, if the selector A is displayed on the menu item "selection of the application", as shown in FIG. 20, the sub-menu corresponding to the menu item "selection of the application", is displayed by the selecting operation by the user, as shown in FIG. 22. In the present example, the sub-menu item "word processor", selected on startup of a word processor application, sub-menu item "E-mail" selected on startup of an E-mail program, sub-menu item "table calculations" selected on startup of a table calculation program, sub-menu item "Internet" selected on startup of an Internet program and the sub-menu item table "calculator" selected on startup of a table calculator program, are demonstrated. In the present example, the selector B on the sub-menu is demonstrated on the topmost submenu item.

The user then rotates the jog dial 4 to cause the selector B to be moved to the submenu item desired to be selected, and then presses the jog dial 4 to perform the selecting operation. This selects the submenu item displayed on the selector B to permit the corresponding processing to be executed. If, for example, the submenu item "3" in the example of FIG. 21 is selected, the luminance corresponding to the submenu item "3" is set. On the other hand, if the sub-menu item "Internet" is selected in the example of FIG. 21, the Internet program is started.

Figure 23:
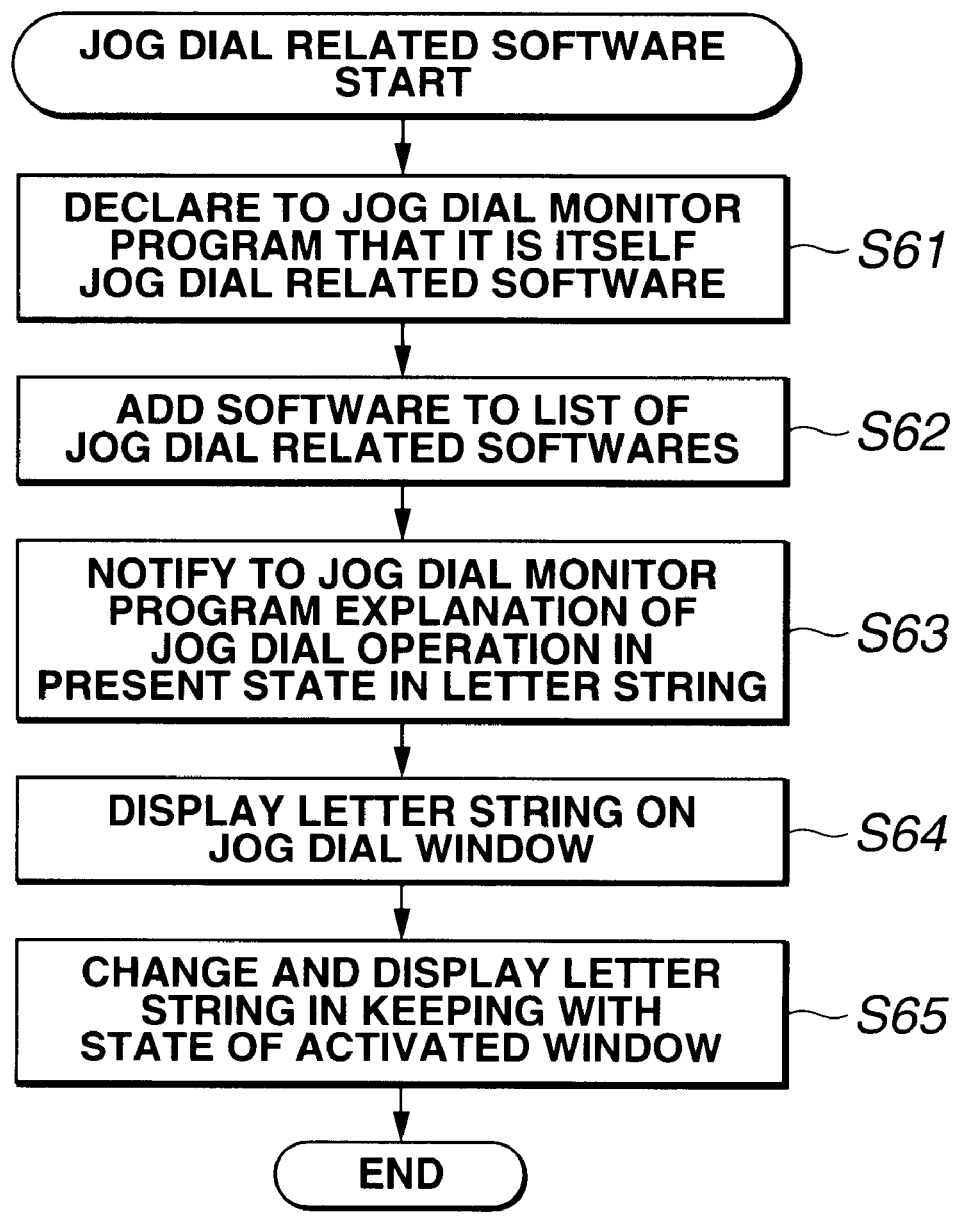
FIG. 23 is a flowchart for illustrating a notification processing which a jog-dial related application performs for the jog dial state monitor program executed by a CPU.
Figure 24:
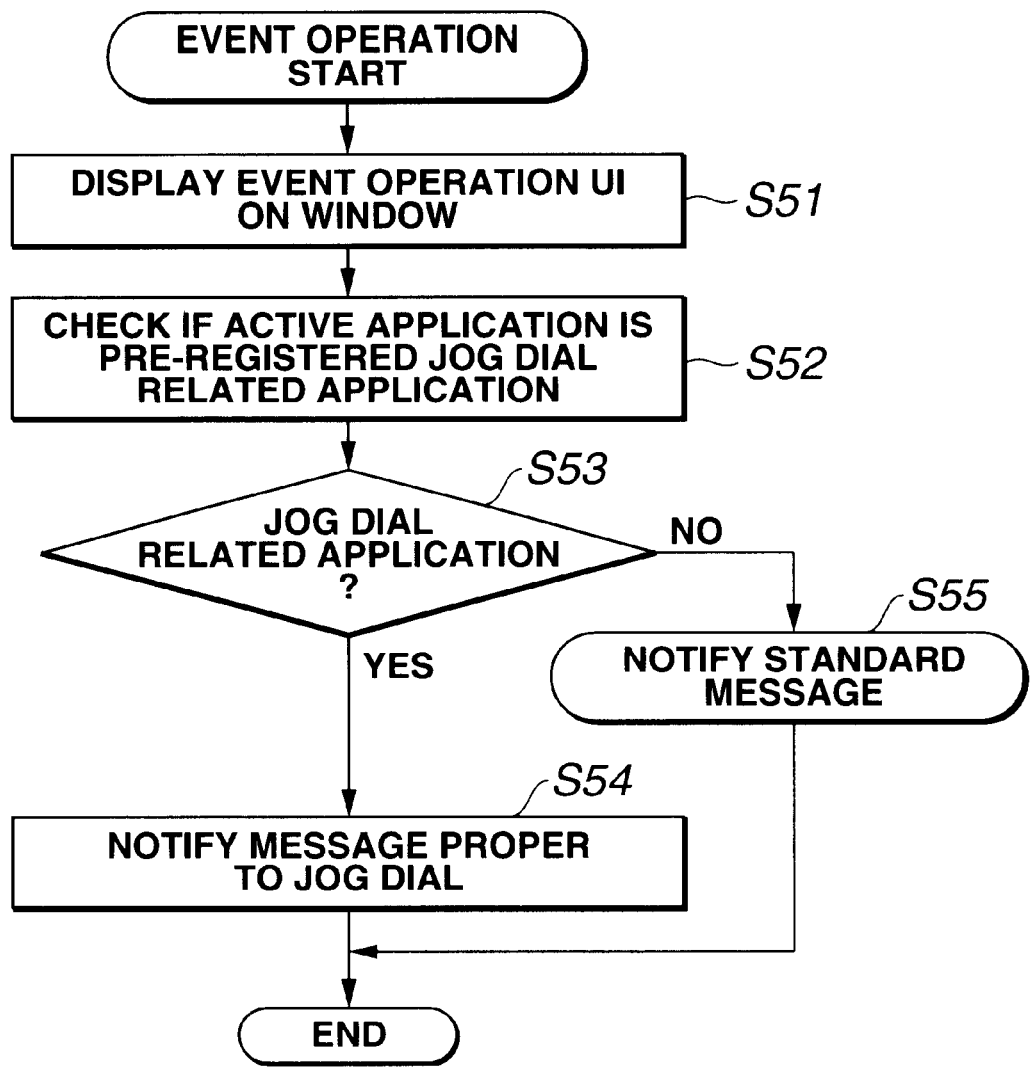
FIG. 24 is a flowchart for illustrating an event operation by a jog-dial related application or a jog-dial non-related application.

The case in which, after turning on of the power source switch 8, the CPU 51 executes the jog dial state monitor program 54C, and there is an active application at step S33 in FIG. 17, is explained. This case corresponds to the event operation described above. The application needs to be associated with the jog dial and specifically is to be a pre-set application program having a picture displaying function. In the present instance, the map of Japan shown in FIG. 23 is displayed on the LCD 7 by the application program. If the user rotates the jog dial 4 in this case, the picture is enlarged at a point indicated by a printer as the center, as shown in FIG. 24.

If the jog dial 4 is rotated in the opposite direction to that when the picture is enlarged, the picture is contracted, that is restored to the original size. So, in the pre-set application program having the picture displaying function associated with the jog dial, the picture displayed on the LCD 7 can be contracted or enlarged in association with the rotating operation of the jog dial 4.

Figure 26:
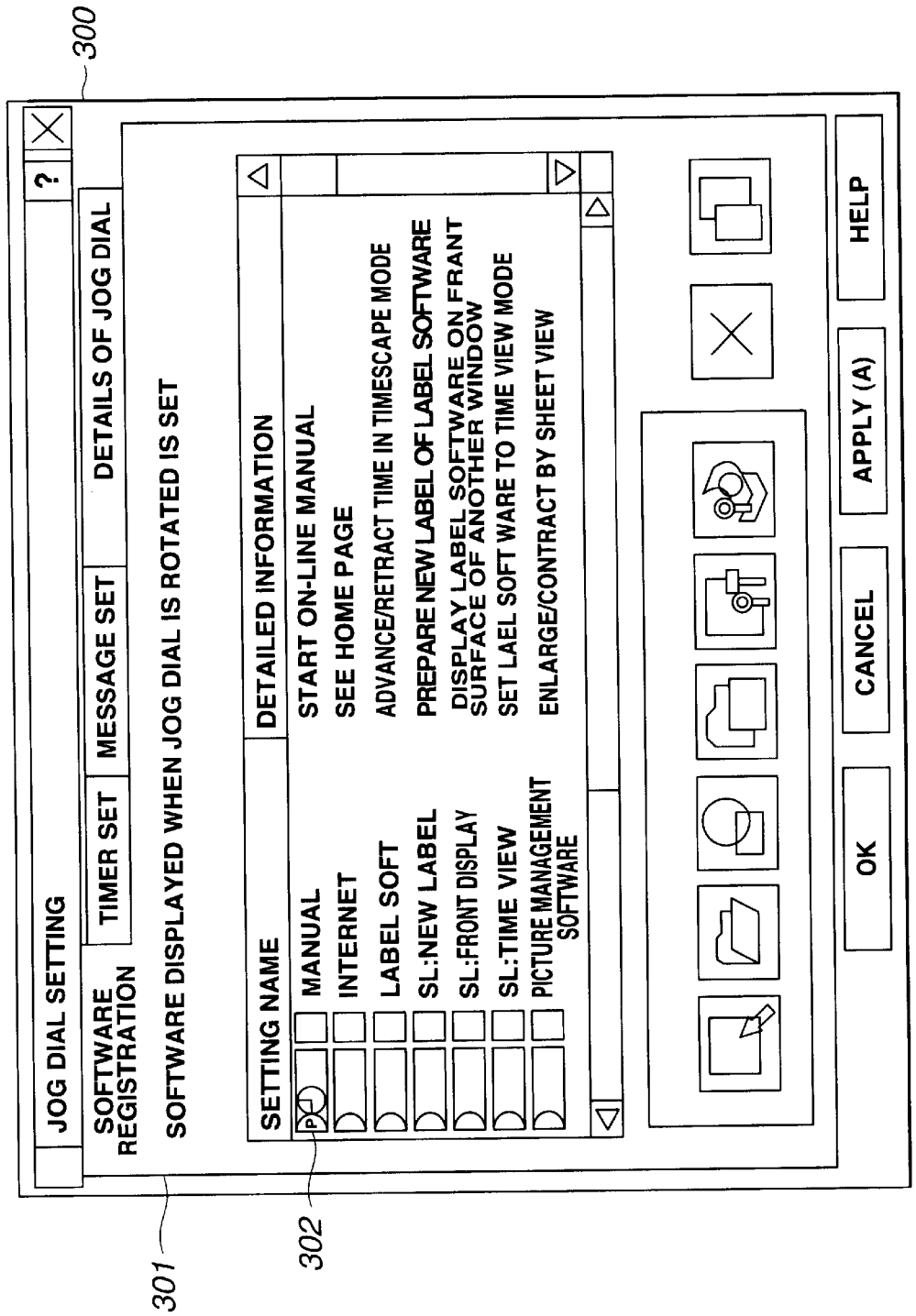
FIG. 26 shows the state of registering an application in an application list started especially from the launcher function in setting a jog dial.

The above-mentioned applications as the specified examples are both the jog dial related software. However, not all applications stored in the HDD 67 and memorized in the RAM 54 after completion of the OS54E startup are not associated with the jog dial 4. For example, the application 54F3 is not associated with the jog dial. The processing on the jog dial which the CPU allocates to the jog dial related application and to the jog dial unrelated application. For this reason, the jog dial related application notifies to the jog dial state monitor program 54C executed on the CPU 51 in accordance with the procedure shown in FIG. 26.

First, at step S61, the jog dial related application declares to the jog dial state monitor program 54C that it is a jog dial related application. The jog dial state monitor program 54C then at step S62 adds the application software to the list of the jog dial related software.

Although not shown specifically, in the above explanation, the jog dial menu display may also be made known to the user in the form of a jog dial guide as a display proper to the application.

Figure 27:
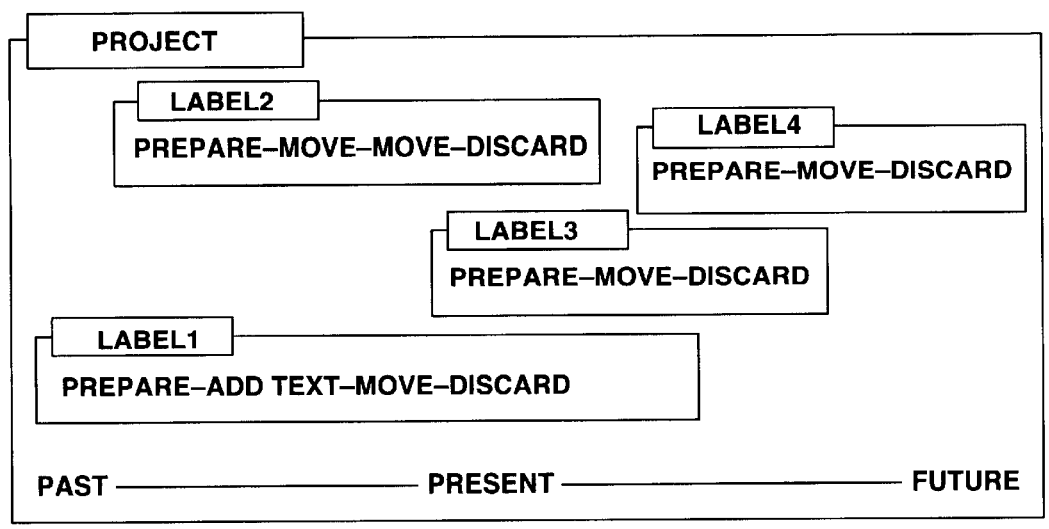
FIG. 27 shows the relationship between data of the project, label and the object handled by the label software of the present embodiment.

That is, at step S63, the jog dial related application notifies the illustration of the jog dial operation in the current state to the jog dial state monitor program 54C by a letter string. At step S64, a jog dial window 90 shown in FIG. 27 is displayed at step S64 to demonstrate letter strings, such as "jog dial guide", "zoom", "in", "fit" or "out".

The jog dial related application at step S65 changes the letter strings depending on the state of the activated window to rewrite the list of the jog dial state monitor program 54C. So, if the jog dial related application is active, the display of the jog dial window 90 demonstrates, in letter strings, the illustration as to which operation is to be performed by the application subject to jog dial actuation.

The application is classed into a jog dial related application and a jog dial non-related application, as discussed above. The distinction between the jog dial related application and the jog dial non-related application is made in accordance with the procedure shown in FIG. 24.

First, at step S51, the UI which performs an event operation is displayed on a window.

It is then checked at step S52 whether or not the application is a jog dial related application corresponding to a pre-registered active application and a decision is given at step S53. If, at step S53, the application is verified to be a jog-dial non-related application, the program moves to step S54 to make a message notice proper to the jog dial in accordance with the procedure shown in FIG. 15. If the application is a jog-dial non-related application, the program moves to step S55 to make standard message notice.

Specified examples of the jog-dial related application and the jog-dial non-related application are shown below.

Figure 25:
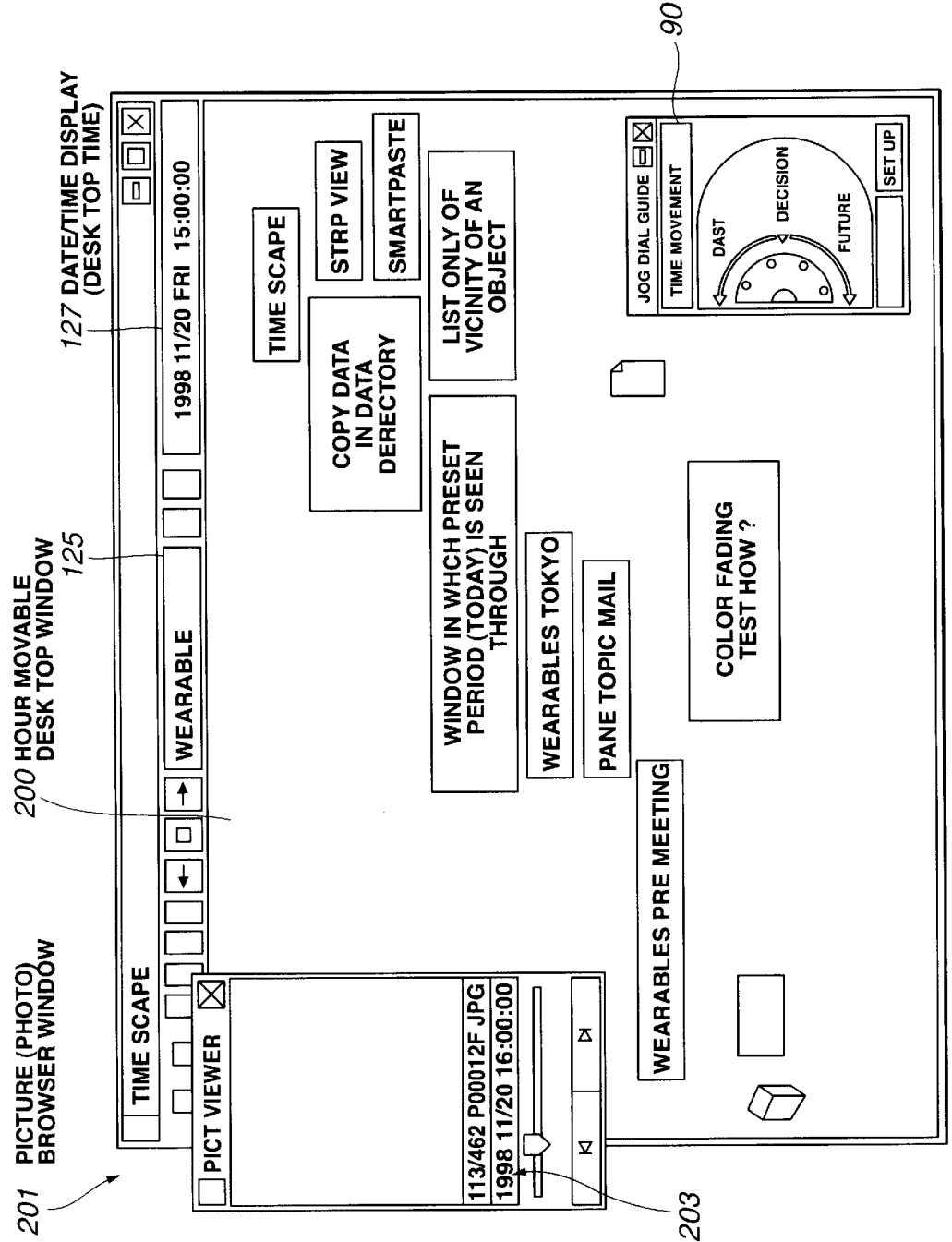
FIG. 25 shows an exemplary window display of a first specified example of the jog-dial related application.

A first specified example is an application software showing a tag on a desk top for realizing the time-shiftable desktop environment, as disclosed in JP Patent Application No. 11-108535 (Internal Priority Application H-10-321772) proposed by the present Assignee. FIG. 25 shows exemplary picture in case temporal cooperation is made between an application for realizing a time-shiftable desktop environment and an application of a picture browser. It is assumed that, in FIG. 25, retrieval is made on a desk top by an application realizing the time-shiftable desktop environment and time shifting is made until a given letter string presents itself on the desk top. It is assumed that, in the present embodiment, a letter string "wearable" is inputted to a retrieved letter input space 125, the letter string "wearable" is retrieved by an application realizing the time-shiftable desktop environment and the icon or the letter string used at a time of a conference pertinent to the on a time-shiftable desktop window 200 letter string "wearable" is displayed on the time-shiftable desktop window 200. It the present case, the desktop environment of the conference held on Nov. 20, 1998 Friday at 3 pm is displayed on the window 200, as may be seen from the displayed contents of a date and time display 127. If the "application time" is determined by the application realizing the time-shiftable desktop environment as discussed above, the time information is notified to a picture browser, which, on reception of the time information, displays the photo picture shot at the adapted for time (time during conference). In the present case, a photo picture shot on Nov. 20, 1998 at 4 pm is displayed on the window 201. If conversely the picture browser is acted upon, the state of the desktop at a time point of the picture photographing is regenerated. Therefore, it can be understood under which situation the photo is shot, even though no caption (explanation) is attached to the picture. If the application is associated with the event operation of the jog dial 4, the temporal moving direction and quantity of the time-shiftable desktop 200 can be acted on by the jog dial 4. That is, for example, a jog dial window 90 may be displayed on the lower right corner of the time-shiftable desktop 200 to realize temporal movement to the past or to the future in association with the scrolling of the jog dial 4.

A second specified example is the Smart Capture (trademark) as a tool for capturing still and moving pictures of a digital video camera.

A third specified example is the MediaBar as a music actuating tool. In this MediaBar, playback of the next number or the previous number may be selected or playback may be paused by scrolling with e.g., a jog dial or a keyboard.

A fourth specified example is the SmartPad (trademark) as a handwriting memo tool employing a touch pad 6. The touch pad 6 is used as absolute coordinate detection means. The handwritten memo input from the touch pad 6 is processed by the drawing application and displayed.

As a fifth specified example, a schedule management tool, for example, may be used.

The setting of the jog dial is explained. By actuation of a "set up" button of the jog dial window 90, the picture may be shifted to a jog dial setting picture 300 shown in FIG. 26. For example, an application can be registered in an application list started from a launcher application. The setting is registered by selecting a software registration area 301 and attaching a jog dial mark to the desired application. The setting registration comes to a close on clicking an OK button.

A label software of the present embodiment is now explained.

The label software of the present embodiment is an application program for realizing, on a desktop screen of a personal computer, the operation of exploiting a tag sheet attached as an index mark to a paper document, writing a memo on the tag sheet and affixing it somewhere for use as a reminder. In the present embodiment, the label sheet displayed on the desk top screen is called a label sheet and an application program for displaying the label on the desk top is called the label software.

The label software of the present embodiment has the functions of handling the text of letters or symbols, still pictures, speech or music sound, as an object that can be affixed to the label as a tag sheet displayed on the desk top, editing a text affixed to the label, the recording and/or reproducing function of the sound affixed to the label, capturing/displaying a picture to be affixed to the label and cooperating with a application software fir capturing the picture from the CCD camera attached to the personal computer. The label software of the present embodiment also includes the functions of preparing a label having a change hysteresis as the temporal management function, fully supporting the jog dial with respect to the temporal management function and of handling a link as an object affixed to the label.

In the structure of data handled by the label software of the present embodiment, having these functions, there are three items, namely a project, a label and an object. FIG. 27 shows the relationship between these data.

The adapted for project is a set of all label data. Usually, a project formulates only one project. In a project, there are all label information of past, present and future. However, for furnishing sample contents or project information exchange over the Internet, the label software of the present embodiment supports the project switching and addition. The project will be explained in detail subsequently.

The label corresponds to a tag sheet on a desktop. The label has the information as from its formulation until its disposal. This information is the information on the entire operations which the user performed through a personal computer on the label as from its formulation until its disposal, such as size or color change of the label, text correction, picture change or sound change. Although the label position information always has the attributes of displaying the latest information, the information between the labels, between the windows or between the label and the window is not held. The label may be classed into three sorts, that is the current label, past label and the future label. The current label is a label prepared at a time ahead the current time and which has not yet been deleted at the current time point. The relationship between the time of preparation of the current label, the current time and the end (deletion) time is (preparing time≦current time<end time (deletion time). The past label is a label already deleted at the current time point. The relationship between the time of preparation of the current label, the end (deletion) time and the current time is (end time (deletion time)<preparing time≦current time). The future label is a label not formulated as yet at the current time point, and the preparing time is set to a future time point. The relationship between the current time, the time of preparation of the current label and the end (deletion) time is (the current time<the time of preparation<the end (deletion) time. The label will be explained subsequently in detail.

The object is data affixed in the label and may specifically be enumerated by a text object, a picture object, a sound object and a link object. First, the overall structure of a picture is explained.

The main constituent parts of a desk top screen when the label software of the present embodiment is executed are explained. First, the overall structure of a screen is explained.

The label software state of the present embodiment (state of the application) may be classed into a normal mode and a time view mode.

Figure 28:
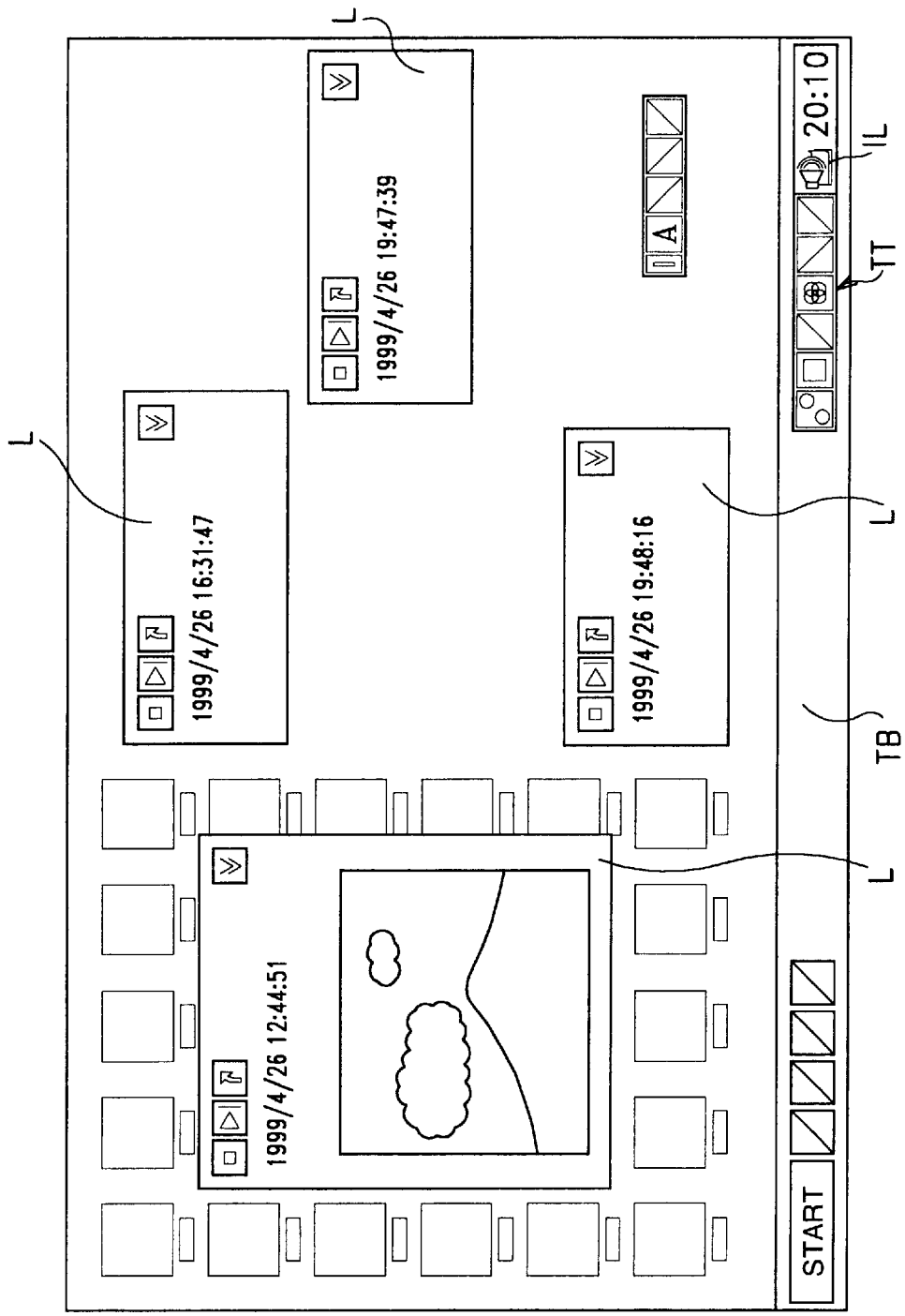
FIG. 28 shows an example of a desktop picture during the normal mode operation.

The normal mode is a state in which a label has been affixed to the desk top in a state other than the time view mode. FIG. 28 shows an example of a desk top picture in the normal mode. In this figure, the label is denoted by a reference figure L. in this normal mode, an icon IL of the label software of the present embodiment is displayed on a task tray TT of the task bar TB on the desktop screen. By accessing (clicking) this icon IL using a pointing device, such as mouse, it is possible to control the entire functions of the label software application of the present embodiment.

Figure 29:
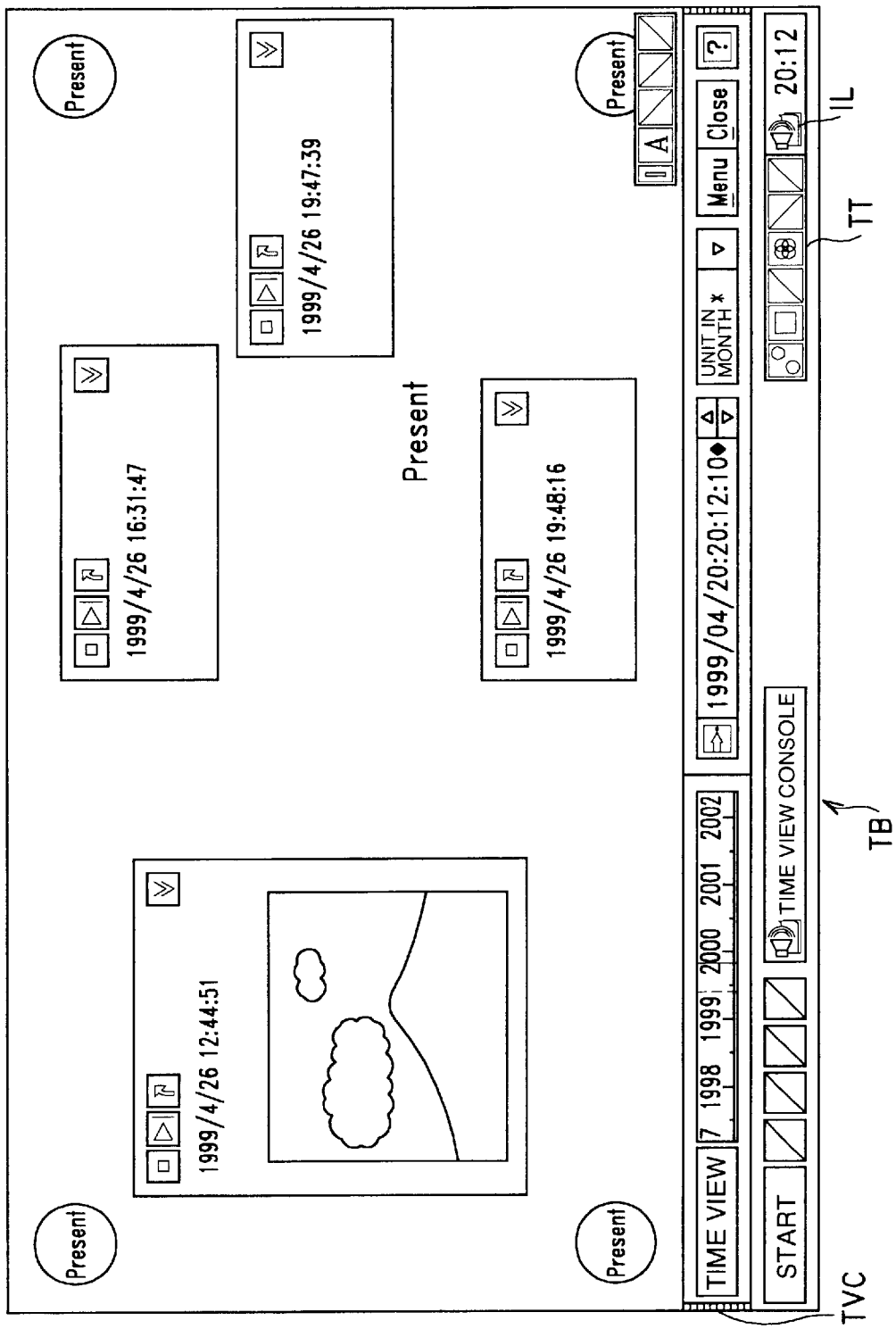
FIG. 29 shows an illustrative structure of a desktop picture in the present mode.
Figure 30:
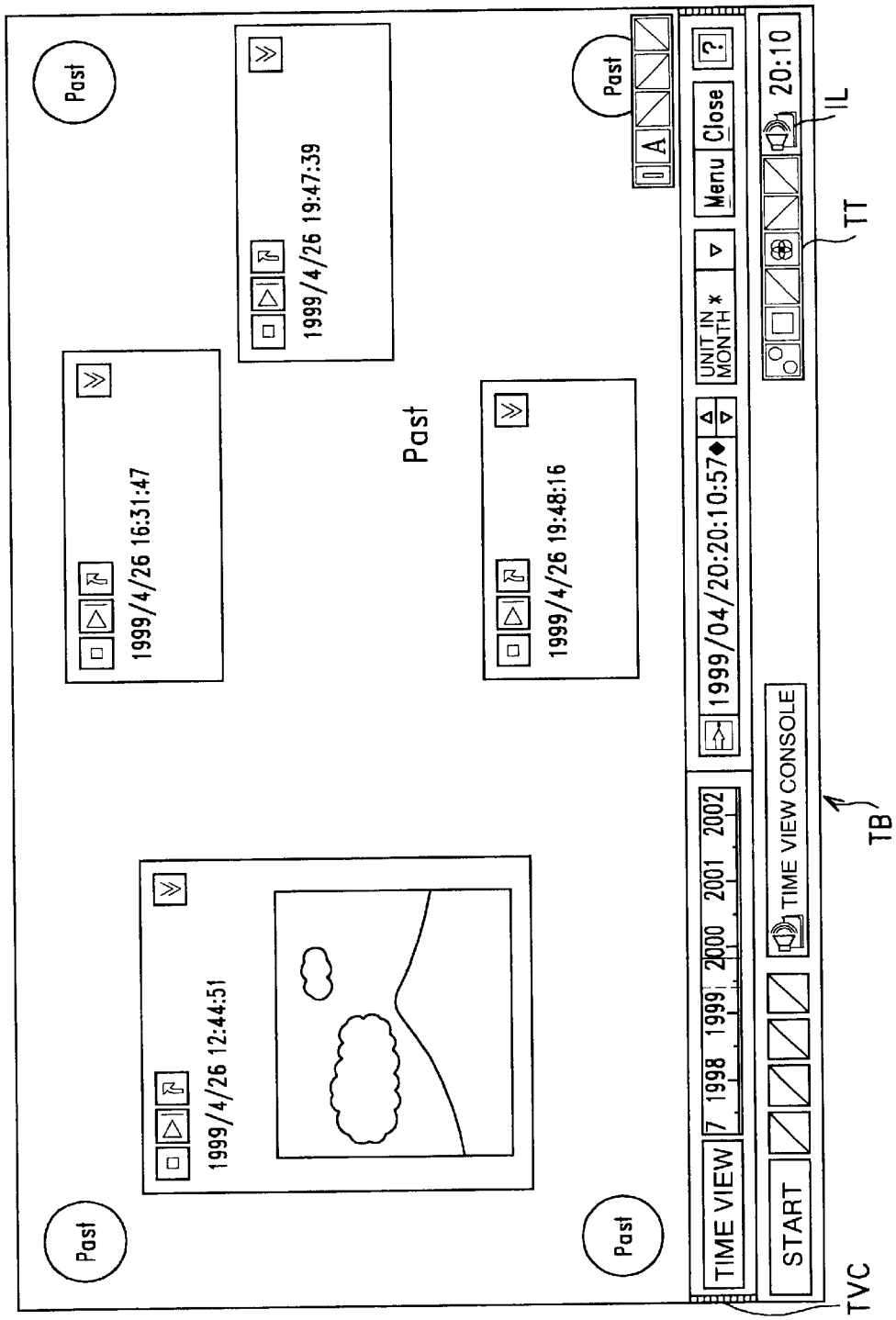
FIG. 30 shows an illustrative structure of a desktop picture in the past mode.
Figure 31:
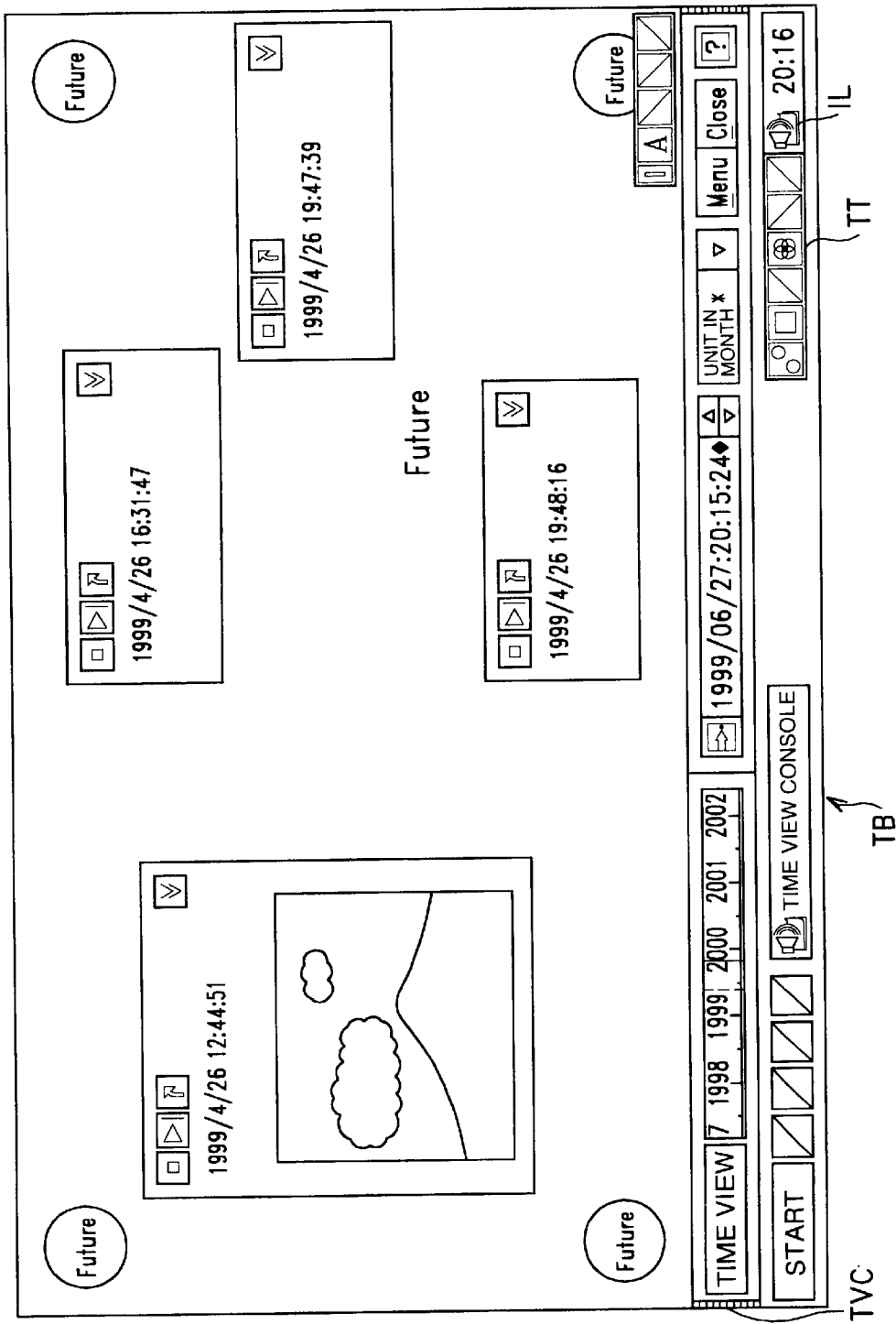
FIG. 31 shows an illustrative structure of a desktop picture in the future mode.

The time view mode is a mode in which temporal operation by the label software of the present embodiment is possible and which can be classed into three states of the present, past and future modes. FIGS. 29 to 31 show an illustrative structure of a desktop screen in the present mode, an illustrative structure of a desktop screen in the past mode and an illustrative structure of a desktop screen in the future mode, respectively. As may be seen from these figures, the current state, past state and the future state of the label contained in the project are displayed for the present, past and future modes, respectively. On the desktop screen of FIGS. 29 to 31, letters "present", "past", and "future" indicating the respective modes are displayed at the center and at the four corners of the desktop screen of FIGS. 29 to 31. By these indications, the user is able to visually recognize the mode which prevails, that is the present mode, past mode or the future mode. Also, in the time view mode, the icon IL of the label software of the present embodiment is displayed on the task tray TT of the task bar TB of the desktop screen.

On switching to the time view mode, the entire area on the desktop is covered by a label software picture and a label is displayed thereon. If there are plural monitors, the entire areas of the entire monitors are covered by a label software picture and a label is displayed thereon. At this time, a time view console TVC for enabling the display/change of the time now acted on is displayed on the screen. Meanwhile, the time view console TVC is displayed in the standard state on the upper part of the screen. FIGS. 29 to 31 show an example of displaying the time view console TVC in the lower portion of the screen. The time of the state in which the desktop display is made in the time view mode is referred to below as the operation time.

Figure 32:
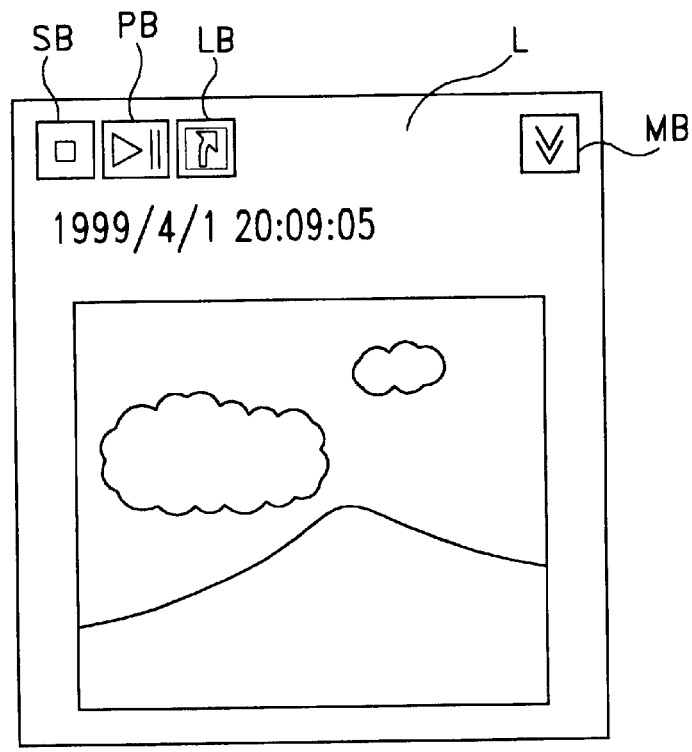
FIG. 32 shows an example of a window picture of a label of the present embodiment.

The window screen of the label displayed on the desktop is made up of a play/pause button, a stop button, a link button, a menu button, an object that can be affixed to the label (text, picture and sound), icons (alarm, repetition) and the like. FIG. 32 shows an example of the window picture of the label L. In the case of the label L, shown in FIG. 32, the play/pause button PB, stop button SB, link button LB and the menu button MB are displayed and the text, sound, picture and the link are affixed in the label L. Meanwhile, the state in which the picture is displayed is shown.

Figure 33:
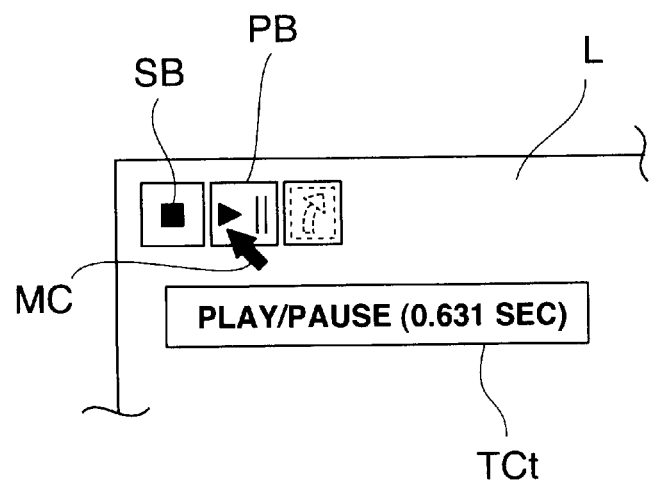
FIG. 33 illustrates a tool chip showing the play time (sound recording time) relevant to the play and pause buttons.
Figure 34:
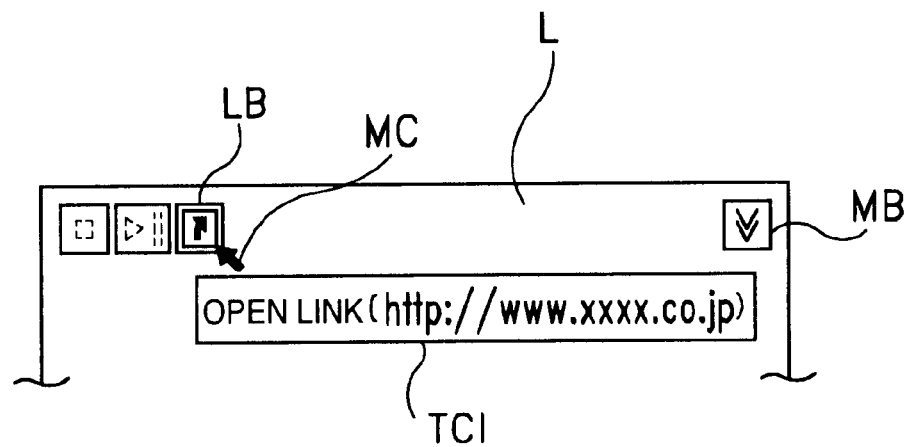
FIG. 34 illustrates a tool chip showing the link contents relevant to the link button (file path of a link destination or URL).

The play/pause button PB is used for commanding the playback start and the pause of the sound when the label L contains a sound object. That is, if the label L contains the sound object, and the play/pause button PB is pressed, such as by mouse click, the sound is reproduced, whereas, if the play/pause button PB is pressed (clicked) during the sound reproduction, the sound reproduction is paused. On the other hand, the play/pause button PB is PB is associated with a tool chip TCt indicating the play time (sound recording time) shown in FIG. 33, such that, when a cursor MC is moved on the button PB, the tool tip TCt indicating the play is displayed.

The stop button SB is used for stopping the sound reproduction. If the stop button SB is pressed (clicked) during the sound reproduction, the sound reproduction is stopped.

The link button LB is used for opening the file of the link destination associated with the label L and for displaying the window of the HTML (Hypertext Markup Language). If a file path is set as an address of the linking destination on the label L, and the link button LB in the label window of FIG. 32 is pressed (clicked), the file set by the file path is opened. If the URL (uniform resource locator) is specified as a linking address in the label L, and the link button LB is pressed (clicked), the window of the HTML (Hypertext Markup Language) is displayed. Also, the link button LB is associated with the tool chip TC1 indicating the link contents (file path or URL of the linking destination), such that, when the cursor MC has been migrated onto the link button LB, the too chip TC1 indicating the link contents is displayed.

The menu button MB, arranged on the right upper end of the label window, is used for displaying the menu of all operations relevant to the label, such as file, addition of new labels, time, label, help etc. If the menu button MB is pressed (clicked), the menu items, such as file, addition of desktop screen, time, label, help etc are displayed as the pull-down menu in the vicinity of the menu button MB. Meanwhile, when the right button of the mouse is clicked in each part of the lebel, or the application key is pushed with focussing, menu items (context menu items) are displayed as when the menu button MB is clicked. The pull-down menu activated on clicking the menu button MB on the label window and the context menu by the application key will be explained subsequently in detail.

Figure 35:
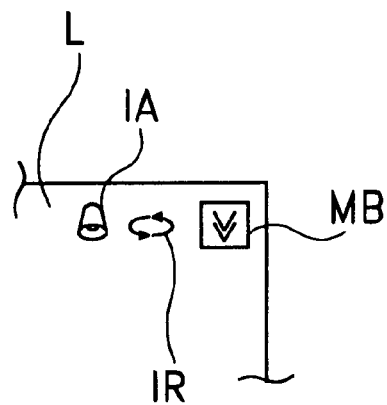
FIG. 35 illustrates examples of an alarm icon and repetitive icon.

Depending on the status or the setting of the label, an icon representing the current state is displayed on the upper right part of the label L (left: neighboring side of the menu button MB, as an example). The icon may be classified into an alarm icon IA and a repetitive icon IR as shown in FIG. 35. The alarm icon IA is displayed when an alarm is set on the label, whereas the repetitive icon IR is displayed when a repetitive display is set.

The label in the state of the time view mode may sometimes be a correction inhibited label. The correction-inhibited label is varied in color in its edge from the color of the edge of the correctable label for distinction from the correctable label. That is, in the present embodiment, distinction is made by the label color so that the user will comprehend due to which state of the label it is uncorrectable. For example, the uncorrectable label is differentiated from the correctable label by having a purple or blue color. For example, if the label edge color is "purple", it indicates that the present label is of the past mode or the future mode and cannot be corrected (correction-inhibited label). If the label color is "blue", it indicates that the label is the past label, which is not corrected for any modes.

Figure 36:
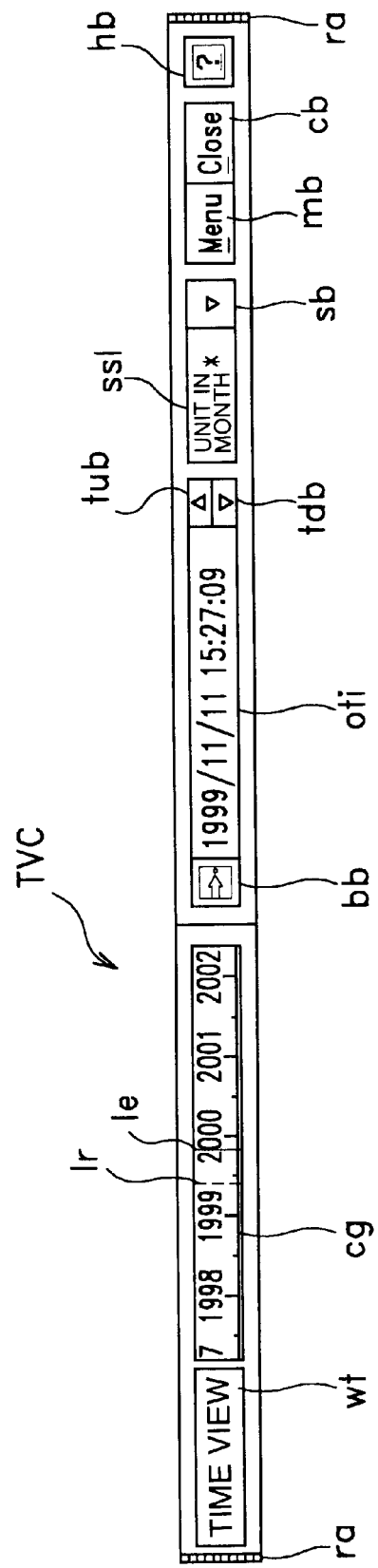
FIG. 36 shows a bar-state time view console window.
Figure 37:
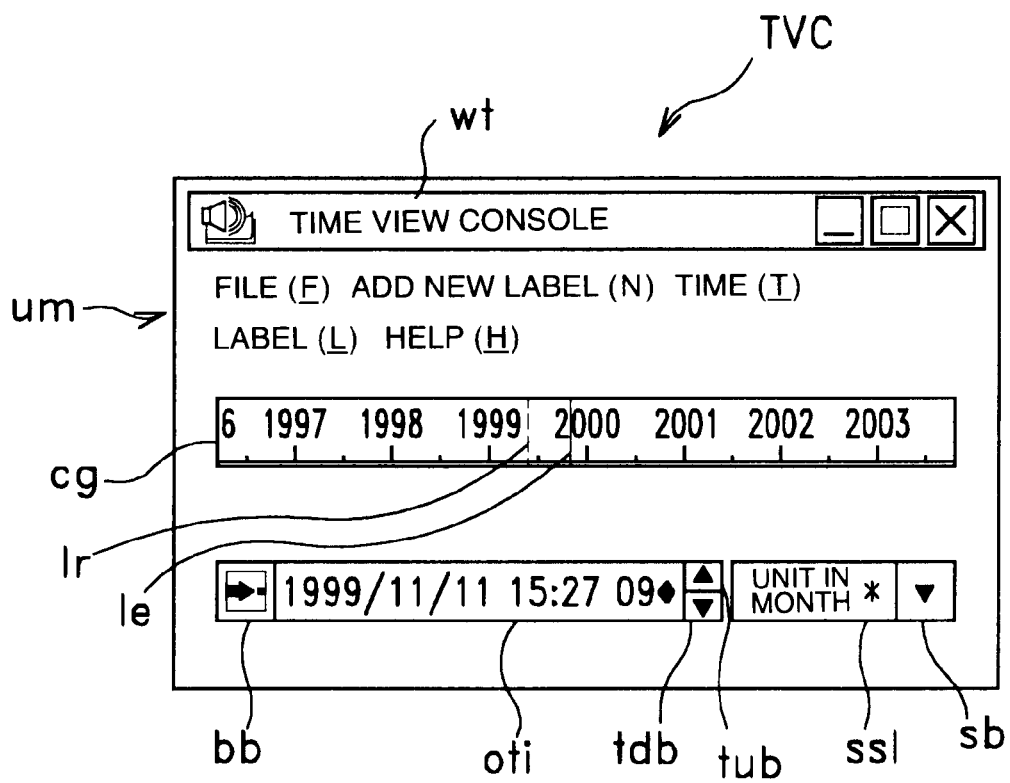
FIG. 37 shows a floating state time view console window

The time view console TVC has two window states, that is a state of a bar-shaped window shown in FIGS. 29 to 31 and in FIG. 36 and a state of a floating window as shown in FIG. 37. That is, the time view console TVC can be dragged by a pointing device, such as a mouse. When the time view console TVC is moved upwards or downwards in the screen, it is in a bar-shaped window, as shown in FIGS. 29 to 31 and in FIG. 36, and otherwise in a floating-state window, as shown in FIG. 37. Although the screen configuration differs in the bar state and in the floating state, the function of the time view console is the same.

The bar-state window of the time view console TVC shown in FIG. 36 is made up of a window title portion wt, the Christian era gauge unit cg, current button bb, an operation time display unit oti, an up-down button tub and tdb, time increasing/decreasing step selection list box ss1, a time increasing/decreasing step selection menu button sb, a menu button mb, a closure button cb, a help button hb and a rotation animation unit ra.

The window title unit wt displays a title of the window, a time view in the present example, and displays only the title. That is, the window title unit wt is provided for clarifying that the application responsible for the current picture in its entirety is the label software.

The Christian era gauge unit cg is provided for clarifying for the user at a glance to which time in the Christian era corresponds the label currently displayed. This Christian era gauge unit cg is displayed so that the time as the label is displayed on the screen will be perpetually at the center of the gauge. A yellow vertical line, for example, is also displayed for clearly displaying the time. That is, the time at the center portion of the Christian era gauge unit cg corresponds to the label of the past or future label, or to the current time, instead of corresponding to the real time (current time of the real world). The Christian era gauge unit cg in the example of FIG. 36 is an illustrative display for a case wherein the time of the state in which a label is displayed on the screen, that is the time at the gauge center, is November 1999. A yellow vertical line 1e is displayed at the gauge center. In the Christian era gauge unit cg, a red vertical line 1r indicating that the real time (current time of the real world) is e.g., May 1999. That is, according to Christian era gauge unit cg, the relative position between the time corresponding to the displayed label, such as November 1999, and the real time, such as May 1999, can be recognized readily.

The current button bb is used for commanding restoration from the time corresponding to the displayed label to the real time (current time of the real world). Meanwhile, if the time is reset to the current time (current time of the real world) by the current button bb, the state of the label software (state of the application) is kept in the time view mode.

The operation time display unit oti displays which time state is the state in which a label is displayed on the screen. In the example of FIG. 36, it is the state of the label on Nov. 11, 1999, 3.27.9 pm, that is displayed on the screen.

The up-down buttons tub and tdb are used for advancing or delaying the time demonstrated on the operation time display unit oti by specified time advancing delaying unit (time advancing delaying step). Assume that there is focus on the operation time display unit oti and that one of the year, month, day, hour, minute and second on the operation time display unit oti is activated. If now the up-button tub is pushed, the value of the activated portion is increased by a specified time increasing/decreasing unit (time increasing/decreasing step). In the label software of the present embodiment, the function which is the same as that of the up/down buttons tub and tdb may also be implemented by rotation of a wheel of a mouse fitted with the wheel, up/down operation of a cursor key or rotation of the jog dial 4. That is, in the present case, if there is a focus on the operation time display unit oti, one of the year, month, day, hour, minute and second on the operation time display unit oti is activated, and the wheel of the mouse fitted with the wheel is rotated, the up/down cursor key on a keyboard is pushed, or the jog dial 4 is rotated. The value of the activated portion is increased or decreased in specified time increasing/decreasing units (time increasing/decreasing steps) to advance or lag the time.

The time increasing/decreasing step selection list box ss1 demonstrates the time increasing/decreasing unit (time increasing/decreasing step) in case the time of the operation time display unit oti is increased and decreased. Stated differently, there is displayed in the time increasing/decreasing step selection list box ss1 the time increasing/decreasing unit (time increasing/decreasing step) of an activated one of the year, month, day, hour, minute and second, as the activated time display portion, demonstrated on the time increasing/decreasing step selection list box ss1 in the example of FIG. 36. In the present embodiment, the time increasing/decreasing units (time increasing/decreasing steps) are 100 years, 10 years, 1 year, 1 month, 1 hour, 1 minute, 1 second and varying time point. One of these time increasing/decreasing steps is displayed in the time increasing/decreasing step selection list box ss1. Meanwhile, the time increase/decrease in varying time units means increasing/decreasing the time with the time as from a time point when certain operation is made on the label by the user to modify the label, such as label movement, size change or object correction, that is a time point the label state on the desktop is changed, until the time point of occurrence of the next change, as one unit. So, if the time is increased or decreased in terms of the varying time units, the time interval of change with the increase/decrease at the change point is not constant.

The time increasing/decreasing step selection menu button sb is used for specifying the time increasing/decreasing steps demonstrated on the time increasing/decreasing step selection list box ss1 by a menu selection button. Stated differently, the time increasing/decreasing step selection menu button sb is used for selecting the time displaying portion, that is the year, month, day, hour, minute or second displayed on the operation time display unit oti, that is desired to be activated. If this time increasing/decreasing step selection menu button sb is pushed, that is clicked, the time increasing/decreasing units (time increasing/decreasing steps), such as 100 years, 10 years, 1 year, 1 month, 1 hour, 1 minute, 1 second and on varying time unit, is displayed as a pull-down menu below the time increasing/decreasing step selection menu button sb. Therefore, by selecting the desired time increasing/decreasing step, the corresponding time displaying portion from the indications of the year, month, day, hour, minute and second is selected and activated. That is, if, for example, the 1 month is selected from the pull-down menu of the time increasing/decreasing step selection menu button sb, the month displaying portion of the display portions of the year, month, day, hour, minute and second is activated. In this state, rotation of the up/down buttons tub and tdb or the wheel of the mouse fitted with such wheel, thrusting the up/down cursor key downwards or rotation of the jog dial 4 enables the month can be changed.

Moreover, in the label software of the present embodiment, the same function as the function of selecting the time increasing/decreasing steps by the time increasing/decreasing step selection menu button sb may be realized by rotation of the up/down buttons tub and tdb or the wheel of the mouse fitted with such wheel, thrusting the up/down cursor key downwards or rotation of the jog dial 4. That is, in the present case, if, with the focus on the operation time display unit oti, the wheel of the mouse fitted with such wheel is rotated, the left or right cursor key is pressed down, or the jog dial 4 is rotated, one of the time displaying portions arrayed in the left-and-right direction on the operation time display unit oti, that is the year, month, day, hour, minute and the seconds, may be selected to the activated state.

If the time is increased/decreased by operation of the mouse fitted with the wheel, it is possible to detect e.g., the continuous operation of a keyboard, rotational speed of the wheel of the mouse fitted with such wheel or that of the jog dial to change the time advancing or time lagging responsive to the detected results in an accelerating fashion. This provides for facilitated movement to the target time. Meanwhile, if the time increasing/decreasing step selecting function is implemented by the rotation of the mouse fitted with the wheel or the jog dial, it is necessary to set the environment for affording the rotation of the mouse fitted with the wheel, or the jog dial with the selecting function for the time increasing/decreasing steps.

The menu button mb is used for demonstrating the entire operating menus relevant to a project, such as file, addition of new labels or time labels. If the menu button mb is pressed (clicked), operating menus, such as file, addition of new labels, time or label are displayed as the pull-down menu in the vicinity of the menu button MB. Meanwhile, when the right button of the mouse is clicked in each part of the time view console TVC, or the application key is pushed with focussing, menu items (context menu items) are displayed as when the menu button MB is clicked. The pull-down menu activated on clicking the menu button mb on the time view console and the context menu by the application key will be explained subsequently in detail.

The closure button cb is a button for commanding closure of the time view console.

The help button hb is used for commanding the display of the help window used for checking into unclear points when a user acts on the label software of the present embodiment.

Figure 38C:
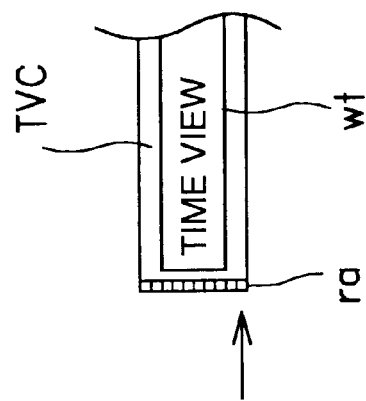
FIGS. 38A, 38B and 38C are enlarged views showing only the vicinity if a rotation animation portion on the left end of the bar-state time view console window.
Figure 38B:
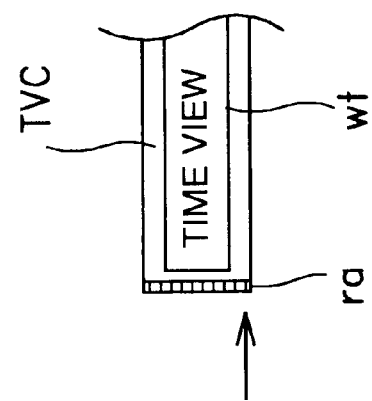
Figure 38A:
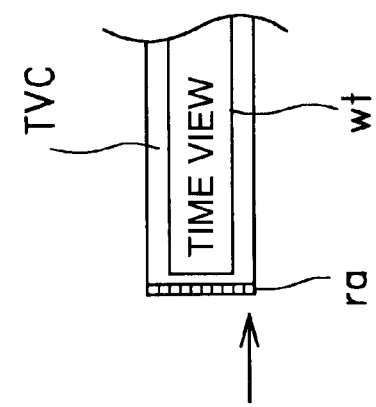
Figure 39:
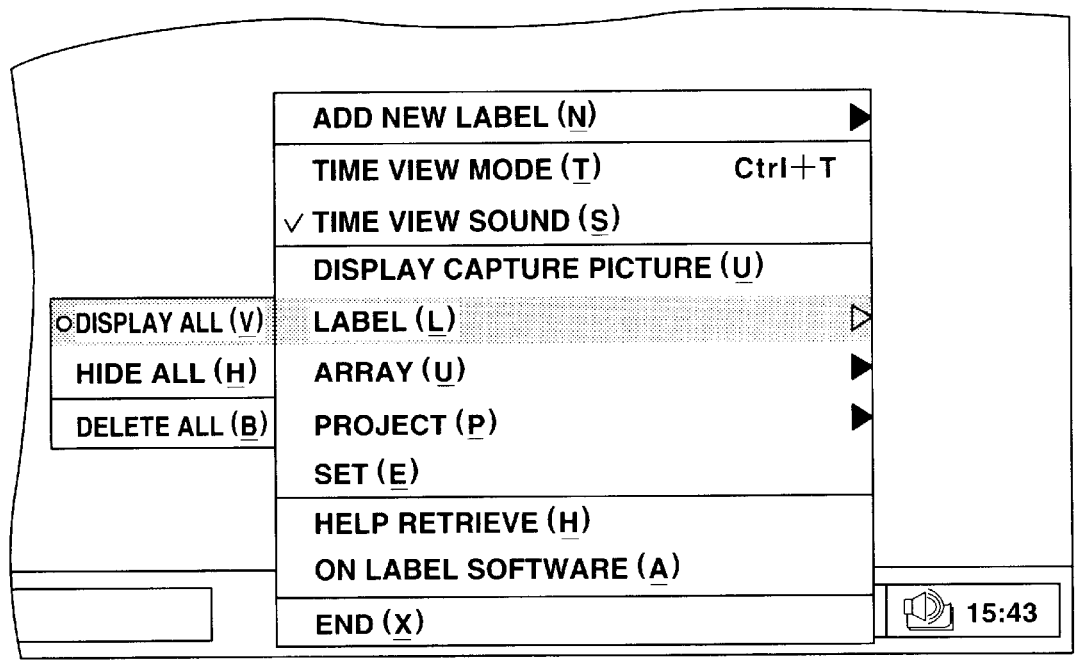
FIG. 39 shows an exemplary display of an operating menu in the "display all" state of the labels during the normal mode.
Figure 40:
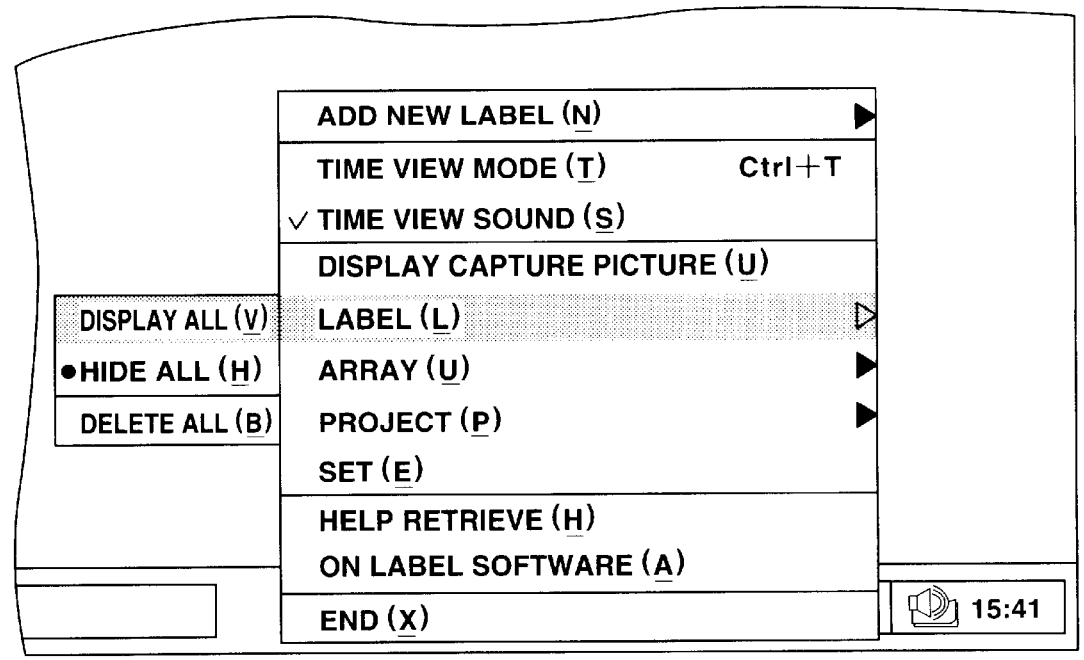
FIG. 40 shows an exemplary display of an operating menu in the "hide all" state of the labels during the normal mode.
Figure 41:
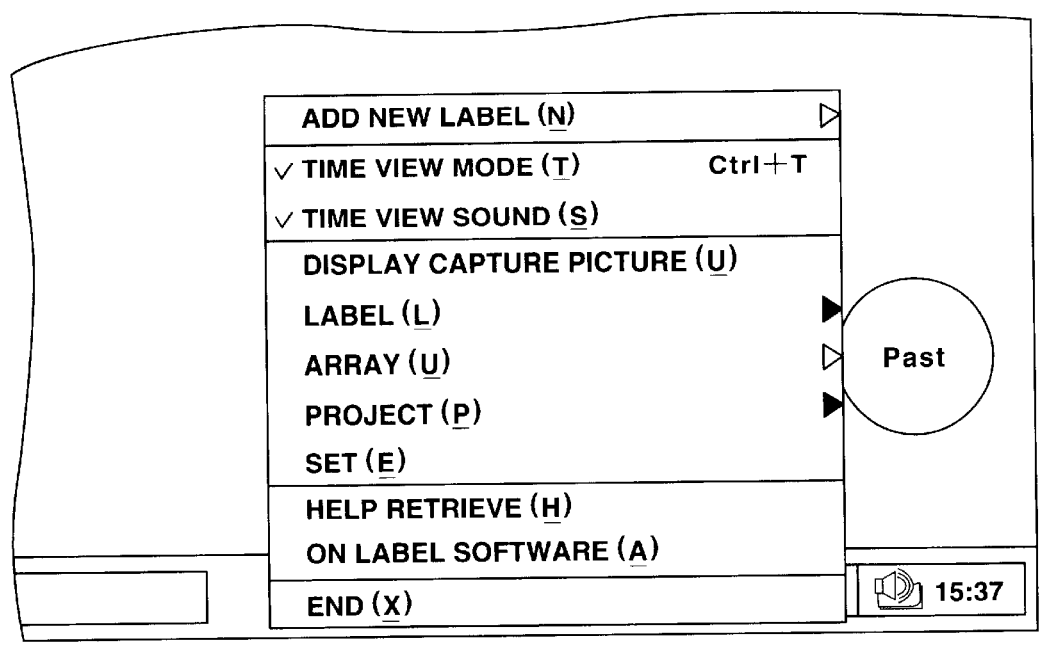
FIG. 41 shows an exemplary display of an operating menu during the past mode.
Figure 42:
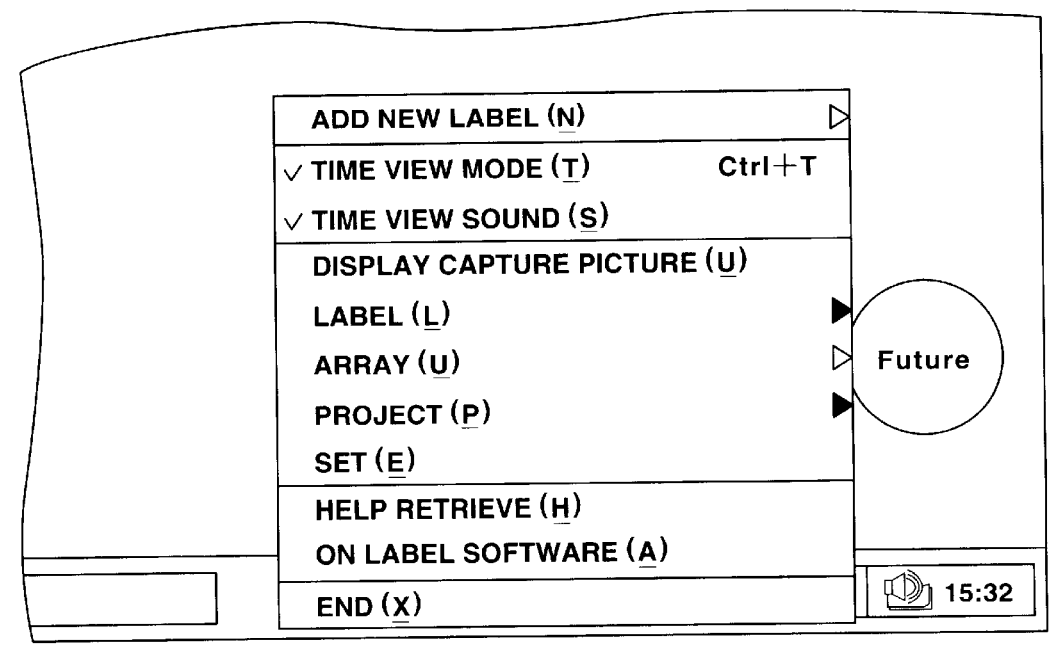
FIG. 42 shows an exemplary display of an operating menu during the future mode.

The rotation animation unit ra is used for visually demonstrating the time shifting to the user by animation display in such a manner as to rotate the rotation animation unit ra with changes in the operation time. The direction of rotation is reversed when the time proceeds to future from that when the time proceeds to past. FIG. 38 shows only the vicinity of the rotation animation unit ra on the left end of the time view console TVC in the bar state. If attention is directed to the → portion in the drawing, it may be seen how the rotation animation unit ra is rotated in the sequence of (a), (b) and (c) in FIG. 38. By making the animation display in which the rotation animation unit ra is rotated in this manner, it is possible to permit the user to recognize how the time is changed.

The floating-state window of the time view console TVC shown in FIG. 37 is made up of a window title portion wt, for indicating the title of the window, the time view console in the instant embodiment, a window menu unit wt for displaying the operating menu pertinent to the project, such as file, addition of new label, time, label or help, the Christian era gauge unit cg, similar to that in the bar state window, a current button bb, an operation time display unit oti, an up-down button tub and tdb, time increasing/decreasing step selection list box ss1, and a time increasing/decreasing step selection menu button sb. Meanwhile, the closure button for commanding the closure of the time view console in the case of FIG. 37 is an "X" button. The window menu unit wm of the time view console in the floating state will be explained subsequently.

The screen structure of an icon IL of the label software of the present embodiment, as demonstrated on the task tray TT of the task bar TB on the desktop screen, is hereinafter explained.

If, as the cursor is moved on the icon IL of the label software displayed on the task tray TT, the clicking by pressing the left button of the mouse is repeated, the label software of the present embodiment alternately repeats the "all display" state and the "all hide" state of the label. If the cursor is moved on the icon IL, and the left button of the cursor is pushed twice by way of double clicking, the label software of the present embodiment performs the default operation pre-set by the user by e.g., the environment setting, such as addition of new labels, addition of new labels and the sound recording, addition of new labels and acquisition of captured picture or entrance to the time view mode. If, as the cursor is moved on the icon IL, the right button of the mouse is clicked, the label software of the present embodiment displays the entire operating menu for the project of the label software. FIGS. 39 to 42 show an illustrative display of an operating menu when the state of "all display" is specified for the label in the normal mode, an illustrative display of the operating menu when the state of "all hide" is specified for the label in the normal mode, in the present mode, an illustrative structure of a desktop screen in the past mode and an illustrative structure of a desktop screen in the future mode, respectively.

Figure 43A:
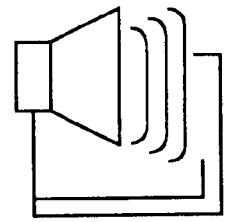
FIGS. 43A, 43B, 43C and 43D illustrate different icons for the present, past and future modes.

The icons IL are adapted for being different in color in the present, past and future modes. The icons of different designs are displayed in the "all hide" state and "all display" state for the present mode. For example, FIGS. 43(a), (b) and (c) show an example of the icon IL of the present mode, an example of the icon IL of the future mode and an example of the icon IL in the "all hide" state, respectively. This permits the user to know the current state visually without opening the menu on the task tray TT (menu of FIGS. 39 to 42). The menu in the icon IL on the task tray TT will be explained in detail subsequently.

In the label software of the present embodiment, there exist no main menu itself, however, the variable menus, such as those described above are displayed. The menus displayed are the menu button MB on the label L, menu button mb on the time view console TVC and the context menu (menu displayed on clicking the right button of the mouse or pressing the application key).

First, the items of the pull-down menu displayed on clicking the menu button MB on the label window are explained. The menus by the menu button MB of the label window contain menu items for the entire operations concerning the label. Among the items of the operating menu for the label, there are such items as "time view mode", "text", "sound", "picture", "memo", "link", "label", "arraying", "background color", "layout", "property", "file" or "label deletion".

The menu item "time view" are used for switching display/non-display of the above-mentioned time view console.

The menu items of the "text" are those concerning the editing of texts by the above-mentioned word-processor software and are typified by "text editing", "clipping", "copying", "pasting", "deleting", "word-wrapping" and "font". In "Text editing", the text pasted on the label can be clipped into a clipboard. In "copying", the test pasted on a label can be copied into the clipboard. In "deleting", the text pasted on the label can be deleted. In "word-wrapping", word-wrapping occurs in displaying the text. In "font", the font used for text display can be set.

The menu item "sound" is used for operating the sound, and is typified by "play", "clipping", "copying", "pasting", "deleting", "start" and "set to original size". In the item "play", the sound object can be reproduced by e.g., a music-related operating tool. In the item "pause", the stop operation becomes possible during sound reproduction. In the item "sound recording", the sound can be recorded newly. In the item "clip", the sound object pasted on a label can be clipped on a clipboard. Int the item "copy", the sound object pasted on a label can be copied on a clipboard. In an item paste"", the sound object on the clipboard can be pasted on a label. In an item "delete", a sound object can be deleted.

The menu item "picture" operates on a picture and includes such items as "display of a captured picture", "shot", "clip", "copy", "paste", "delete" and "change to original size". In the item "display the captured picture", an application for capturing a picture, such as still/moving picture capture tool, as described above, is started to display a finder. In an item "shot", a captured picture can be pasted on a label. In an item "clip", a picture pasted on a label can be clipped on a clipboard. In an item "copy", the picture pasted on a label can be copied on a clipboard. In an item "paste", the picture on the clipboard can be pasted on a label.

In an item "delete", the picture pasted on a label can be deleted. In an item "set to original size, the picture can be displayed to an original size".

The menu item ""memo" is for an operation for handwriting memo by the above-mentioned handwriting tool and includes such items as "clip", "copy", "paste", "delete", "start" and "set to original size". In the item "clipping", the handwritten memo pasted on a label can be clipped into a clipboard. In the item "copying", the handwritten memo pasted on a label can be copied into a clipboard. In the item "pasting", the handwritten memo in a clipboard can be pasted on a label. In the item "deleting", the handwritten memo pasted on a label can be deleted. In the item "start", a handwriting application for reading the handwriting input through a touch-pad can be started. In the item "set to original size", a picture of the handwritten memo can be displayed with an original size.

The menu item "link" concerns the link operation and comprises such items as "link editing", "opening the link", "clipping", "copying", "pasting" and "deleting". In the item "link editing", the link pasted on the label can be edited on a dialog. In the item "opening the link", the file path pasted on the label or corresponding to the URL can be opened. For example, in the case of a web (Web) page, the browser can be started to display the page. In the item "clipping", the link pasted on a label can be clipped into a clipboard. In the item "copying", the link pasted on a label can be copied into a clipboard. In the item "pasting", the link in the clipboard can be pasted on a label. In the item "deleting", the link pasted on the label can be deleted.

The menu item "label" concerns the operation on the label and includes such items as "always forward" and "backward". In the item "always forward", labels can always be displayed ahead, whereas, in the item "backwards", labels can be displayed at the rearmost position.

The menu item "arraying" concerns the operation of arraying labels and include such items as "arraying at the left end of a picture", "arraying at the right end of a picture" and "arraying at the lower end of a picture". In these items, the labels can be arrayed at the left end, an upper end, a right end and at a lower end of the picture, respectively.

The menu item "background color" concerns the operation on the background color of a label. The background color of a label can be set on selecting the menu items of the menu item "background color".

The menu item "layout" concerns the label layout operation and includes such items as "re-layout by default", "custom layout", "expand/contract to label size", "keep the picture aspect ratio", "set picture to original size" and "set handwritten picture to original size". In the "re-layout by default", re-layout becomes possible with layout default. In the item "custom layout", layout by a user is possible. In the item "expand/contract to label size", the pasted object can be expanded/contracted to the label size when the label size is changed. In the item "keep the picture aspect ratio", the aspect ratio of the original picture can be kept in re-sizing a picture. In the item "set handwritten picture to original size", the handwritten picture can be displayed to the original size.

With the menu item "property", the label property can be displayed.

The menu item "file" is used for file operation and includes "import" and "export". With the item "import", it is possible to paste file data (text data, picture data and sound data. With the item "export", it is possible to write object data into a file.

In the menu item "label deletion", it is possible to delete labels.

The context menu by an application key on a label window is now explained. In the context menu on the label window, menu contents are changed depending on which position on the label has been clicked by the right button of the mouse. Specifically, the menu contents are changed depending on whether the position clicked by the right button of the mouse is on the "text object", "picture object", "play/pause button PB or on the stop button SB", that is on the "sound object", on the "link button LB or on the" link object, on the "handwritten picture" or on other sites (on the "label"). The menu items represented on these five sites on the label are hereinafter explained. The contents actually displayed are the same as explained in connection with the button menu MB on the label L and hence are not explained for simplicity.

The context menu on the "text object" includes such items as "text editing", "clipping", "copying", "pasting", "deleting", "word-wrapping", "font", "import file" and "export file".

The context menu on the "picture object" includes such items as "display capture picture", "shot", "clipping", "copying", "pasting", "deleting", "set to original size", "import file" and "export file".

The context menu on the "sound object" includes such items as "play", "pause", "stop", "record", "clipping", "copying", "pasting", "deleting", "import file" and "export file".

The context menu on the "sound object" includes such items as "link editing", "open link", "clipping", "copying", "pasting" and "deletion".

The context menu on the "handwritten picture" includes such items as "clipping", "copying", "pasting", "deletion", "start" and "set to original size".

The context menu on the "handwritten picture" includes such items as "insert/edit", "always ahead", "backward", "array", "layout", "background color", layout", "property", "import file", "export file" and "label deletion". The context menu on the "insert/edit" includes such items as "text editing", "recording", "shot", link editing", "display capture picture" and "from clipboard". The context menu on the "array" includes such items as "array to the left end of picture", "array on upper end of picture", "array on right end of picture" and "array on lower end of picture".

The context menu on the "layout" includes such items as "Re-layout", "custom layout", "expand/contract to label size", "keep picture aspect ratio", "set picture to original size" and "set handwritten picture to original size".

The context menu on the "custom layout" includes such items as "re-layout by default", "expand/contract to label size", "keep picture aspect ratio", "set picture to original size", "set handwritten picture to original size" and "edit end".

The pull-down menu item by clicking the menu button mb of the bar-state time view console is explained. The menu by the menu button mb of the time view console include menu items of the entire operations concerning the time view mode. The menu by the menu button mb of the time view console includes menu items of the entire operations concerning the time view mode. The operating menu items in the time view console include such items as "addition of new labels "current time", "advance time", "delay time", "time increasing/decreasing interval", "time view sound", "display capture picture", "label", "array", "project", "setting", "retrieve help", "on label software" and "close console". Meanwhile, explanation on the menu overlapped with the task tray icon as later explained is omitted.

In the item "add new label", the label formulated during the operating time (as from the current time) can be added. The item "addition of new label" includes such items as "text label", "sound label", "from capture picture", "from clipboard" and "from import file".

In the item "current time", it can be set to be synchronized to the current time.

In the item "advance time", it becomes possible to advance time in the future direction with the time increasing/decreasing interval as set.

In the item "delay time", it becomes possible to advance time in the past direction with the time increasing/decreasing interval as set.

In the item "time increasing/decreasing interval", it is possible to set the specified time increasing/decreasing step used in time increasing/decreasing with the specified time increasing/decreasing step. The item of the "time increasing/decreasing interval" includes such items as the "100 years", "10 years", "1 year", "1 month", "1 day", "1 hour", "1 minute", "1 second" and "varying time point". With the item "varying time point", the label state such as label preparation/correction/discarding is moved to a varied step, so that the time interval is not constant.

The item of the "label" includes such items as "all display", all hide"" and "all delete".

The item of the "array" includes such items as "arraying at the left end of a picture", "arraying at the upper end of a picture" "arraying at the right end of a picture" and "arraying at the lower end of a picture".

The item of the "project" includes such items as "new preparation", "open", "close", "import", "export" and "property".

With the item "close console", the time console can be closed to return to the current state.

The window menu item of the time view console in the floating state is explained. The window menu item of the time view console in the floating state includes such items as "file", "addition of new label", "time", "label" and "help".

The item "file" includes such items as "display capture picture", "project", "time view sound", "set" and "close console", whilst the item "project" includes such items as "new preparation", "open", "close", "import", "export" and "property".

The item "time view sound" includes such items as "set" and "close console".

The item "time view sound" includes such items as "text label", "sound label", "from capture picture", "from clipboard" and "from import file".

The item "time" includes such items as "current time", "advance time", "retract time", "100 years", "10 years", "1 year", "1 month", "1 day", "1 hour", "1 minute", "1 second" and "varying time point".

The item "label" includes such items as "arraying at the left end of a picture", "arraying at the upper end of a picture" "arraying at the right end of a picture" and "arraying at the lower end of a picture", "display all", "hide all" and "delete all".

The item "help" includes such items as "retrieve help" and "on label software".

The context menu by the application key on the time view console is now explained. Meanwhile, the contents really executed are the same as those explained in connection with the menu button mb on the time view console and hence are not explained specifically.

The context menu on the time view console includes such items as "current time", "advance time", "retract time", "time increasing/decreasing interval", "time view sound and" close console. The item "time increasing/decreasing interval" includes such items as "100 years", "10 years", "1 year", "1 month", "1 day", "1 hour", "1 minute", "1 second" and "varying time point".

The context menu by the application key on the background window in the time view mode is now explained. Meanwhile, the contents really executed are the same as those explained in connection with the menu button mb on the time view console and hence are not explained specifically.

The context menu on the background window in the time view mode includes such items as "addition of new label", "current time", "advance time", "retract time", "time increasing/decreasing internal" and "close console.

In the item "addition of new label", the label formulated during the operating time (as from the current time) can be added. The item "addition of new label" includes such items as "text label", "sound label", "from capture picture", "from clipboard" and "from import file". The item "time increasing/decreasing interval"includes such items as "100 years", "10 years", "1 year", "1 month", "1 day 1 hour", "1 minute", "1 second" and "varying time point", The context menu in the icon of the label software displayed on the task tray TT is explained.

The contest menu by the icon on the task tray TT includes such items as "add new label", "time view mode", "time view sound", "display capture picture", "label", "array", "project", "set", "retrieve help", "on label software" and "end".

The items "add new label" includes such items as "text label", "sound label", "from capture picture", "from clipboard" and "from import file". With the item "text label", it is possible to prepare a void label to place it on the desk top. If setting of the label software is made so that the time of preparation will be displayed, the time of preparation is introduced. With the item "sound label", it is possible to prepare the label and to place it on the desktop. Sound recording is started as soon as the label is prepared. If setting of the label software is made so that the time of preparation will be displayed, the time of preparation is introduced. With the item "from capture picture", it is possible to acquire the capture picture from the retrieving application of the capture picture, to prepare the label using the picture and to place it on the desktop. If setting of the label software is made so that the time of preparation will be displayed, the time of preparation is introduced. With the item "from clipboard", it is possible to prepare a new label from data on the clipboard to place it on the desk top. The form of the clipboard that can be handled here is the memo from the text, picture and from the handwriting application. If setting of the label software is made so that the time of preparation will be displayed, the time of preparation is introduced. If the data from the clipboard is the text, the time of preparation is displayed on the leading line and the text in the clipboard is displayed from the second and following lines. With the item "from import file", it becomes possible to prepare a new label from the file data to place it on the desktop. The form of the file form that can be handled here is the memo from the text, picture, sound and from the handwriting application. If setting of the label software is made so that the time of preparation will be displayed, the time of preparation is introduced.

With the item "time view mode", it is possible to switch the display/non-display of the time view console.

With the item "time view sound", it is possible to switch the on/off of the sound generated during the time view mode.

With the item "display capture picture", it is possible to start the retrieving application of the capture picture to display the finder for picture retrieval.

The item "label" includes such items as "display all", "hide all" and "delete all". In the item "display all", it is possible to display all labels. In the item "hide all", it is possible to hide all labels temporarily. If the icon IL on the label software on the task tray TT, this attribute is reset to display all labels. If the label software is re-started, this attribute is reset. With the item "delete all", all labels currently displayed can be deleted.

The item "array" includes such items as "arraying at the left end of a picture", arraying at the upper end of a picture" "arraying at the right end of a picture" and "arraying at the lower end of a picture".

The item "project" includes such items as "new preparation", "open", "close", "import", "export" and "property". With the item "new preparation", it is possible to close the currently open project to prepare a new project. With the item "open", it is possible to it is possible to close the currently open project to open another project. With the item "close", it is possible to close the currently open project. With the item "close", it is possible to close the currently open project. With the item "import",it is possible to add a label of another project of an archive form to the currently open project. With the item "export", it is possible to export a project as a file (archive). With the item "property", it is possible to display the project property.

With the item "set", the label, default layout, sound, image and the environment can be set.

With the item "retrieve help", help can be displayed.

With the item "label software", the version information etc of the label software can be displayed.

With the item "end", the label software can be brought to a close.

With the label software of the present embodiment, "operation on a project", "operation on a label", "operation on a time view", "operation on a keyboard/mouse" and "operation on a jog dial" are possible.

The operation on a project" is first explained.

A project manages the entire labels belonging to the project. The label software of the present embodiment is so formulated that a project will necessarily be opened on actuation.

In the light source of the present embodiment, project is formulated on initial startup and when a new project preparation is selected from a menu. When preparing a new project, the project name is set and, if there is any pre-existing project, such project is closed to open a new project.

A project is made up of a project file, a label file or a project archive file. The project file has the information on the entire project and a label list, there being one project file for each project.

The label file has the information for individual labels, such as object information, there being one label file for each label. The project archive file is the project information and the information on plural labels contained in the project, and is prepared when exporting the project. The contents are a project achieve prepared at the outset, such that, when preparing a project, the contents can be contained in the newly prepared project. The project file and the label file belonging to the project file are present in one folder.

Figure 44:
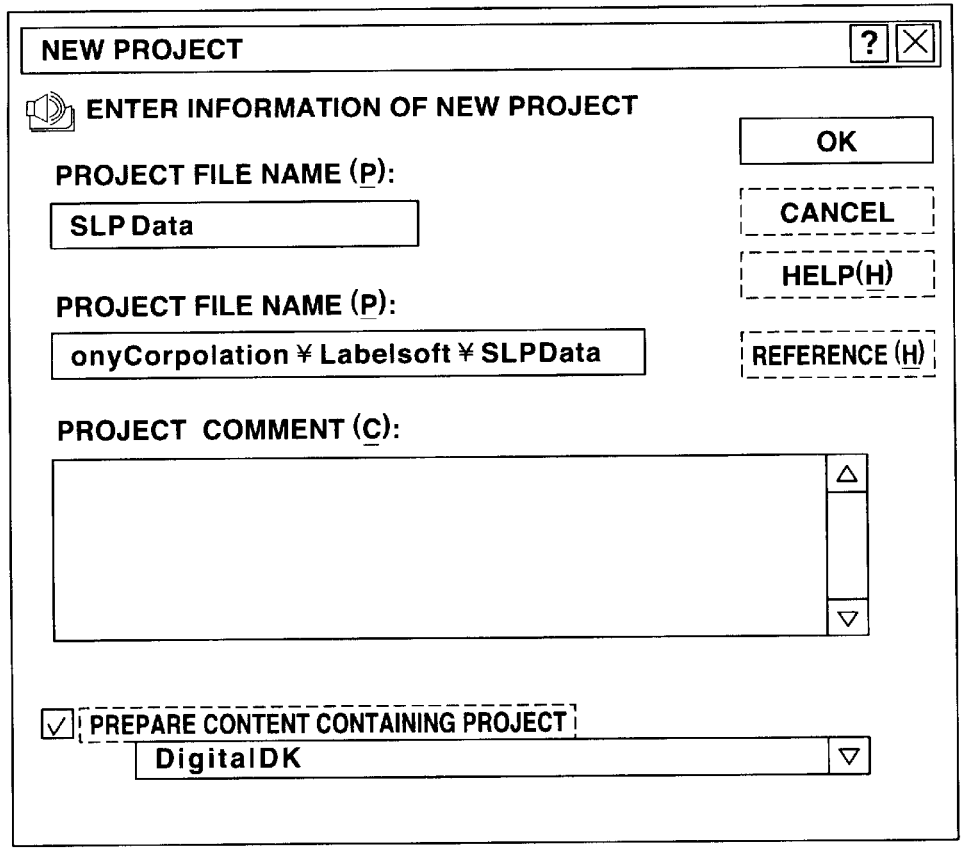
FIG. 44 illustrates an exemplary display of a new project preparation dialog.

When preparing the project, a dialog shown for example in FIG. 44 is displayed. The user enters a project name by this dialog. In this figure, the project naine is the name of the lowermost folder of the project, and is entered as the project file name. Meanwhile, the pre-existing project name cannot be used. As the project name, a project comment containing up to a maximum of 127 letters can be entered.

When preparing the project, the folder of the project name is formulated and a project file is prepared there below. The as-prepared project has no labels. However, if designation is made to include the contents, the label information is captured from the archive. The operation of capturing the contents is the same as the import of the project as later explained. When preparing the project, the time information at the time of the project preparation is recorded as the internal data.

The project is opened on startup of the light source of the present embodiment or on designation from the console menu. Meanwhile, on startup of the label software, the project opened at the time of previous termination is opened. When the project is opened, the label belonging to the project is displayed on the desktop based on the time information and the position information. Two or more projects cannot be opened simultaneously, so that, if there is any opened project, such project is closed.

When the project is closed, the currently opened project is closed. At this time, the labels belonging to the opened project are closed.

The project import means adding the entire labels contained in another project in the archive form to the currently opened project. In importing the project, the file dialog is first opened on designation of the import menu. By this file dialog, the project archive file which the user desired to add is designated. On selection of the project archive file, a filter for checking the archive type is executed. The archive type of the label encompasses three types, namely "no correction", "set the current time as start tine" and "ask user as to start time". Meanwhile, the archive type "no correction" is directly imported, without correcting the archive information.

Figure 45:
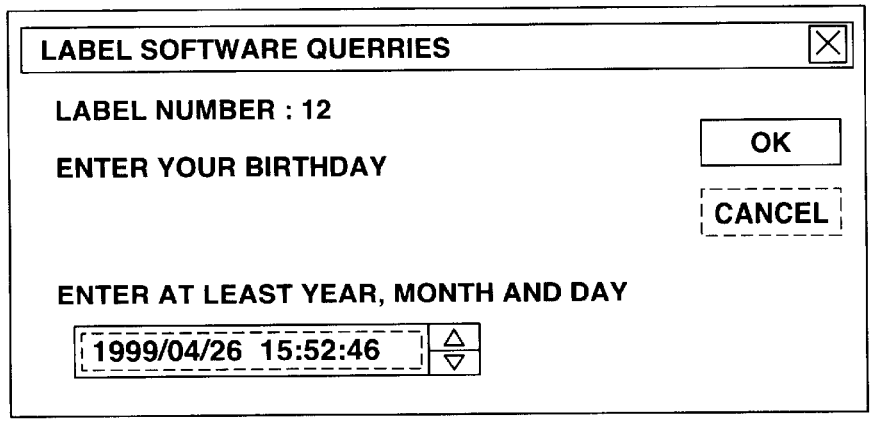
FIG. 45 shows an exemplary display of a time setting dialog at the time of importing for showing the project information.

When inquiring the user about the start time, a dialog specifying the input time and the minimum time units to be specified, as shown in FIG. 45, is displayed as the dialog for time setting for import. The user enters the start time by this dialog.

Figure 46:
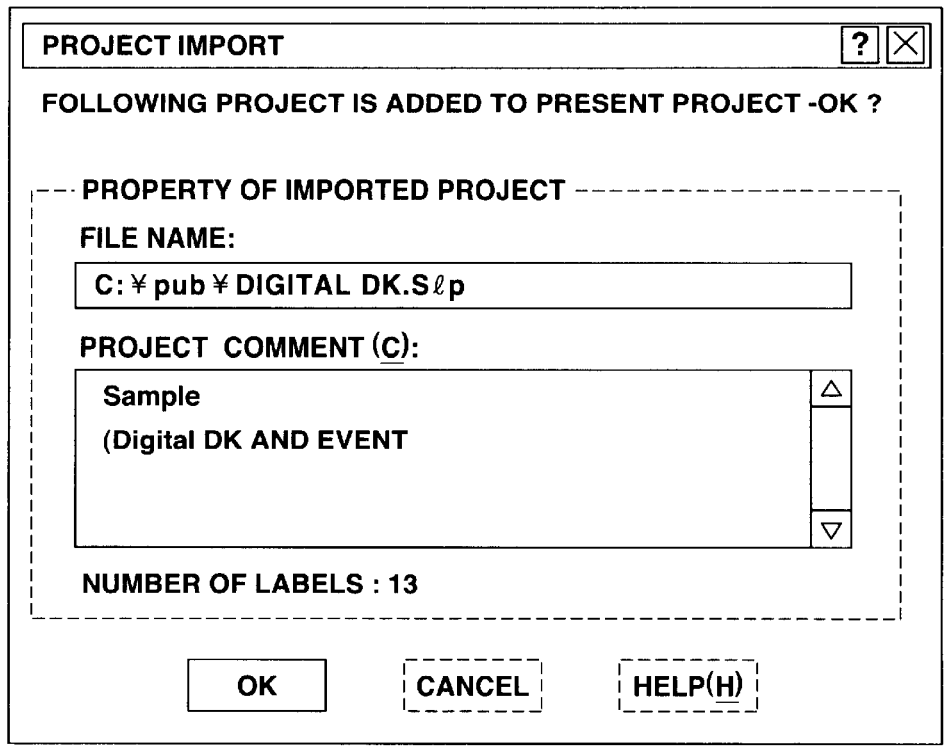
FIG. 46 shows an exemplary display of a project import dialog.

When the start time is inputted by the user by the dialog shown in FIG. 45, the dialog shown for example in FIG. 46 is opened after executing the file. The dialog shown in FIG. 46 is an import dialog of the project displaying the project information. When the import is executed, the data of the entire labels of the selected project archive file are copied in the currently opened project, along with the label file.

Figure 47:
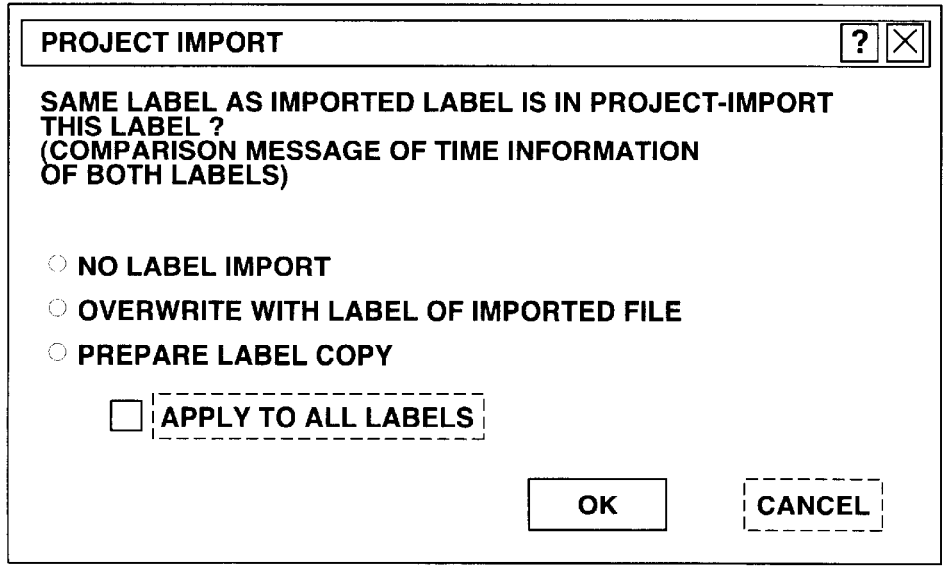
FIG. 47 shows an exemplary display of a dialog specifying an import method.

If there are such files for import having the same hysteresis as that of the label present in the current project, or if the entire hysteresis of one of the labels are fully coincident with the partial hysteresis of the other label, there is displayed a dialog designating the importing method, as shown for example in FIG. 47. On the dialog of FIG. 47, it is displayed whether both labels are identical or which one of the labels has a longer hysteresis. In the example of FIG. 47, it is possible to select a desired one of the respective items from the items "no labels are imported", "label overwriting with the import file" and "prepare label copies".

Figure 48:
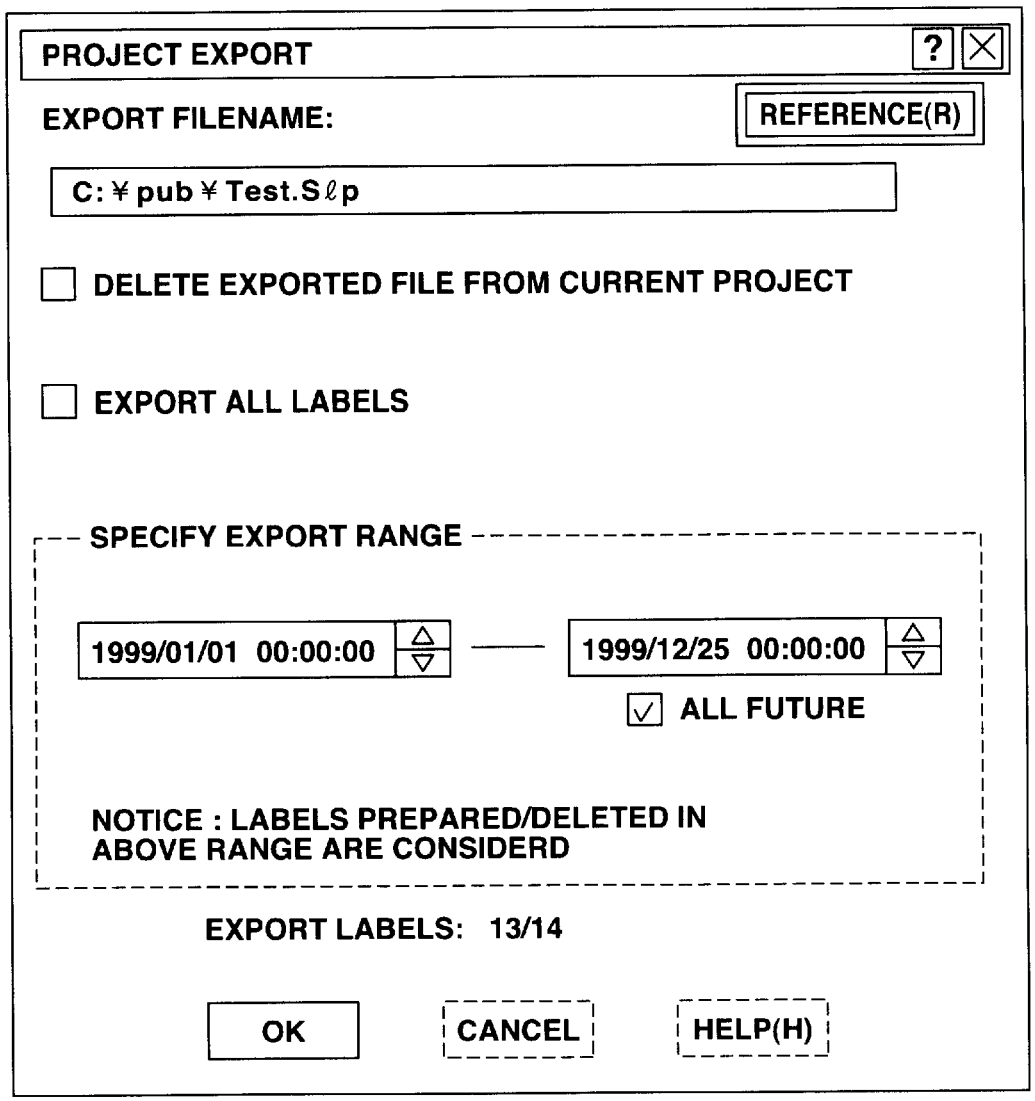
FIG. 48 shows an exemplary display of a project export dialog.

In the label software of the present embodiment, the labels contained in a project can be collectively saved in a sole archive file, that can be captured into another project, as the project export. In exporting the project, the dialog of the export of the dialog shown for example in FIG. 48 is displayed on the desktop. On the dialog of FIG. 48, respective settings "export file name", "is the export file deleted from the current project?" and "are all labels exported or are labels the generating and deleting time points are both included in the specified time range to be exported?" are made to prepare a project archive file. At the lower and of the picture of the dialog is displayed the number of the labels to be exported. The label export here means exporting the entire hysteresis of the label.

Figure 49:
FIG. 49 shows an exemplary display of a project property dialog.

If then the user selects the project property, the label software of the present embodiment displays the dialog shown for example in FIG. 49 on the desktop. In this dialog, such items as "project holder", "project command", "project preparing time and ultimate updating time", "number of labels (total number, past, present and future)" and "range of existence of labels" are displayed. In the "project folder" is displayed the project folder name, whereas, in the "project command", the explanation on the project asset on new preparation is displayed. The information in this "project command" can be edited. The "range of existence of labels" denotes the range of existence of labels, specifically, the range from the oldest hysteresis of the entire labels (time of preparation of the oldest label) up to the latest hysteresis. If there is any label the time of deletion of which is not specified, a check mark is attached to the item "there is a label the time of deletion of which is not specified".

The "operation on the label" is explained.

As the "operation on the label", such operations as "new preparation", "addition of objects", "correction of object", "layout", "arraying", "property", "import and export of object" and "label deletion" are possible.

With the "new preparation", among the operations on the labels, an object inserted first can be specified when newly preparing the labels. Among the labels, newly prepared, there are "text level", "sound level", "from capture picture retrieving software", "from clipboard" and "from import file". In the newly prepared labels, the label preparing time, as a text object, is displayed in addition to the above object. Meanwhile, whether or not the time of preparation is to be displayed can be set by the setting picture. Each object is displayed in accordance with the default layout as later explained. A label file for storing the information on a label is prepared simultaneously with the new preparation of the label.

The "new preparation" includes new preparation for the future mode. That is, in the time view mode, labels prepared in future (future labels) can also be added. In the new preparation for the future mode, when the new preparation of the label is selected by a user, a property picture for the new label, shown in FIG. 50, is displayed. When the user sets the label start time, label end time, repetition and alarm, the future label can be newly prepared. Meanwhile, the default value of the display time of the property picture of FIG. 50 is the operation time at the time point and continuation is checked (on).

In the operation for the label "object addition", an object can be added to the label currently displayed. For newly inserting an object, the respective menu items "text", "sound", "picture", "handwriting memo" and "link" are specified by the user from the menu button on the label. In the menu item "text", respective operations of text editing, pasting, import file, and drag/drop operations are possible, whereas, in the "sound" menu item, respective operations of recording, importing files and drag/drop operations are possible. In the menu item "picture", respective operations of shot, pasting, importing files and drag/drop operations are possible, whereas, in the "handwriting memo" menu item, the operation of pasting is possible. In the menu item "link", respective operations of link editing, pasting, importing files and drag/drop operations are possible. Meanwhile, two or more objects cannot exist for a sole label.

In the operation on the label "object addition, "object addition by drag/drop", "addition of object position and size" and "addition at the time of time view".

In the "object addition by drag/drop", if the file icons of the text, sound and the picture are dragged and dropped in sites other than the label link button, respective objects are inserted into the label. On the other hand, if an optional file icon is dragged and dropped on the label or on the link button, as e.g., the control key and the shift key on the keyboard are pushed simultaneously, the path of the file is added as the link object.

In the "addition of object position and size", the size and the position of the added object follow the parameters of the default layout. If the test object and the picture object are set so as not to overlap with each other and if one of the objects is added newly, it is inserted below the pre-existing object.

In the "addition at the time of time view", if the time view mode is the present mode, the operation similar to that for the normal mode can be made. If the time view mode is the future mode, an object can be added to the future label. As to the operation of object addition, only ultimate results are recorded and become the initial setting for the label display. As for the label that cannot be added, the label frame is displayed in a purple color (present level) or in a blue color (past level).

In the operation on the label "object correction", "text correction", "sound correction", "picture correction", "correction of handwriting memo", "link correction", "correction in time view mode" and "pasting from clipboard" are possible.

Figure 51:
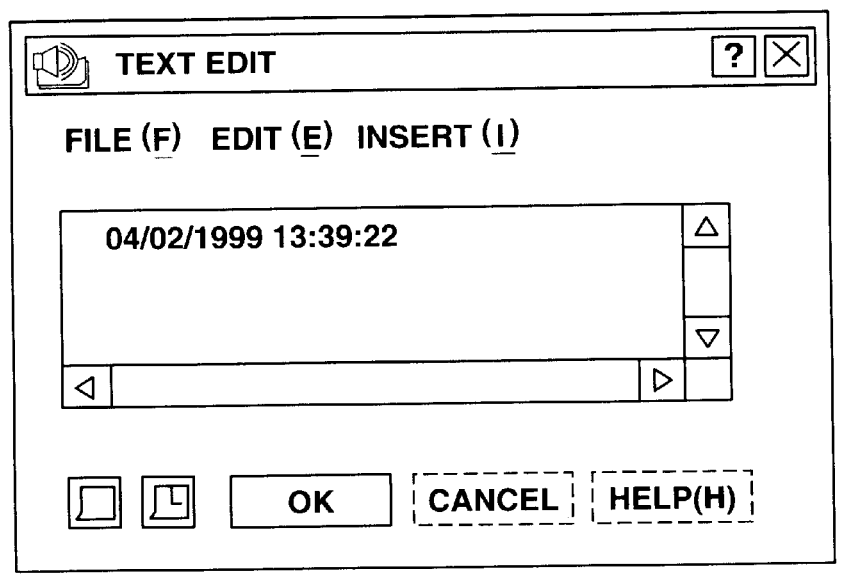
FIG. 51 shows an exemplary display of a text editing dialog.

In the "text correction", if the text editing item is selected by the user from the menu button MB, or the context menu mb, and the menu is selected, the editing dial having the present text as shown for example in FIG. 51 is opened. In the dialog of FIG. 51, there are menus "file", "edit" and "insert" in the text editing menu. The "file" has such items as "import file" and "text editing end", such that, in the "import file", the text file can be selected and inserted, whereas, in the "text editing end", the text editing can be closed to reflect the text contents in the label. In the menu item "edit", there are such items as "reset", "clip", "copy", "paste", "delete" and "select all". In the menu item "insert", there are such items as "current time and date" and "time and date of preparation". In the "current time and date", the time and date of the present (real time) is inserted, whereas, in the "time and date of preparation", the label preparing time is introduced.

Figure 52:
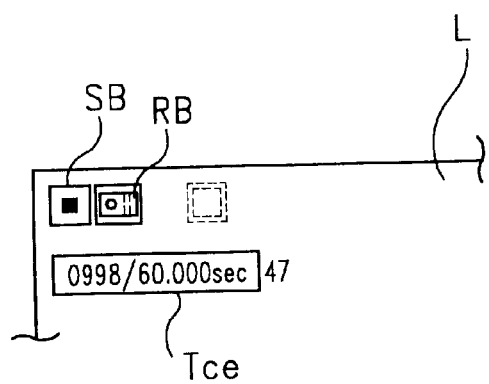
FIG. 52 illustrates the manner in which a tool chip indicating the recording and the maximum recording time on recording selection and the play button are changed to a recording button.

The "sound correction" is possible when the user selects the recording with the menu button MB or the context menu. There is displayed on the label a tool chip TCT indicating the recording time and the maximum recording time, as shown in FIG. 52, whilst the play button PB is changed to the recording button RB to advise the user of the fact that recording is going on. If the recording button RB is pushed during recording, the recording is paused and, if the recording button RB is pushed again, the recording is performed as from the paused point. In the "sound correction", the existing sound data is overwritten.

In the "picture correction", it is not possible with the label software of the present embodiment to correct the pre-existing picture object. For changing (correcting) the picture, a picture object is introduced to take the place of the pre-existing existing picture object.

For directly correcting the handwriting memo prepared by the handwriting application, for performing the "correction of the handwriting memo", the handwriting application start is selected from the menu button MB or the context menu. After editing by the handwriting application, pasting of the edited memo in the menu button MB or the context menu is selected and newly introduced into the label.

Figure 53:
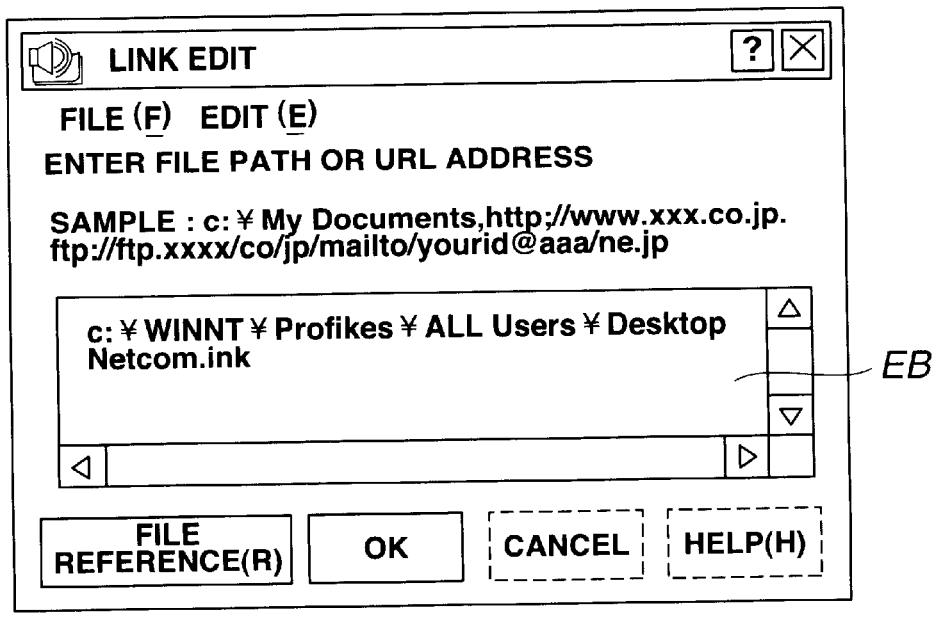
FIG. 53 shows an exemplary display of a link editing dialog.

The "link correction" is enabled by the user selecting the link editing item from the menu button MB or the context menu. That is, when the user selects the item of link editing, the label software of the present embodiment displays an editing dialog, having the current link, as shown for example in FIG. 53, on the desktop. The editing dialog of the link has an editing box SB and a file reference button. In the dialog editing box SB are stated URL such as the paths of the file or folder and the home page address. For example, if the "file reference button" is pushed, the file dialog is displayed. By selecting the file to which the link is desired to be produced, the path to the file is inputted to the edit box SB. The menu item of the dialog box of the link includes "file" and the "edit". The menu item of the "file" includes such items as "reference" and "end of link editing". The item "reference" is selected from the file dialog and is the same as the file reference button. The "end of link editing" closes the link correction picture to reflect the link contents in the label. The menu item "edit" includes such items as "reset", "clip", "copy", "paste", "delete" and "select all". These contents are standard operations and are not explained specifically.

As the "correction at the time of time view mode", it is possible to correct the object for the label newly displayed for the future in the time view mode. As for the object correction operation, only the ultimate results are displayed to effect initial setting at the time of label display.

Figure 54:
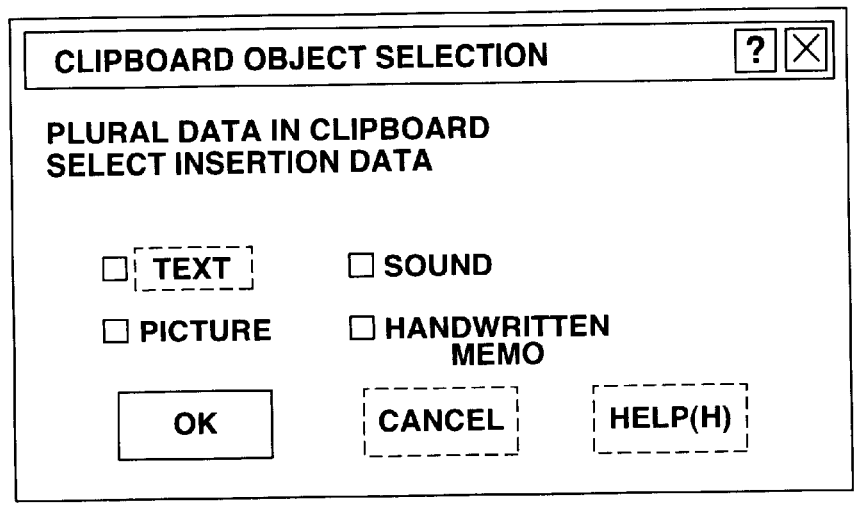
FIG. 54 shows an exemplary display of a clipboard object selection dialog.

In the "pasting from clipboard", the text, bitmap picture, WAVE file and the handwriting memo in the clipboard can be pasted on the label. If only one object that can be pasted on the label is present in the clipboard, it can be pasted on the label. If two or more objects that can be pasted on the label are present in the clipboard, a dialog such as one shown in FIG. 54 is displayed on the desktop. Here, a check box of data present in the clipboard is enable for display and checked data is pasted as a label object.

The "layout" for the label is determined with the default layout as a reference. It is noted that this setting of the default layout is utilized during label preparation and during addition of new objects. The default layout may also be used when the user manifestly selects the re-layout command.

Figure 55:
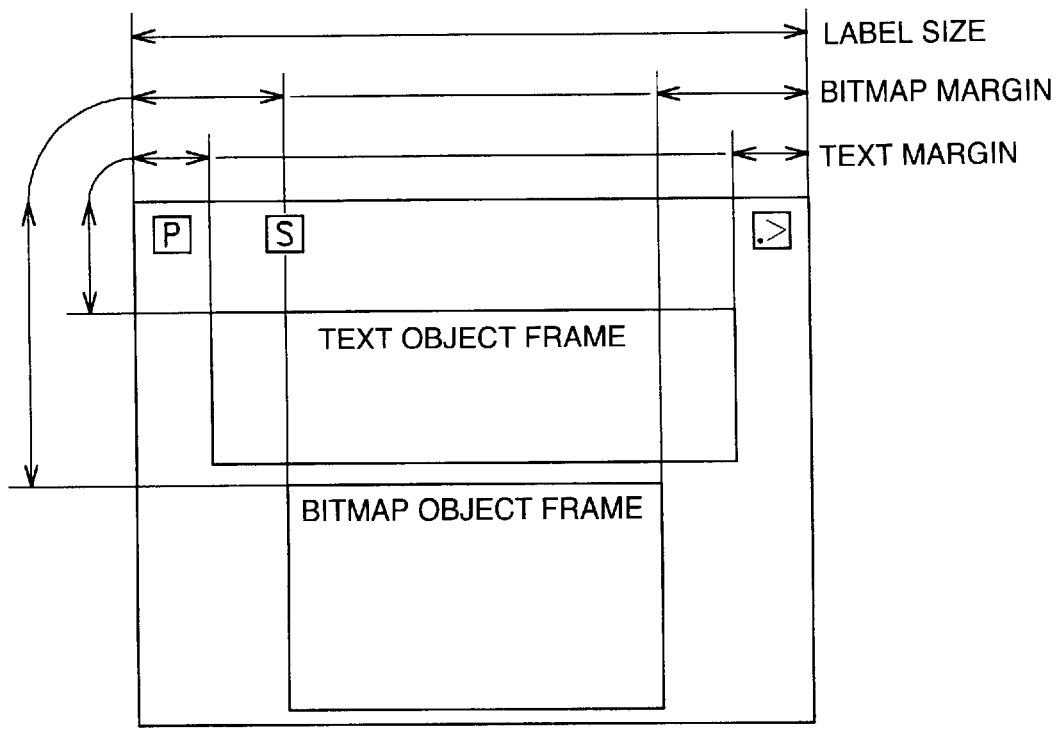
FIG. 55 illustrates the definition of a text margin and a picture margin.
Figure 56:
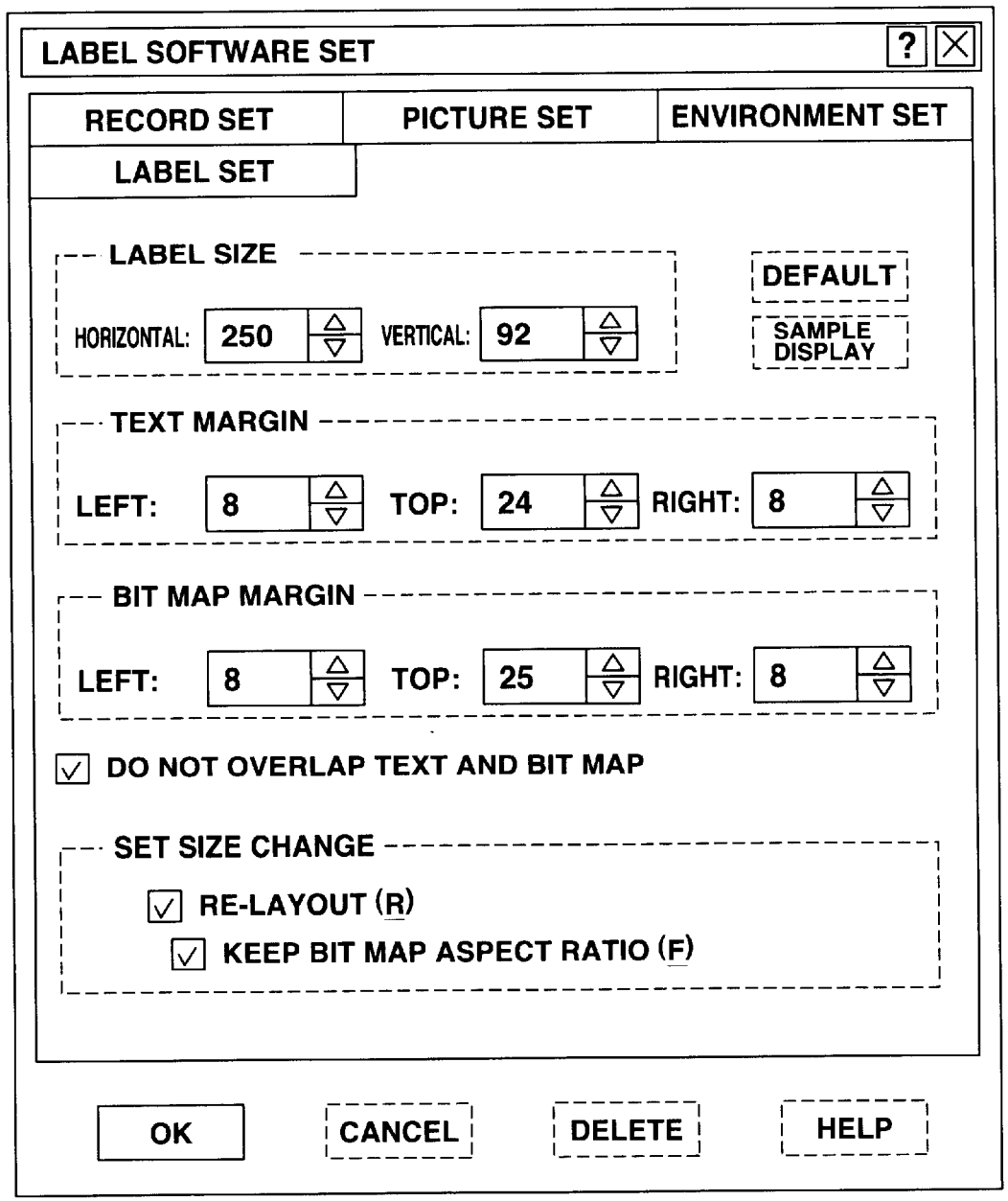
FIG. 56 shows an exemplary display of a dialog when the default label layout is selected in the label setting dialog.

In the default layout, there are parameters such as "label size (X×Y)", "text margin (left end, upper end, right end)", "picture margin (left end, upper end, right end", "layout to evade the text overlapping with the picture" and "setting as to size change (re-layout and keep picture aspect ratio)". The "label size" is used so that the horizontal direction will be of the maximum size and the vertical direction will be of the minimum size. The "text margin" and "picture margin" are defined as in FIG. 55 and set by the dialog shown in FIG. 56. The vertical size of each object in the vertical direction is determined and stretched/contracted by the object data. If, as a result of stretching and contraction, the text object overlaps with the picture object, the lower object can be moved further downwards to evade overlap (setting item: layout to evade overlapping of the text with the picture).

Figure 57:
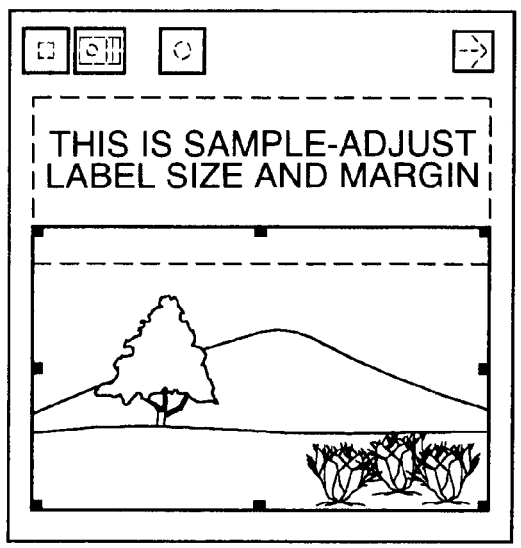
FIG. 57 illustrates the label layout operation by dragging with a sample being displayed.

For the operation when the label size is changed, there are two settings. One of these settings (re-laying out) is to lay out the object again if the label size is changed. In the absence of setting, the size of the internal object is not changed despite size changes in the label. The second setting (keeping the picture aspect ratio) is the setting as to whether or not the aspect ratio is to be kept in case there is change in the picture size. The above setting is made in a default label layout picture of the setting dialog of the present embodiment of the label software shown in FIG. 56. This setting may be made by displaying and dragging a sample, in place of inputting a numerical figure, as shown in FIG. 57.

Figure 58:
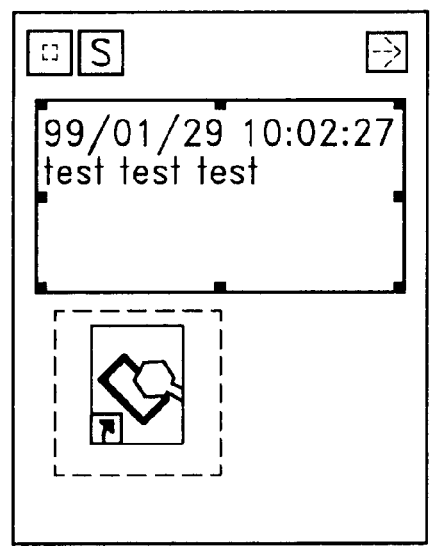
FIG. 58 shows an exemplary display of a label during customary layout execution.

With the present embodiment of the label software, layout can freely be customized by a user from one label to another in place of the default layout. For example, if a custom layout item is provided as the menu item, and the custom layout is executed, the label L is displayed as shown for example in FIG. 58. There is drawn a dotted-line frame circumscribing each object and the mouse can be dragged and dropped within this frame for movement. Moreover, with the present embodiment of the label software, the object size can be changed. For changing the size, the object is clicked to the selected state, in which state the label frame line is changed from a dotted line to a solid line. In addition, handles (e.g., a black small square) is displayed in the four corners and on the four sides. These handles can be dragged and dropped to change the object size.

Meanwhile, in the label software of the present embodiment, if, in changing the label size, automatic stretching and contraction is on and the aspect keeping is on, left and right margins are always kept constant unless the picture is of the minimum size. On the other hand, the margins at the four corners of the text are kept at constant values. In this case, the four corner margins may transgress the label window in the vertical direction of the picture in order to keep the picture aspect ratio. If the automatic stretching/contraction is on and the keeping of the aspect ratio is off, the four corner margins are always kept constant unless the text and the picture are of the minimum size. Also, if the automatic stretching/contraction is off and the aspect ratio is on or off, the text and the picture may transgress the label window. If, in all of these cases, the default layout is selected, the label size or the left-right margins and the upper margin are set at default values. The heights of the label, text and the picture are automatically adjusted to values which are sufficient to display the picture. The values which are sufficient to display the picture are those with which all pictures can be displayed. The values which are sufficient to display the text are those with which all picture portions can be viewed with the correct aspect ratio. A lower margin of the same size as the upper margin is added to the label.

The "arraying" of the operation on the label includes "arraying at the left end of a picture", "arraying at the upper end of a picture" "arraying at the right end of a picture" and "arraying at the lower end of a picture" as sorts of arraying. In the arraying at the left end of a picture", labels are arrayed side-by-side from the upper left end of the picture in a downward direction. When the lower end of the picture is reached, the labels are arrayed in similar manner with a shift of one row towards right. In the "arraying at the upper end of a picture", labels are arrayed side-by-side from the upper right end of the picture in a rightward direction. When the rightward end of the picture is reached, the labels are arrayed in similar manner with a shift of one row downwards. In the "arraying at the right end of a picture", labels are arrayed side-by-side from the upper right end of the picture in a downward direction. When the lower end of the picture is reached, the labels are arrayed in similar manner with a shift of one row towards left. In the "arraying at the lower end of a picture", labels are arrayed side-by-side from the lower left end of the picture in a rightward direction. When the rightward end of the picture is reached, the labels are arrayed in similar manner with a shift of one row upwards. The labels are arrayed in the sequence in which the labels are registered in a project label list (in the time order of preparation). The labels are arrayed so as not to be overlapped with one another, with the label size being not changed.

In the "property" of the operation on the labels, the property dialog of the label, such as is shown in FIG. 50, is displayed. The property display contents include "label number", "number of times of hysteresis", "term of validity", "setting of repetitive labels" and "alarm setting". In the "label number", a label number unique in the project is displayed. This label number is managed by the label software of the present embodiment and cannot be changed by the user. The "number of times of hysteresis" displays the number of times of correction as from the time of the label preparation. The "term of validity" includes the "time of preparation" and "time of deletion". The "time of preparation" displays the label preparation time. This "time of preparation" cannot be changed except at the time of preparation of a future label. The "time of deletion" is valid only when the continuation is checked. The, "setting of repetitive labels" includes such items as "interval and unit of repetition", "next display start time" and "next display end time". The "alarm setting" includes "time of alarm startup".

In the label software of the present embodiment, the following setting contents of the "continue/discontinue", "repetition setting" and "alarm setting" for the labels can be changed in the label property picture. If, in the item "continue/discontinue", the setting is for "discontinue", the label deletion time can be specified. When the time is the specified time, the label is deleted automatically. If, in the item "repetition setting", the "periodic repetitive label" is checked, repetition setting is made. Moreover, in the item "repetition setting", the interval of repetition, display start time and display end time can be set. In the item "alarm setting", the alarm display time is set at the relative timing relative to the label start time. Meanwhile, the real alarm time is displayed below the alarm setting.

In the label software of the present embodiment, display/non-display can be repeated at regular intervals for the same label. For label repetition, "periodic repetition label (periodic repetition)" is checked in the label property picture of FIG. 50 and the repetition interval, repetition display time and non-display time are set. For example, if a label is to be displayed for five minutes at 12.00 every day, the following setting is used:
repetition: every day
next display start time: YYYY/MM/DD (current date) 12:00:00
next display end time: YYYY/MM/DD (current date) 12:05:00

If, in the label software of the present embodiment, setting is made so that each frame picture of a moving picture is pasted on each of plural labels and so that each label will be sequentially displayed at the same position for a short time, animation-like display becomes possible.

Figure 59:
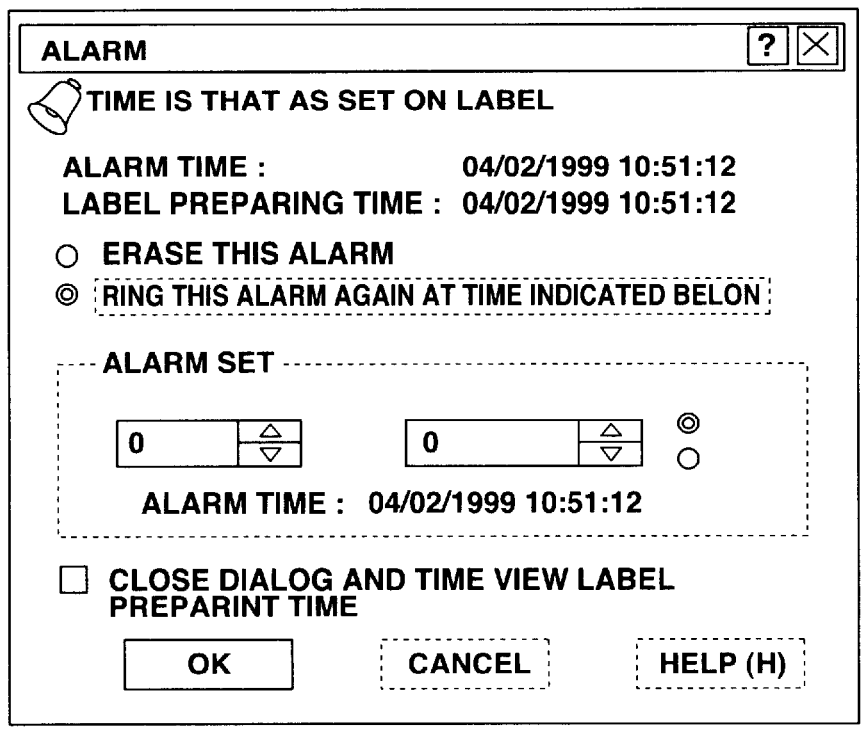
FIG. 59 shows an exemplary display of an alarm dialog.

Moreover, in the label software of the present embodiment, the user may be apprised of an alarm event before or after start of a specified label. For making the alarm notice, an alarm is checked on a property screen of the label of FIG. 50 to set the alarm time. If the alarm time is set in this manner, an alarm dialog, shown in FIG. 59, is displayed on the desk top when the time is the time specified on the alarm. On this alarm dialog are displayed the alarm time and the label preparation time. By acting on this alarm dialog, the user is able to make selection whether the alarm is to be turned off or issued once more. If, the item "time-view the label preparation time after closing the dialog" in the dialog of FIG. 59 is checked and the OK button is pushed, the time view mode is initiated and the operating time is set to the label preparation time.

Then, as the operation for the label "object import/export", the label is able to import and display the text, sound and the picture file. The operation on importing is similar to that when adding and correcting an object. The label object is also able to take out only data as an export file. Among the forms of the file which each object is able to import and export, there are "text: text form (extender:.txt.)", sound; WAVE form (extender:.wav)" ", "picture; bit map form (extender:.bmp)", "GIF form (extender:.gif)" and "JPEG form (extender:.jpg)". In exporting, an object for exporting is determined based on the extender of the export file.

Among the "label deletion" as an operation on the label, there are deletion of the present label and deletion of deletion of a future label.

Figure 60:
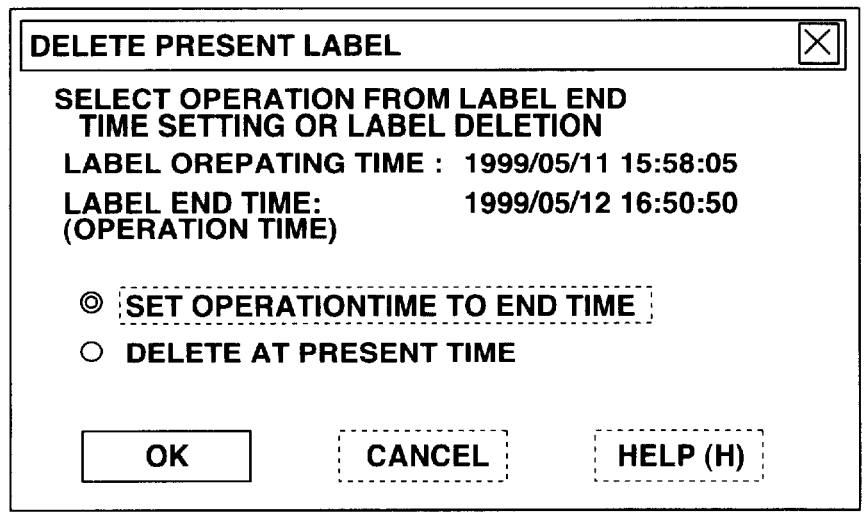
FIG. 60 shows an exemplary display of a current label deletion diagram.

If deletion of the present label is selected, the current time is recorded as the end time and deleted from the picture. However, the label file is not deleted such that the label can be displayed by reversion to the past by the time view mode. If the label is deleted in the future mode of the time view mode, a dialog as shown in FIG. 60 is displayed to permit selection between setting the operating time to the end time or deleting the label at the current time.

If deletion of the future label is selected, the dialog of deletion of a future label as shown in FIG. 61 is opened to render possible the selection between the setting of the operation time to the end time and the complete deletion of the file. If the label is completely deleted, the label file and recording are deleted such that these cannot be displayed again even in the time view mode.

The past label is already deleted and hence cannot be deleted further.

The "operation of time view" is now explained.

In the time view mode, the above-mentioned time view console TVC is displayed. The time operation in the time view mode is done from this time view console TVC. The transition to the time view mode is performed by displaying the time view console TVC by executing a command from a context menu of the label software icon IL of the time tray TT or from the label menu.

After transition to the time view mode, time increase/decrease can be executed by operating the up/down button tub, tdb of the time view console TVC or from the menu. The unit of time change by this time increase/decrease is by the setting of the above-mentioned time increasing/decreasing unit (time increasing/decreasing step).

With the label software of the present embodiment, the label preparation to the past/past label correction cannot be made. Although the past label cannot be corrected, label movement/label size change can be made. However, this operation is not recorded in the project. Also, directly after the end of the operation, such as directly after the end of the mouse drag, the label is restored to the original position/original size. This operation is performed for transiently changing the movement/size change for viewing the label hidden by superposition.

Moreover, in the label software of the present embodiment, a new label can be prepared as a future label distinct from a past label. If a future label is prepared, and the time is restored to the present, the label disappears from the desktop. However, when the time is the time when the future label was prepared, the label is again presented on the desktop. So, the future label can be prepared as a simple reminder. The future label can be corrected in the same way as at the present time. However, the hysteresis of correction is not recorded, in distinction from the case of the current time, such that only the corrected ultimate results are saved. Thus, should there be made correction for future, the ultimate results are used as parameters at the time of label preparation.

The end of the time view mode is achieved by pressing the closure button cb of the time console TVC or selecting the "close time view console" from the menu.

The on/off of the time view sound, furnished during the time view mode, during transition to the time view mode and on termination of the time view mode, may be achieved from the menu.

The operation on the "keyboard/mouse" is explained.

With the label software of the present embodiment, a variety of shortcuts are set as an operation proper to a keyboard.

For example, if the control key and the shift key are pushed simultaneously, or if the shift key, control key and the tab key are pushed simultaneously, the operation of changing the vertical orientation on the window of the labels displayed on the present picture is realized. Meanwhile, the operation at this time is changed with the number of the presently existing labels. For example, of there is not more than one label, no operation occurs. However, a pre-set sound is issued to indicate that the operation is invalid. If there are two or more labels, the control key and the tab key are pushed simultaneously to shift the label lying at the most forward position to the most backward position. Also, if the shift key, control key and the tab key are pushed simultaneously, the label at the most backward position is shifted to the most forward position.

For example, if the delete key is pushed, the presently focussed label is deleted. Before deleting the label, a dialog for inquiring whether or not the deletion is to be made is displayed on the dialog.

Of an escape key is pushed, the presently focussed label is temporarily set to the non-displayed position. The label in the non-display position is again displayed when next the time is changed.

When the control key and the B key are pushed simultaneously, the console is closed during the time view mode. Of the control key and the D key are pushed simultaneously, the presently focussed label is again laid out by default. When the control key and the E key are pushed simultaneously, the text editing of the presently focussed label is opened. If the control key and the L key are pushed simultaneously, the link of the presently focussed label is opened. If the control key and the N key are pushed simultaneously, the text label is prepared. When the control key and the O key are pushed simultaneously, the sound of the currently focussed label is stopped. When the control key and the P key are pushed simultaneously, the label of the currently focussed label is reproduced. When the control key and the R key are pushed simultaneously, the label of the currently focussed label commences to be recorded. When the control key and the T key are pushed simultaneously, the time view mode is entered/exited. When the control key and the V key are pushed simultaneously, the contents of the clipboard are pasted on the currently focussed label. When the control key and the down key/ the control key and the up key are pressed simultaneously, the time in increased/ decreased by the time view. When the control key and the left key/ the control key and the down key are pressed simultaneously, the time increasing/decreasing steps are varied. When the control key and the home key are pushed simultaneously, reversion is made to the current time by the time view mode.

With the label software of the present embodiment, as the operation on the mouse, in particular the mouse fitted with the wheel, "operations on the label", "operations on the time view console" and "operations on the desktop of the time view mode" are set.

Among the "operations on the label", there are such operations as "drag and drop for a label", "drop to a label from another application", "right click for a label", "wheel rotation for a label", "wheel click for a label", "drag and drop to a label (excluding the link button) for a file icon", "drag and drop to a label (excluding the link button) for a control key, shift key and a file icon" and "drag and drop on a link button for a file icon". In the operation of "drag and drop for a label", labels are moved. In the operation of "drop to a label from another application", an object is pasted to a label insofar as data recognized by the present embodiment of the label software is concerned. An error dialog is displayed insofar as data not recognized by the present embodiment of the label software is concerned. In the operation of "right click for a label", the context menu dependent on the clicked object is displayed. In the operation of "wheel rotation for a label", the forward/backward relationship of the labels is adjusted. In the operation of "wheel click for a label", the time view console is displayed to transfer to the time view mode. In the operation of "drag and drop to a label (excluding the link button) for a file icon", texts, pictures and sound files are inserted as objects. If a file cannot be recognized as an object, an inquiry is made as to whether or not it can be inserted as a link object for the file. In the operation of, "drag and drop to a label (excluding the link button) for a control key, shift key and a file icon" and "drag and drop on a link button for a file icon", a path to the dragged and dropped file is inserted as a link object. If it is tried to insert a file path as a link object by drag and drop to a site other than the link button LB on the label, an alarm dialog shown in FIG. 62 is displayed. If a button "YES" is pushed when the dialog is displayed, the processing is the same as when a file path is inserted as a link object by drag and drop on the link button LB on the label.

Among the "operations on the time view console", there are such operations as "right click on the console", "wheel rotation for the operating time display portion of the console" and "wheel rotation for a step selecting list box of the console time increase/decrease". In the operation of "right click on the console", the context menu is displayed. The operation of "wheel rotation for the operating time display portion of the console" corresponds to time increase/ decrease. The operation of "wheel rotation for a step selecting list box of the console time increase/decrease" corresponds to change in the time increasing/decreasing steps.

In the operations of "operations on the desktop of the time view mode", there are such operations as "wheel click for the desktop of the time view mode" and "right click on the desktop of the time view mode". The operation of "wheel click for the desktop of the time view mode" corresponds to change in the time increasing/decreasing steps. In the operation of "right click on the desktop of the time view mode", the time view context menu is displayed.

The "operation on the jog dial" is now explained.

In the label software of the present embodiment, the operation on the jog dial includes such operations as "right/ left rotation of the jog dial", "pushing of the jog dial (with the interval from pushing until release of pushing being not longer than one sec)" and "protracted pushing of the jig dial (with the interval from pushing until release of pushing being longer than one sec)". In the label software of the present embodiment, the following functions are allocated to the operations on the jog dial. It is noted that, in the label software of the present embodiment, these jog dial operations are not globally picked at any time, but reaction to the jog dial actuation occurs when the label software is focussed.

For example, in a normal mode, the label software of the present embodiment reacts to the operations of "right/left rotation of the jog dial" and "pushing of the jog dial (with the interval from pushing until release of pushing being not longer than one sec)". That is, if, in the normal mode, the operation of "right/left rotation of the jog dial" is made, the label software of the present embodiment causes the up-and-down relationship of the window of a label currently displayed on the picture. The operations at this time are changed depending on the number of the currently existing labels. If there is not more than one label, nothing occurs with the right/left rotation of the jog dial. However, a pre-set sound is issued to indicate that the operation is invalid. If there are two or more labels, and the operation for rightward rotation of the jog dial is made, the label at the most forward position is shifted to the most backward position among the labels. Conversely, when the operation for leftward rotation of the jog dial is made, the label at the most backward position is shifted to the most forward position among the labels. If, during the normal mode, the operation of "pushing of the jog dial (with the interval from pushing until release of pushing being not longer than 1 sec)" is made, the label software of the present embodiment displays the time view console to transfer to the time view mode.

Also, in the time view mode, the label software of the present embodiment reacts to all of the operations of "right/left rotation of the jog dial", "pushing of the jog dial (with the interval from pushing until release of pushing being not longer than 1 sec)" and "protracted pushing of the jig dial (with the interval from pushing until release of pushing being longer than1sec)". That is, if, in the time view mode, the operation of "right/left rotation of the jog dial" is made, the label software of the present embodiment corresponds to the time increase/decrease. For example, if the jog dial makes rightward rotation and leftward rotation, time proceeds in the future and past distentions, respectively. If the operation of, "pushing of the jog dial (with the interval from pushing until release of pushing being not longer than1sec)" is performed, the label software of the present embodiment corresponds to the change in the time increasing/decreasing units (time increasing/decreasing steps). For example, the time increasing/decreasing units are changed in the sequence of 100 years, 10 years, 1 year, 1 month, 1 day, 1 hour, 1 minute, 1 sec, 10 years, 10 years, each time the jog dial is pushed. If the jog dial is rotated as the shift key is pushed, the time increasing/decreasing intervals are changed in the reverse sequence to that when only the jog dial is rotated. The time increasing/decreasing intervals selected at the time of the pushing of the jog dial can be set when setting the environment. When the operation of "pushing of the jig dial (with the interval from pushing until release of pushing being longer than1sec)" is done, the label software of the present embodiment closes the time view console to transfer to the present mode.

In the label software of the present embodiment, the operation that occurs on jog dial actuation is displayed on the desktop as the jog dial guide to present to the user the contents of the operations corresponding to the jog dial actuating state and to the jog dial actuation. That is, in the label software of the present embodiment, the jog dial guides of different contents are presented in the normal mode and in the time view mode since the functions are allocated in these modes to the jog dial actuation.

Figure 63:
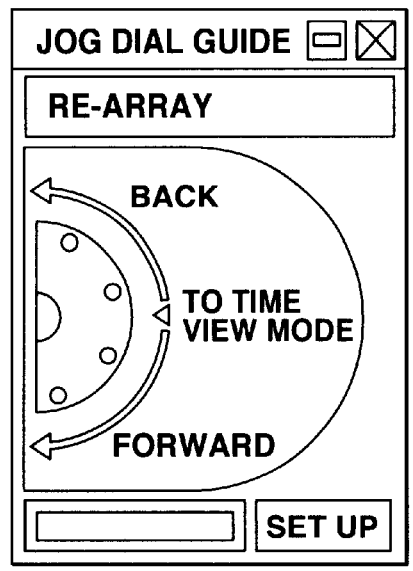
FIG. 63 shows an exemplary display of a jog dial guide during normal mode.
Figure 64:
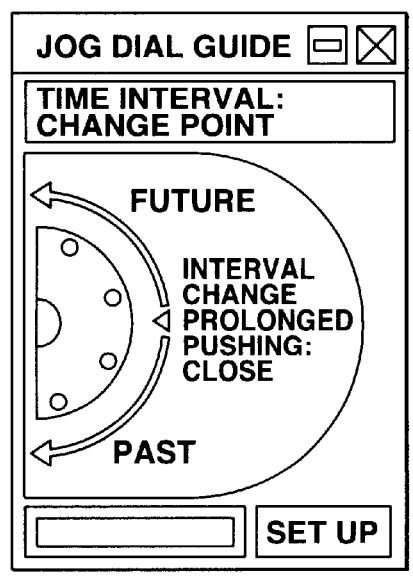
FIG. 64 shows an exemplary display of a jog dial guide during time view mode.

FIG. 63 shows an example of the jog dial guide during the normal mode and that during the time view mode. That is, in the jog dial guide during the normal mode, shown in FIG. 63, the contents of the functions corresponding to the "right/left rotation of the jog dial", "pushing of the jog dial (with the interval from pushing until release of pushing being not longer than1sec)" are displayed as guides. In the jog dial guide during the normal mode, shown in FIG. 63, the contents of the functions corresponding to the "right/left rotation of the jog dial", "pushing of the jog dial (with the interval from pushing until release of pushing being not longer than1sec)" and "protracted pushing of the jig dial (with the interval from pushing until release of pushing being longer than1sec)" are displayed as guides.

The setting contents in the label software of the present embodiment are hereinafter explained. In the label software of the present embodiment, "label setting", "setting of default label layout", "setting of sound recording", "picture setting" and "environment setting" are possible. These setting contents are saved in a registry and used as common setting among the entire projects.

Figure 65:
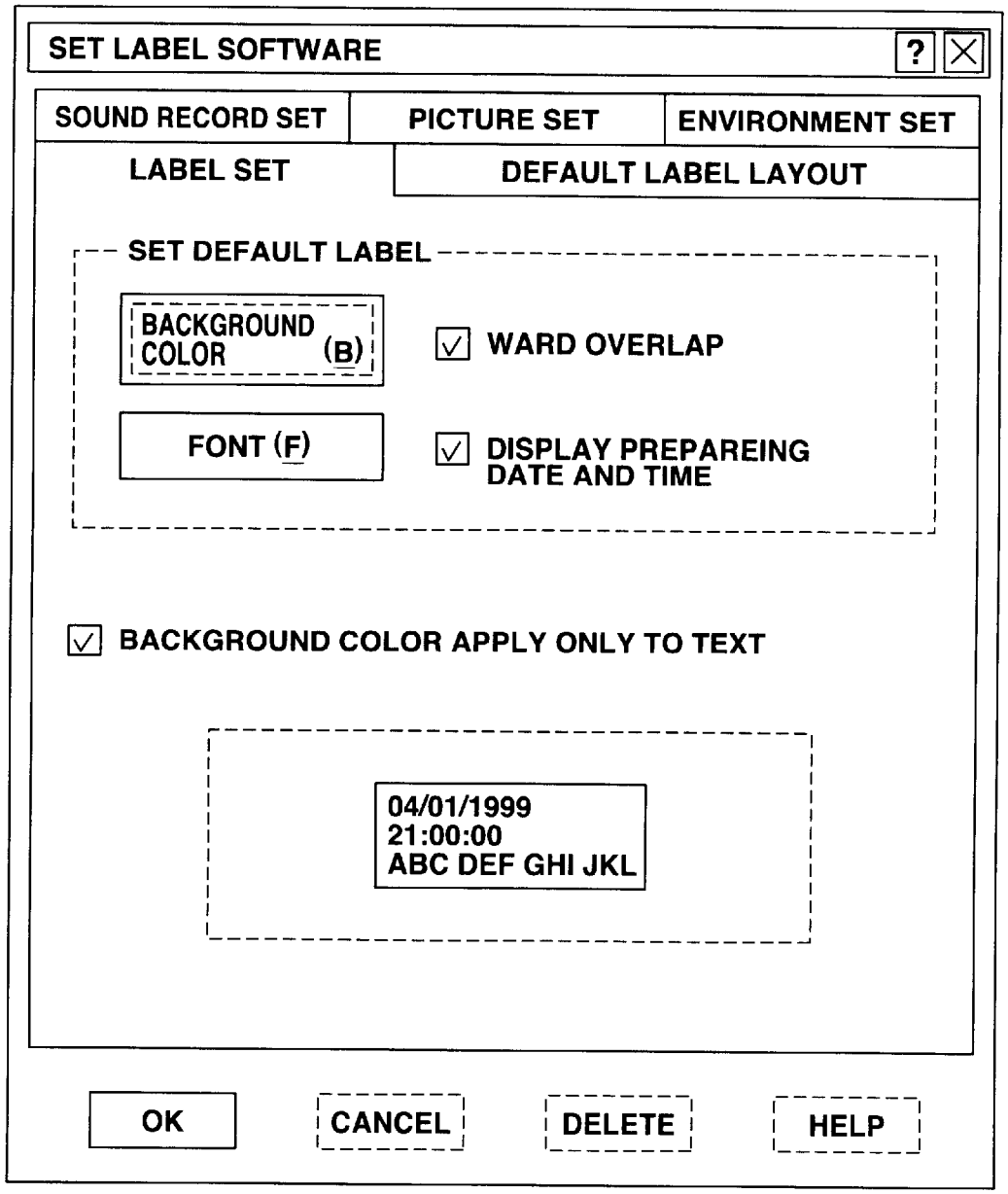
FIG. 65 shows an exemplary display of a dialog on selection of label setting in a label setting dialog.
Figure 66:
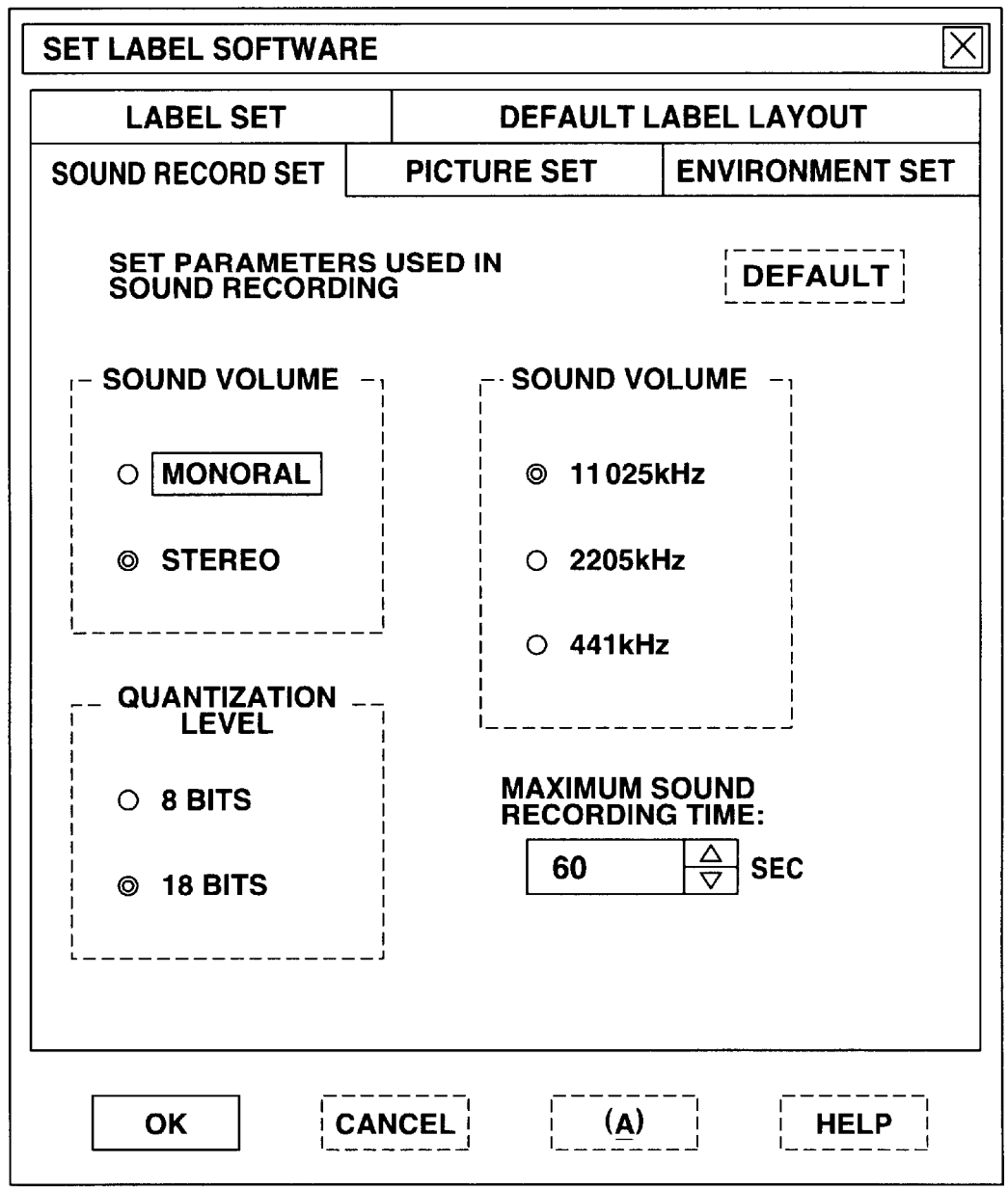
FIG. 66 shows an exemplary display of a dialog on selection of recording setting in a label setting dialog.

As the "label setting", the label software of the present embodiment is able to set the label default values. In the label setting picture, there are "default background color", "default font inclusive of text color", "default word-wrapping state", "display preparation time" and "apply text color only to text", as shown in FIG. 65. In the "default background color", the background color of the newly prepared label is set. In the "default font inclusive of text color", the font of the newly prepared label is set. In the "default word-wrapping state", it is set whether or not the word-wrapping is to be applied to the newly prepared label. In the "display preparation time", it is set whether or not the preparation time is to be displayed on the newly prepared label. In the "apply text color only to text", it is set whether the background color is to be applied to the entire label or only to the text. In the lower part of the label software setting picture, a sample of the label state in the current setting is displayed.

In the "default label layout", default layout in the above-mentioned layout portion is made.

In the "setting of sound recording", various parameters for sound recording are set. The setting contents include such items as "sound source", "quantization level", "sampling frequency" and "maximum recording time". With the "sound source",monaural/stereo setting is possible, whereas, with the "quantization level" and "sampling frequency", the setting of 8 bits/16 bits and the setting of 11.025 kHz, 22.05 kHz and 44.1 kHz are possible, respectively.

Figure 67:
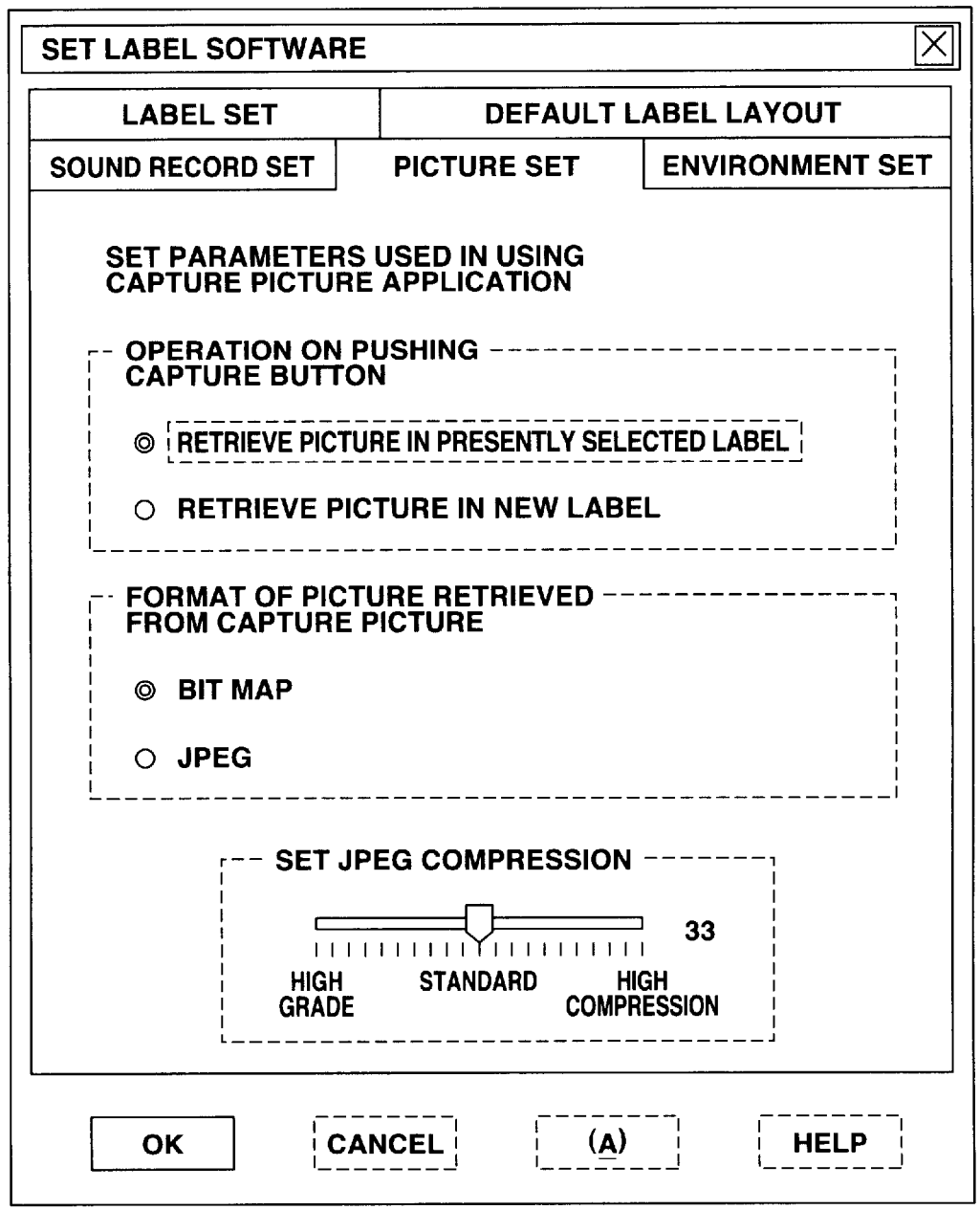
FIG. 67 shows an exemplary display of dialog on selection of picture setting in a label setting dialog.
Figure 68:
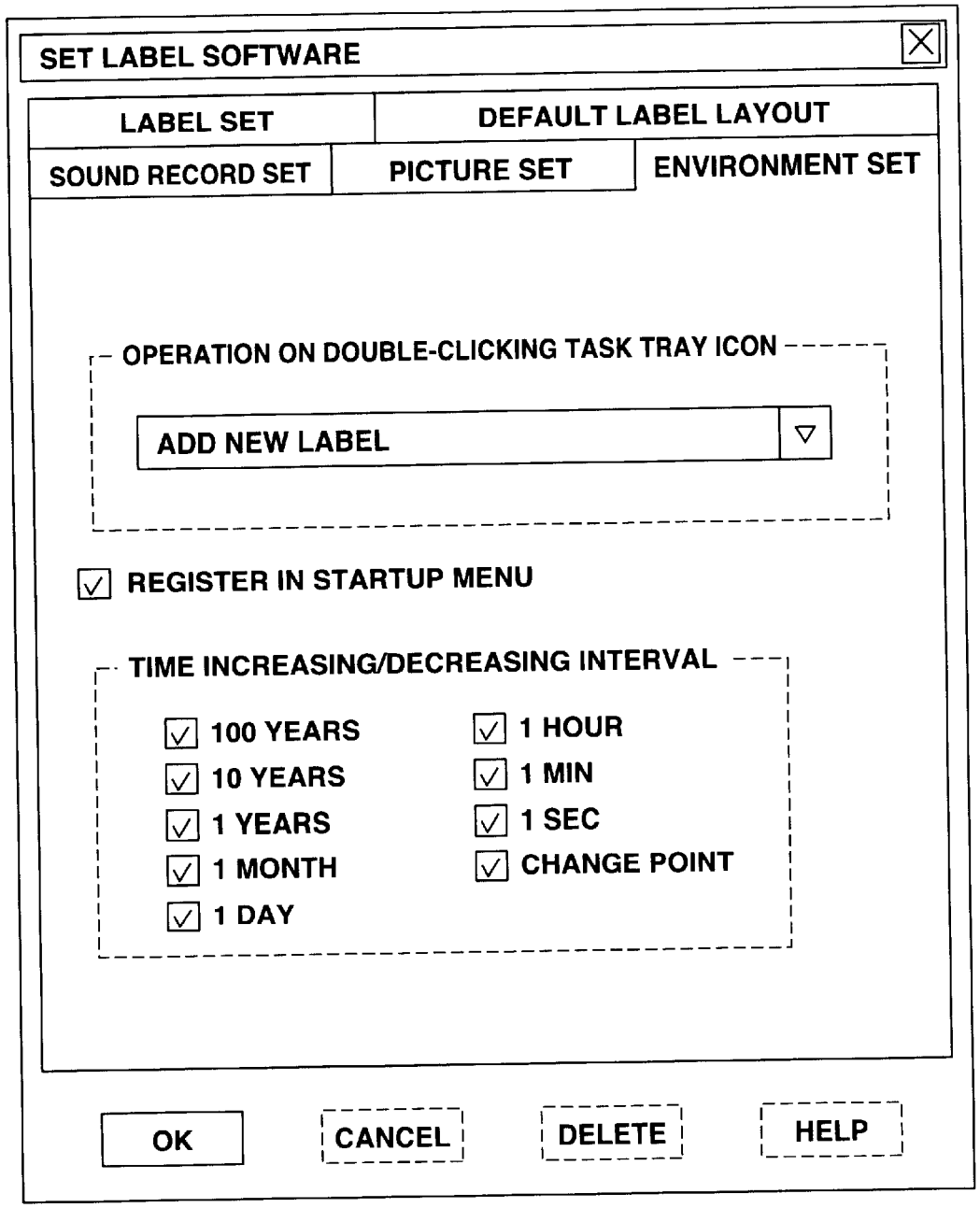
FIG. 68 shows an exemplary display of dialog on selection of environment setting in a label setting dialog.

In the "picture setting", the picture during use of the capture picture retrieving application is set. The setting contents include "operation on pushing the capture retrieving button", "format of a picture retrieved from a capture picture retrieving application" and "setting of JPEG compression", as shown in FIG. 67. The operation of "operation on pushing the capture retrieving button" includes such items as "retrieve picture in a presently selected label" and "retrieve picture in a new label". In "retrieve picture in a presently selected label", an inquiry is made whether or not a new label is prepared if no label is selected. In the "retrieve picture in a new label", a new label is prepared to retrieve the picture in a new label. In the "format of a picture retrieved from a capture picture retrieving application", there are such items as "bitmap" and "JPEG". In the "bitmap", H compression is not applied so that the picture is saved in its original state. In the "JPEG", compression is applied, however, the disc capacity can be reduced. In the "JPEG setting", the compression ratio of the retrieved picture is set when the "JPEG" is set in the "format of a picture retrieved from a capture picture retrieving application". The compression ratio ranges between 1/1 to 1/64.

In the "environment setting", "default command", "startup" and "time increasing/decreasing interval" are set. In the "default command", "add new label", "add new label and record the sound", "add new label and acquire picture from the capture picture retrieving application" and "enter into time view mode" etc. In the "startup", it is set whether or not the registration in the startup is to be made. In the "time increasing/decreasing interval", the time increasing/decreasing intervals (time increasing/decreasing steps) selected on pushing the time increasing/decreasing step selection menu button sb is set. The time increasing/decreasing interval not set here is not unusable and can be selected by selection from a combo-box or on clicking a date letter string. The time increasing/decreasing interval checked here are marked with "*" on the right side of a letter in the time increasing/decreasing step selection list box ss1 as discussed above.

With the label software of the present embodiment, having the above-mentioned functions, the entire operations on the labels on the desktop are saved to enable reproduction of label states at an optional time point. For saving the label states on the desktop, a method of saving the entire information of plural labels at a given time point and a method of saving only the difference of the label information at a time point may be used. The label states may be saved periodically at regular intervals or at time points when changes are made in the labels. For saving the differences in the label information, the operations on the label, that is the operating hysteresis, are saved, or the difference of the label information before and after operations on the label, that is the variance in the label information, may be saved.

With the label software of the present embodiment, having the above-mentioned functions, not only the operations on the present label, but also the future operations, may be appointed to enable labels (future labels) to be used as reminders. The operations on the future labels are determined when the current time is the time set in the future level. Therefore, the hysteresis as to the operations on the future labels is not saved but only the information on the last operation is saved. Although the future label may also have the hysteresis, plural futures exist in this case. This surpasses the range of human understanding. For this reason, the present embodiment dos not set the hysteresis for the future labels. For appointing the operations for future labels, repetitive operations of the label display/non-display may be envisaged in addition to the operation such as simple label preparation.

Moreover, in the label software of the present embodiment, having the above-mentioned functions, in which the label has the concept of time, it is possible to associate a label with an alarm to ring an alarm when the time is the pre-set time. This alarm rings irrespective of the current desktop display time, such that, even when the state of past or future label states are displayed, the alarm is rung to avoid the risk of overlooking crucial label information.

Meanwhile, an alarm to a label can be attached to each label. In distinction from a usual alarm, the present alarm can be rung not only before the preparation time but also after label preparation. Moreover, an alarm can be rung even to the selected alarm. For this reason, the alarm can be rung after 1 year so that an alarm can be rung after lapse of a year from an anniversary.

Referring to FIGS. 69 to 72, the processing flow in the CPU 51 in case of implementing the above process by a personal computer is explained.

Figure 69:
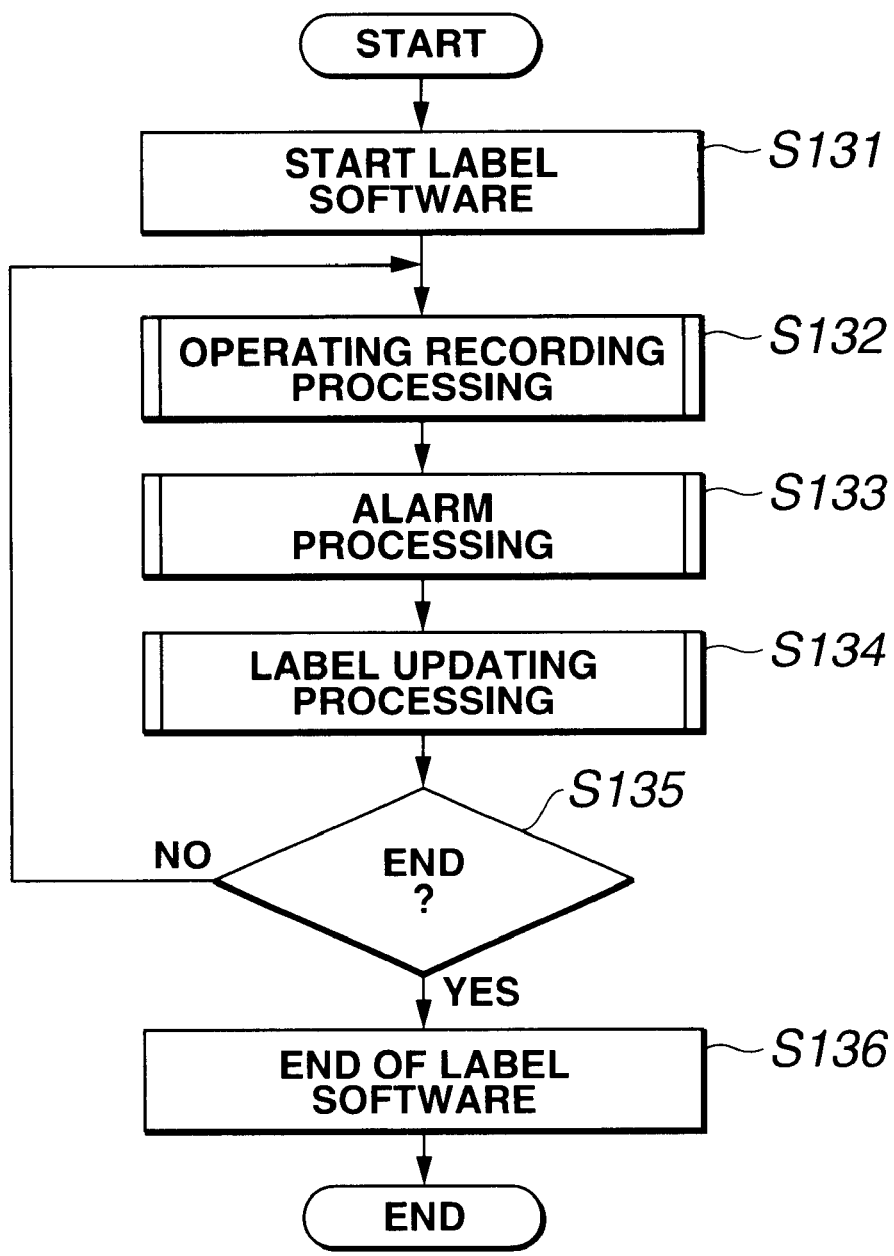
FIG. 69 is a flowchart showing the overall processing flow in case the label state at an optional past time point is regenerated, an appointment is made for an operation for a future label, the operation for a future label is regenerated and alarm processing is realized on the CPU.

FIG. 69 shows the overall flow of the reproducing processing of the label states at an optional past time point, the reproducing processing of the appointment for operations for future labels and alarm processing. If the label software is started at step S131, the CPU 51 records the processing at step S132 in case some operation or other is performed on the label. If the alarm setting is made, the alarm processing is performed at step S133, whereas, if setting for repetition is made for a label, the label updating processing is performing at step S134. The CPU 51 then verifies whether or not each processing has come to a close. If the result of check is YES, the CPU reverts to step S132 and, if otherwise, the CPU moves to step S136. The CPU 51, proceeding to step S136, performs the end processing of the label software.

Figure 70:
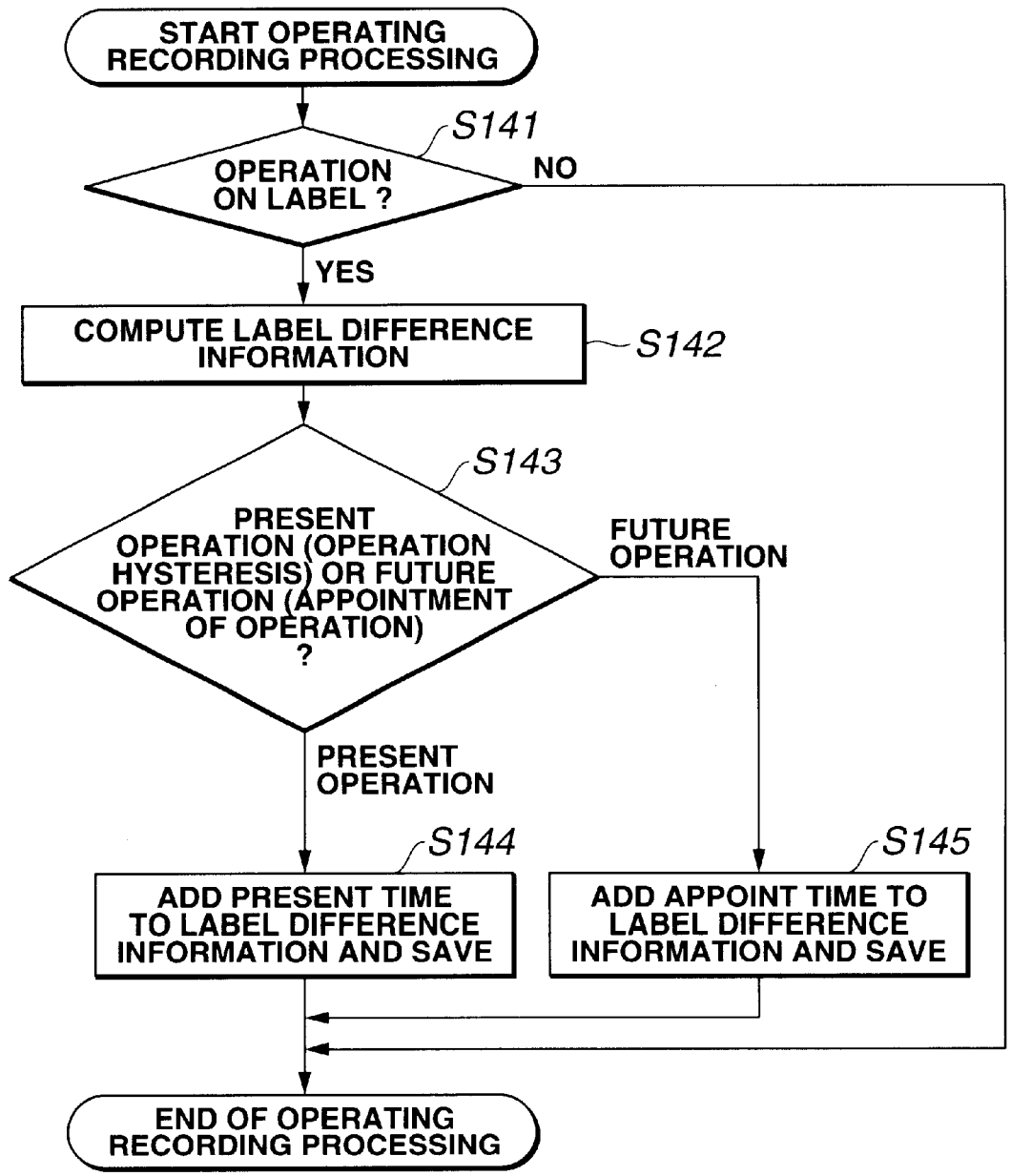
FIG. 70 is a flowchart showing details of the recording processing at step S132 of the flowchart of FIG. 69.

FIG. 70 shows a detailed flow of the operational recording processing of step S132. If, in FIG. 70, the operating recording processing is started, the CPU 51 at step S141 verifies whether or not some operation or other has been done on a label by the user. If the result of check is NO, the recording processing is closed to proceed to step S133 and, if otherwise, the CPU 51 proceeds to the processing of step S 142 to compute the label difference information before and after the processing operation. The CPU 51 then verifies at step S143 whether the operation on the label is that on the current label (operating hysteresis) or the operation on the future label (operation appointment). If the processing is verified at this step S143 to be the operation on the current label, the CPU 51 at step S144 adds the current time to the label difference information to save the resulting data. if the operation is found at step S43 to be that on the future label, the CPU 51 at step. S145 adds the appointed time to the label difference information to save the resulting data. After the processing of these steps S144 and S145, the CPU 51 terminates the operation recording processing to proceed ti the processing of step S133 of FIG. 69.

Figure 71:
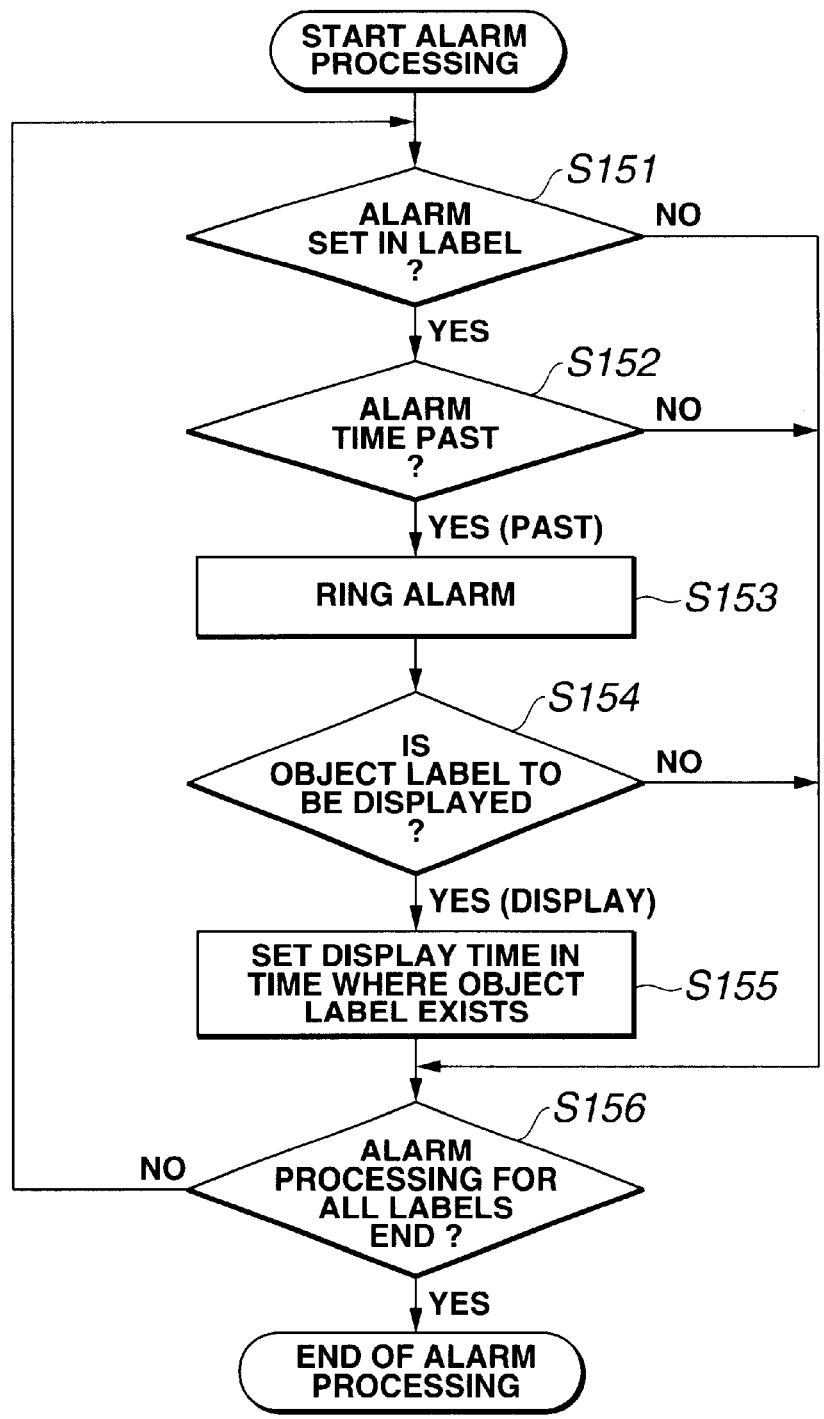
FIG. 71 is a flowchart showing details of the ala processing at step S133 of the flowchart of FIG. 69.

FIG. 71 shows a detailed flow of alarm processing of step S133 of FIG. 69. In FIG. 71, when the alarm processing is started, the CPU 51 at step S151 verifies whether or not an alarm has been set in the label. If the result of check at this step S151 is NO, the alarm processing is terminated to proceed to the processing of step S134 of FIG. 69. If the result of check is YES, the CPU 51 checks whether or not the current time is past (or is) the alarm setting time. If the CPU verifies that the current time is past the alarm setting time, it proceeds to step S153 and, if otherwise, it proceeds to step S156. At step S153, the CPU 51 rings an alarm and, at step S154, it verifies whether or not the object label corresponding to the alarm is to be displayed. If the result of check at step S154 is NO, the CPU 51 proceeds to the processing of step S156 and, if otherwise, it proceeds to the processing at step S255. At step S155, the CPU 51 sets the display time to the time when the object label is saved and proceeds to step S156. At step S156, the CPU 51 checks whether or not the label alarm processing has come to a close. If the result of check is NO, the CPU reverts to step S151 and, if otherwise, the CPU terminates the alarm processing to proceed to the processing of step S134 of FIG. 69.

Figure 72:
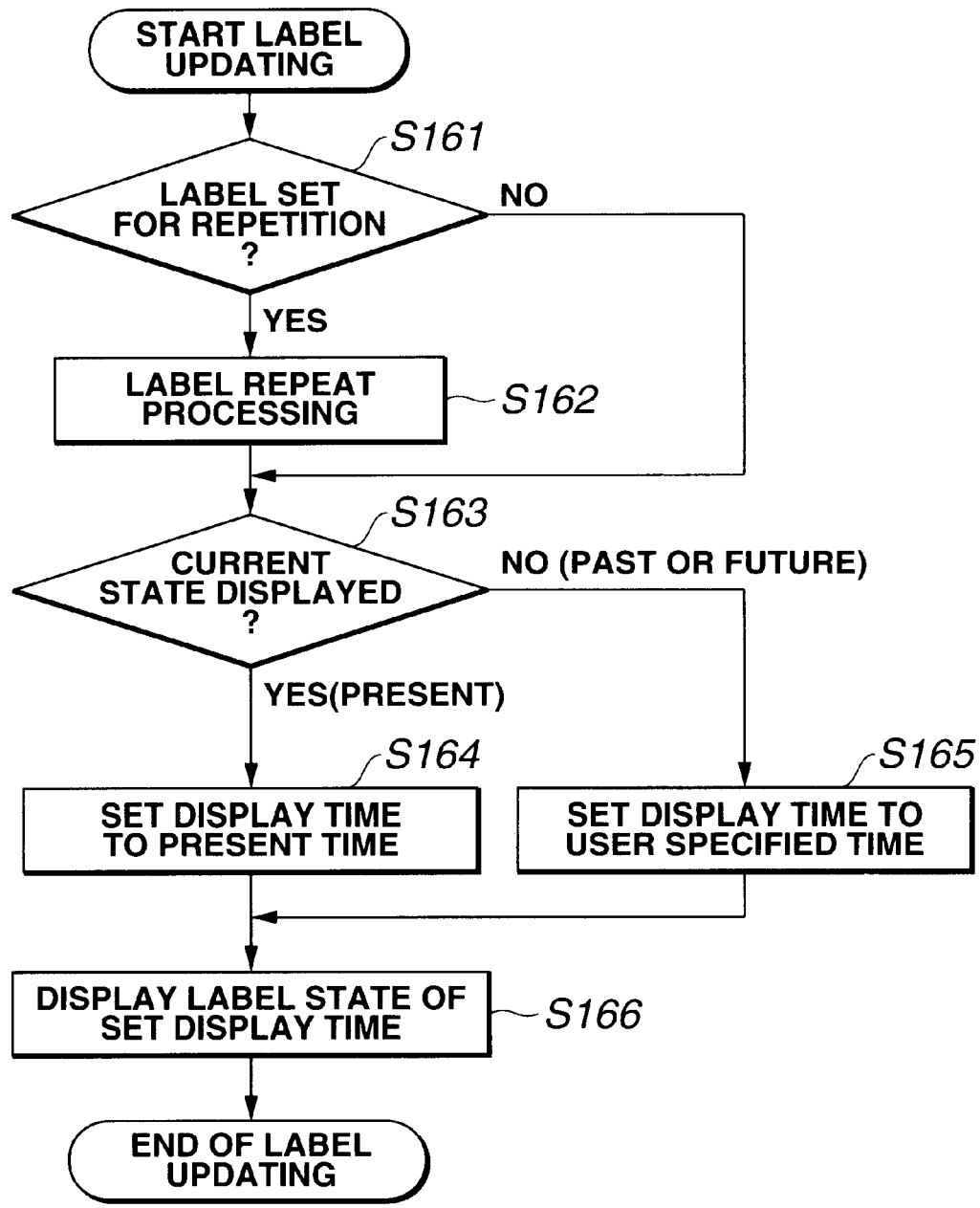
FIG. 72 is a flowchart showing details of the label updating processing at step S134 of the flowchart of FIG. 69.

FIG. 72 shows the flow of detailed processing of step S134 of FIG. 69. In this figure, when the label updating processing is started, the CPU 51 at step S161 verifies whether or not there is any label set for repetition. If the result of check is NO, the CPU 51 proceeds to step S163 and, if otherwise, to step S162. At step S162, the CPU 51 executes label repetition processing. The CPU 51 then proceeds to step S163. At step S63, the CPU 51 verifies whether or not the current state is being displayed. If the result of check at step S63 is NO, that is the current state is the past or future mode, the CPU proceeds to step S165 and, if otherwise, to step S164. At step S164, the CPU 51 sets the display time to the current time and then proceeds to step S166. At step S165 After setting the display time to the current state, the CPU 51 proceeds to step S166. At step S165, the CPU 51 sets the display time to the user specified time, before it proceeds to step S166. At step S166, the CPU 51 displays the state of the label of the display time as set (present, past or future mode). The CPU 51 then terminates the label updating processing to proceed to the processing of step S135.

The label software of the present embodiment, having the above-mentioned functions, realizes not only definite information, such as text or picture, to the label, but also the link function of indirectly pasting the entire information. Thus, in the label software of the present embodiment, which realizes the link function, there is no necessity of displaying the entire information in a label of a definite size, thus enabling effective utilization of the label area. That is, in the case of a label having no link function, contrary to the present embodiment, the entire information needs to be retrieved at a time point the object is pasted to the label. Meanwhile, in the label software of the present embodiment, the entire link information can be displayed in a label. By this link function, the personal computer in the started state of the label software of the present embodiment is able to display not only the information in a local machine but also the information on the network on the label. Since the information on the network can be linked and set on a label, the personal computer of the present embodiment is able to display the link contents only when the user requests execution, such that there is no necessity of the personal computer being perpetually linked to the network.

Figure 73:
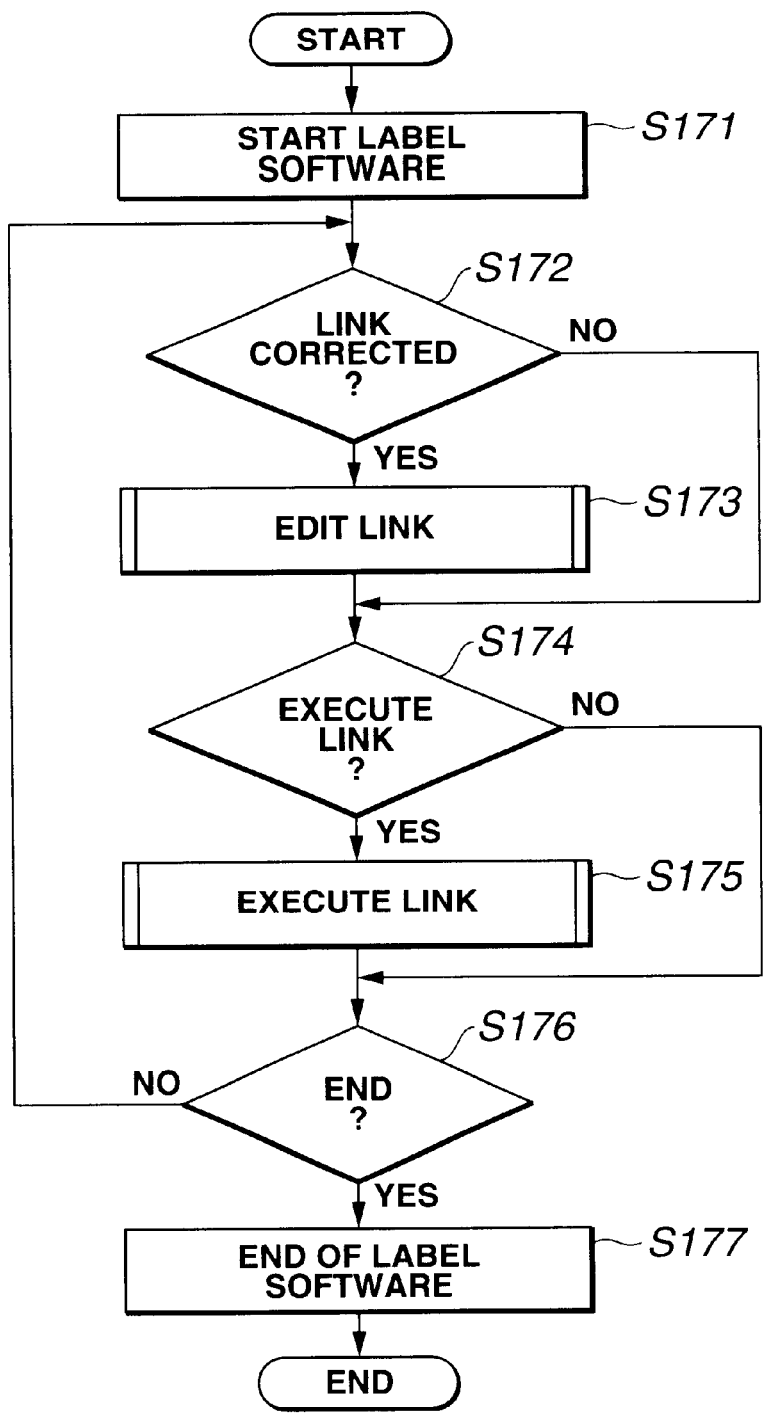
FIG. 73 is a flowchart showing the overall processing in case the processing of indirectly pasting the entire information on a label by a link is to be performed by the CPU.
Figure 74:
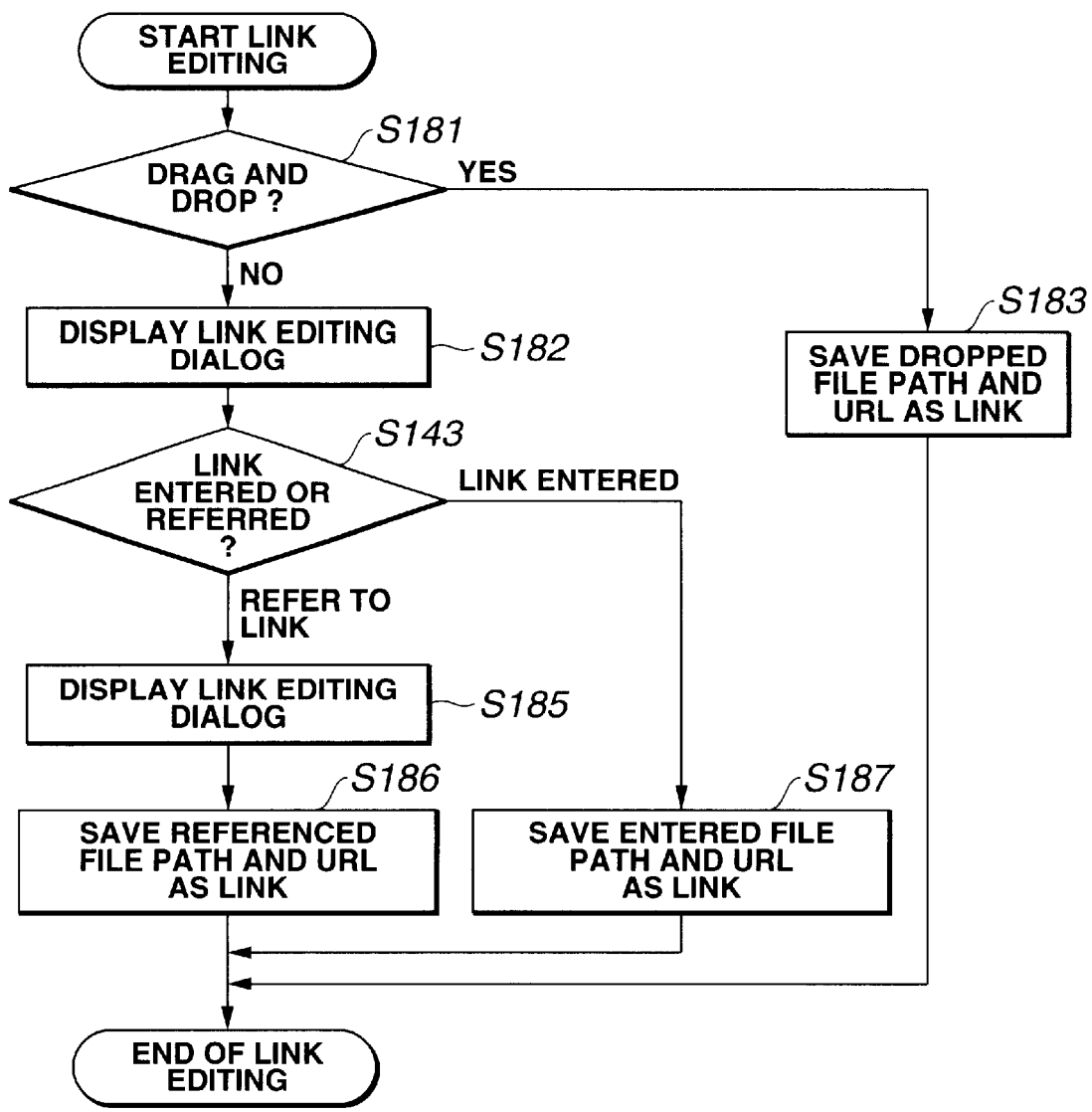
FIG. 74 is a flowchart showing details of the link editing processing at step S173 of the flowchart of FIG. 73.
Figure 75:
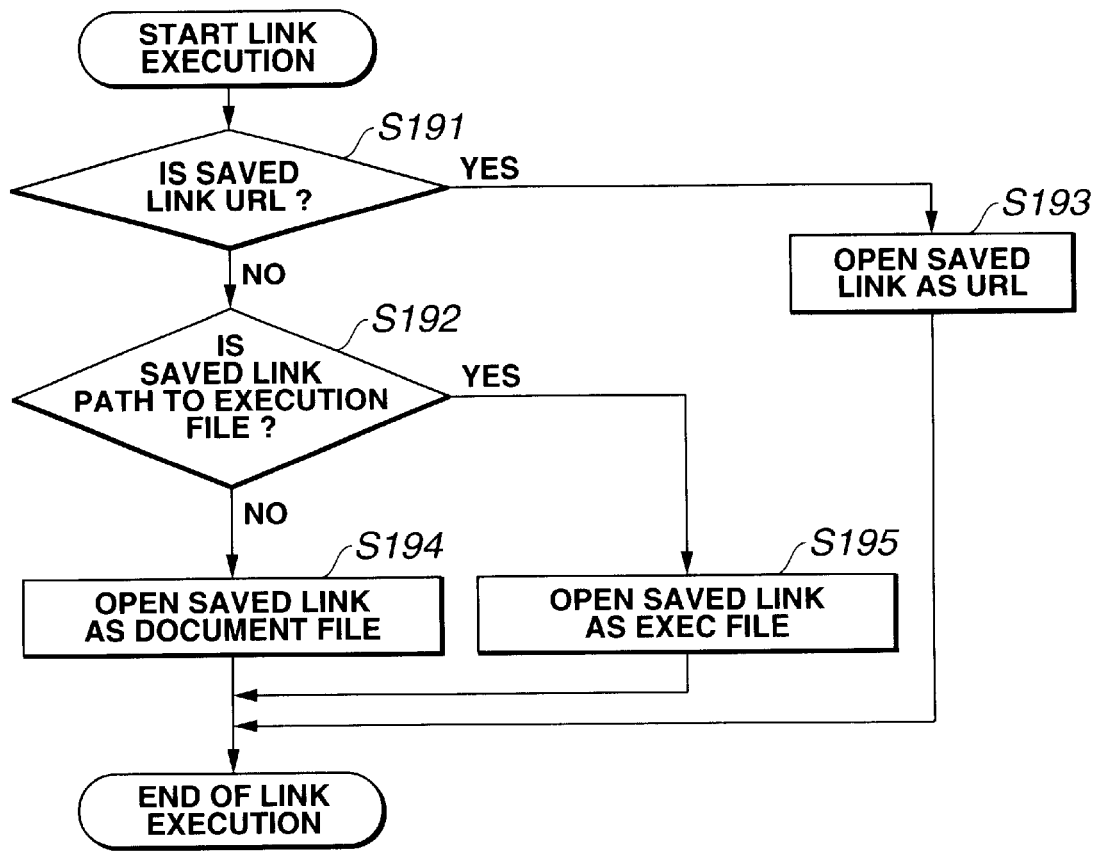
FIG. 75 is a flowchart showing details of the link executing processing at step S175 of the flowchart of FIG. 73.

The processing flow in the CPU 51 in case of realizing the link function on the label by the label software of the present embodiment is shown in FIGS. 73 to 75.

FIG. 73 shows the overall processing flow in case of indirectly pasting the entire information on the label by the link. When the label software is started at step S171, the CPU 51 at step S172 verifies whether or not the link has been corrected. If the result of check at step S172 is NO, the CPU 51 proceeds to step S174 and, if otherwise, to step S173. At step S173, the CPU 51 executes link editing processing. The CPU 51 then verifies whether or not the link is to be executed. If the result of check at step S174 is NO, the CPU 51 proceeds to step S176 and, if otherwise, to step S175. At step S175, the CPU 51 performs the link execution processing. The CPU 51 then checks at step S176 whether or not the processing has come to a close. If the result of check at step S176 is NO, the CPU 51 reverts to step S172 and, if otherwise, to step S177, where the CPU 51 executes label software terminating processing.

FIG. 74 shows the detailed processing flow of step S173. In FIG. 74, when the link editing processing is started, the CPU 51 checks at step S181 whether or not the link editing is done by drag and drop by e.g., a mouse. If the result of check at step S181 is YES, the CPU 51 proceeds to step S183 and, if otherwise, to step S182. At step S183, the CPU 51 saves the dragged and dropped file path and URL as link and then terminates the link editing processing to proceed to the processing at step S174 of FIG. 73. At step S182, the CPU 51 displays the link editing dialog shown in FIG. 53 before proceeding to step S184. At step s184, the CPU 51 verifies whether or not, in the above-mentioned link editing dialog, the file path of the link destination or URL has been entered or the link reference command has been issued. If it is verified that the file path of the link destination or the URL has been entered, the CPU 51 proceeds to step S187. If it is verified that the link reference command has been issued, the CPU 51 proceeds to step S185. At step S187, the CPU 51 saves the input file path or the URL as the link destination to then terminate the link editing processing to proceed to step S174 of FIG. 73. At step S185, the CPU 51 displays the link reference dialog before proceeding to step S186, where the CPU 51 saves the referenced file path or URL as the link destination. The CPU 51 then terminates the link editing processing to proceed to step S174 of FIG. 73.

FIG. 75 shows the detailed processing flow of the processing at step S175 of FIG. 73. In FIG. 75, when the link editing processing is started, the CPU 51 at step S191 checks whether or not the saved link information is URL. If the result of check at step S191 is YES, the CPU 51 proceeds to step S193 and, if otherwise, to step S192. At step S193, the CPU 51 opens the saved link information as URL and subsequently terminates the link executing processing to proceed to the processing at step S176 of FIG. 73. At step S192, the CPU 51 checks whether or not the saved link information is a path to an execution file. If the result of check at step S192 is YES, the CPU 51 proceeds to step S195 and, if otherwise, to step S194. At step S195, the CPU 51 executes the saved link as an executing file to then terminate the link editing processing to proceed to step S176 of FIG. 73. At step S194, the CPU 51 opens the saved link as a document file to then terminate the link editing processing to proceed to step S176 of FIG. 73.

With the label software of the present embodiment, having the above-mentioned function, the time label for the purposes of present/past/future can be easily displayed on the desktop.

For moving the label time on the desktop, it may be envisaged to advance/retract the time by a pre-set interval by the user executing a sole command. This enables the information one day before or after to be retrieved easily.

For moving the label time on the desk top, it may be envisaged to advance/retract the time up to a time point of change of the information by a user executing a command. The time interval at this time is not constant and determined by the change point of the label information so that the movement time is variable. This enables the label information switching time point to be retrieved easily.

For moving the label time on the desktop, it may be envisaged to vary the time advancing/retracting manner in an accelerated manner by the user executing the consecutive commands. This enables movement to the target time easily and speedily.

Figure 76:
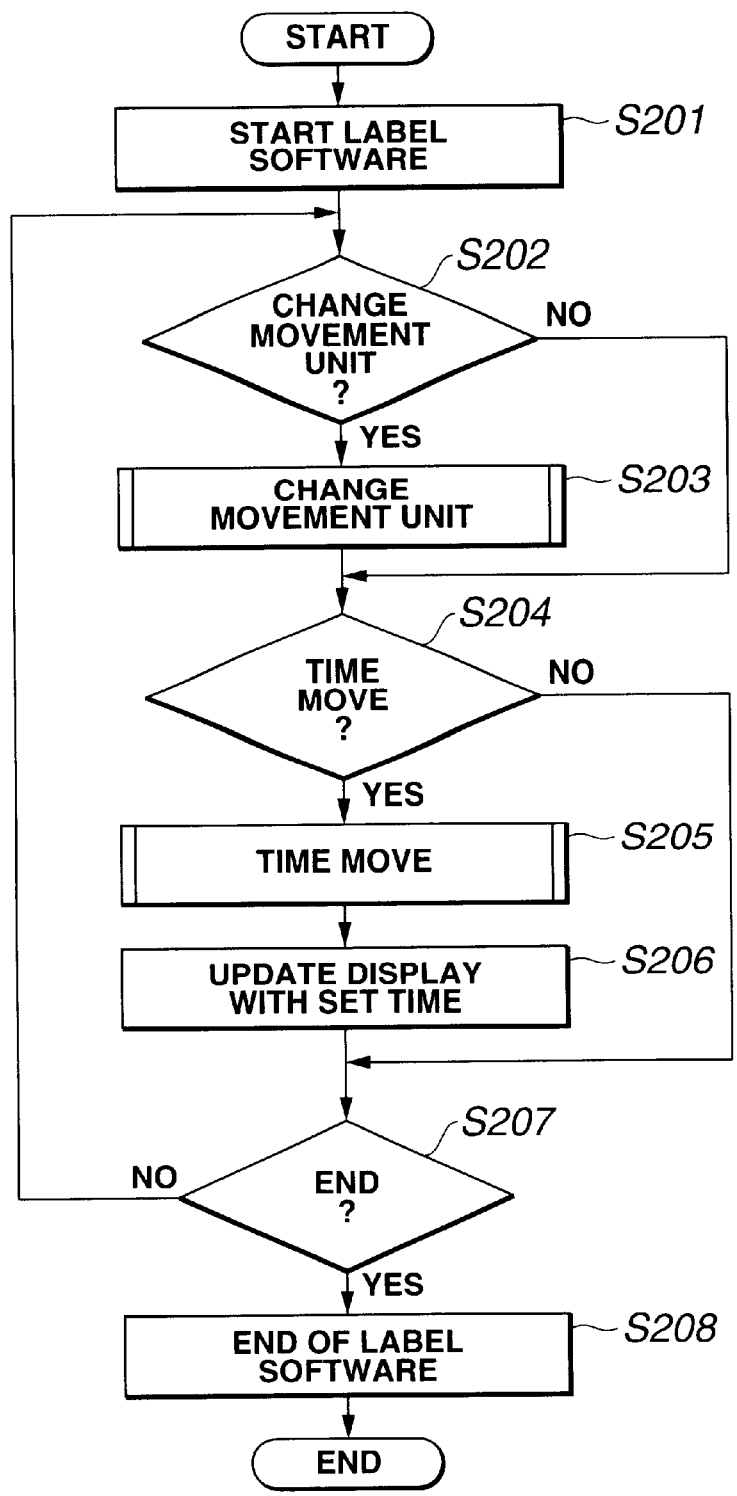
FIG. 76 is a flowchart showing the overall processing in case the processing for enabling time shift to an optional time of the present/past/future is to be realized on a CPU.
Figure 77:
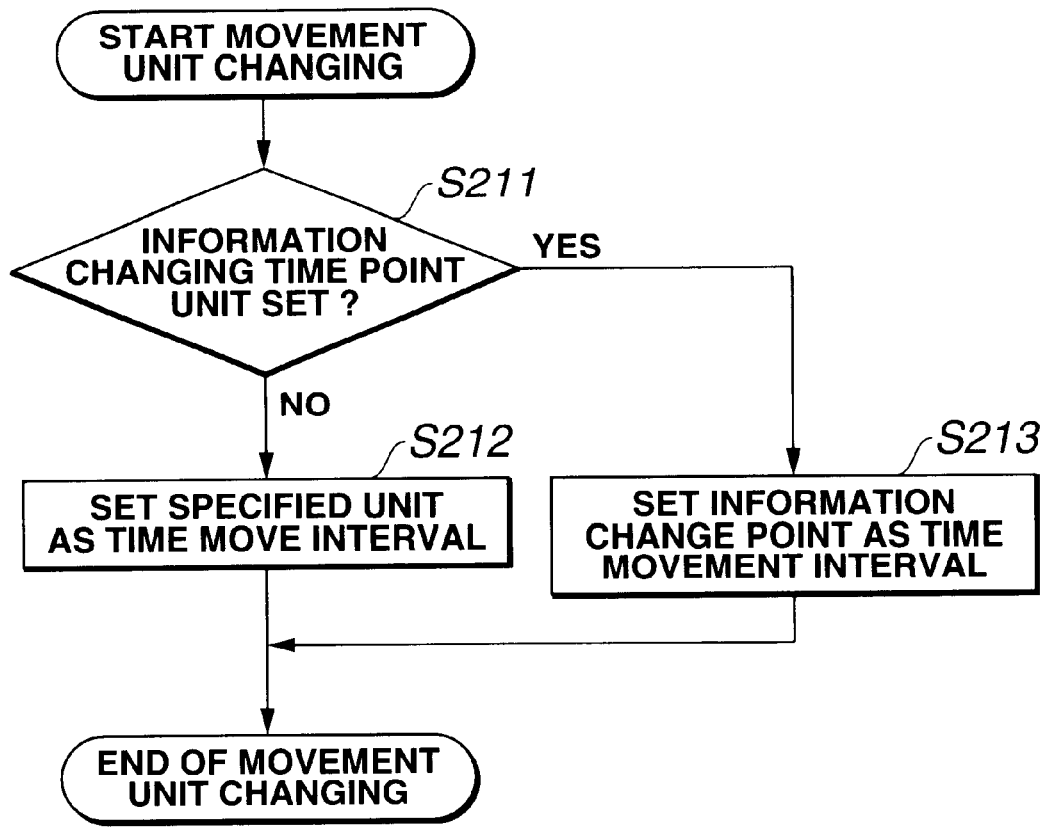
FIG. 77 is a flowchart showing details of the movement unit changing processing at step S203 of the flowchart of FIG. 76.
Figure 78:
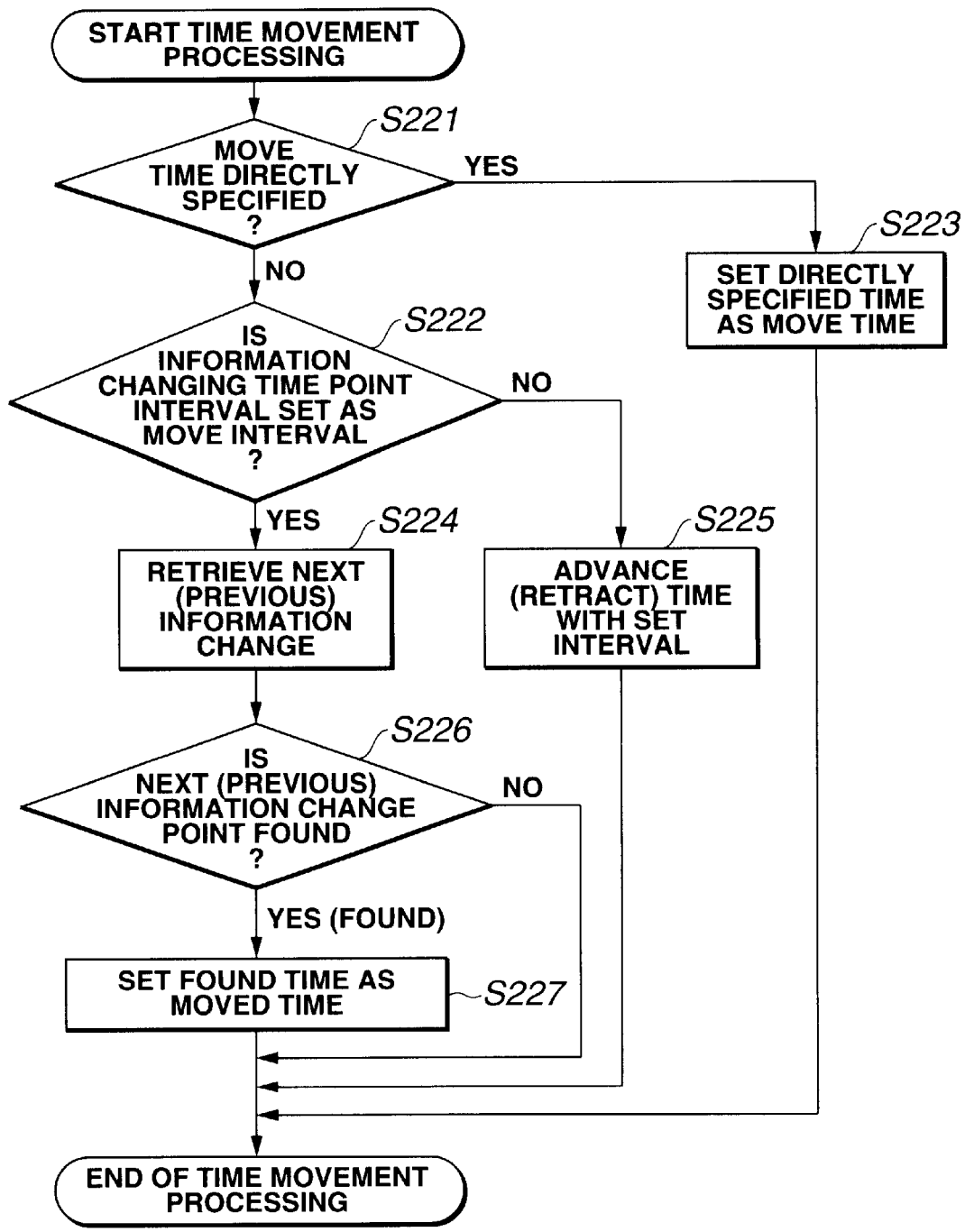
FIG. 78 is a flowchart showing details of the time movement processing at step S205 of the flowchart of FIG. 76.

The processing flow by\y the CPU 51 in implementing the label time movement function on the desktop by a personal computer by the label software of the present embodiment is shown in FIGS. 76 to 78.

FIG. 76 shows the overall processing flow enabling movement to an optional present/past/future time. When the label software is started at step S201, the CPU 51 at step S202 verifies whether or not the time movement unit, that it the above-mentioned time increasing/decreasing intervals (time increasing/decreasing steps) are to be changed. If the result of check at step S201 is NO, the CPU 51 proceeds to step S204 and, if otherwise, to step S203. At step S203, the CPU 51 changes the time movement unit, that it the above-mentioned time increasing/decreasing intervals (time increasing/decreasing steps). The CPU 51 at step S204 verifies whether or not the label time movement on the desktop has been commanded. If the result of check at step S204 is YES, the CPU 51 proceeds to step S206 and, if otherwise, to step S205. At step S205, the CPU 51 performs the time movement processing, that is movement to a desktop picture in the past or future mode. After the time movement processing at step S205, the CPU 51 at step S206 updates the display at the set time to proceed to step S207. The CPU 51 at step S207 verifies whether or not the processing has come to a close. If the result of check at step S207 is NO, the CPU 51 reverts to step S202 and, if otherwise, to step S208. At this step S208, the CPU 51 executes the end processing for the label software.

FIG. 77 shows the detailed processing flow of the processing at step S203 of FIG. 76. In FIG. 77, when the processing for changing the time movement unit (change of the time increasing/decreasing interval) is started, the CPU 51 at step S211 verifies whether or not the information change point unit has been set as the movement unit. If the result of check at step S211 is YES, the CPU 51 proceeds to step S213 and, if otherwise, to step S212. At step S213, the CPU 51 sets the information change point as the time movement intervals (time increasing/decreasing intervals or time increasing/decreasing steps) to terminate the time movement unit change processing to proceed to step S204 of FIG. 76. At step S212, the CPU 51 sets the specified unit (100 years, 10 years, 1 year, 1 month. 1 day, . . . to terminate the time movement unit change processing to proceed to the processing at step S204 of FIG. 76.

FIG. 78 shows the detailed processing flow of the processing at step S205 of FIG. 76. In FIG. 78, when the time movement processing is started, the CPU 51 at step S221 verifies whether or not the time movement is directly commanded by the above-mentioned operation time display unit oti. If the result of check at step S221 is YES, the CPU 51 proceeds to step S223 and, if otherwise, to step S222. At step S223, the CPU 51 sets the above-mentioned directly commanded time as the time movement interval (time increasing/decreasing interval or time increasing/decreasing step) before terminating the time movement processing to proceed to step S206 of FIG. 76. At step S222, the CPU 51 checks whether or not the information change point interval has been set as the time movement interval (time increasing/ decreasing interval or time increasing/decreasing step). If the result of check at step S222 is NO, the CPU 51 proceeds to step S225 and, if otherwise, to step S224. At step S225, the CPU 51 advances (or retracts) the time with the so-set time interval to then terminate the time movement processing to proceed to the processing of step S206. At step S224, the CPU 51 retrieves the next or previous change point. The CPU 51 at step S226 verifies whether or not the next or previous change point has been found. If the result of check at step S226 is NO, the CPU 51 terminates the time movement processing to proceed to step S206 of FIG. 76 and, if otherwise, to step S227. At this step S227, the CPU 51 terminates the time movement processing to proceed to step S206 of FIG. 76. If the result of check at step S226 is YES, the CPU 51 proceeds to step S227, where the CPU 51 sets the time as found by retrieval as the movement time to then terminate the time movement processing to proceed to the processing of step S206 of FIG. 76.

With the label software of the present embodiment, having the above-described functions, a jog dial can be used as a user interface for label time movement on the desktop. With the use of the jog dial, the operation of advancing/ retracting the time is realized by the operation of rotating the jog dial in the rightward/leftward direction to provide for smooth time movement processing operations.

With the label software of the present embodiment, having the above-described functions, the jog dial pushing operation can be allocated to the alteration of the advancing/ retracting time interval. Therefore, the entire operations of changing the label time can be realized solely by jog dial operation, as a result of which the time change can be realized without using routine keyboard or mouse.

With the label software of the present embodiment, having the above-described functions, the jog dial pushing operation can be allocated not only to making change in the regular time increasing/decreasing interval in label display but also to making the above-mentioned change point movement of the label information. The result is that the time movement with the attention directed only to the information change point can be realized solely by actuation on the jog dial.

Moreover, with the label software of the present embodiment, having the above described functions, the amount of label time movement can be varied depending on the rotating speed of the jog dial to render more prompt retrieval of discrete time points.

In addition, with the label software of the present embodiment, having the above-described functions, the jog dial pushing is used as a trigger for the time movement mode and the subsequent jog dial rotation/pushing operation is allocated to the above-mentioned time movement operation. By dividing the function between the short jog dial pushing and the long jog dial pushing, the entire operation of entering into the time movement mode/exiting the time movement mode can be realized solely by the jog dial. In this manner, the information scattered in the present/past/ future can be browsed solely by the jog dial. It is noted that data correction is in need of input devices, such as a keyboard or a mouse.

Furthermore, with label software of the present embodiment, the time movement processing is facilitated by employing a shift key or a control key in combination with the jog dial rotating/pushing operation to execute counter-functions. If, for example, the unit of the time increasing/ decreasing interval are changed from smaller to larger values, by pushing the jog dial, and the shift key or the control key is used in combination, the unit of the time increasing/decreasing interval is changed in an opposite direction to the case of using only the jog dial to facilitate selection of the unit of the time increasing/decreasing interval.

The processing flow in the CPU 51 in case the time movement to present/past/future is to be realized by the jog dial operation is shown in FIGS. 79 to 82.

Figure 79:
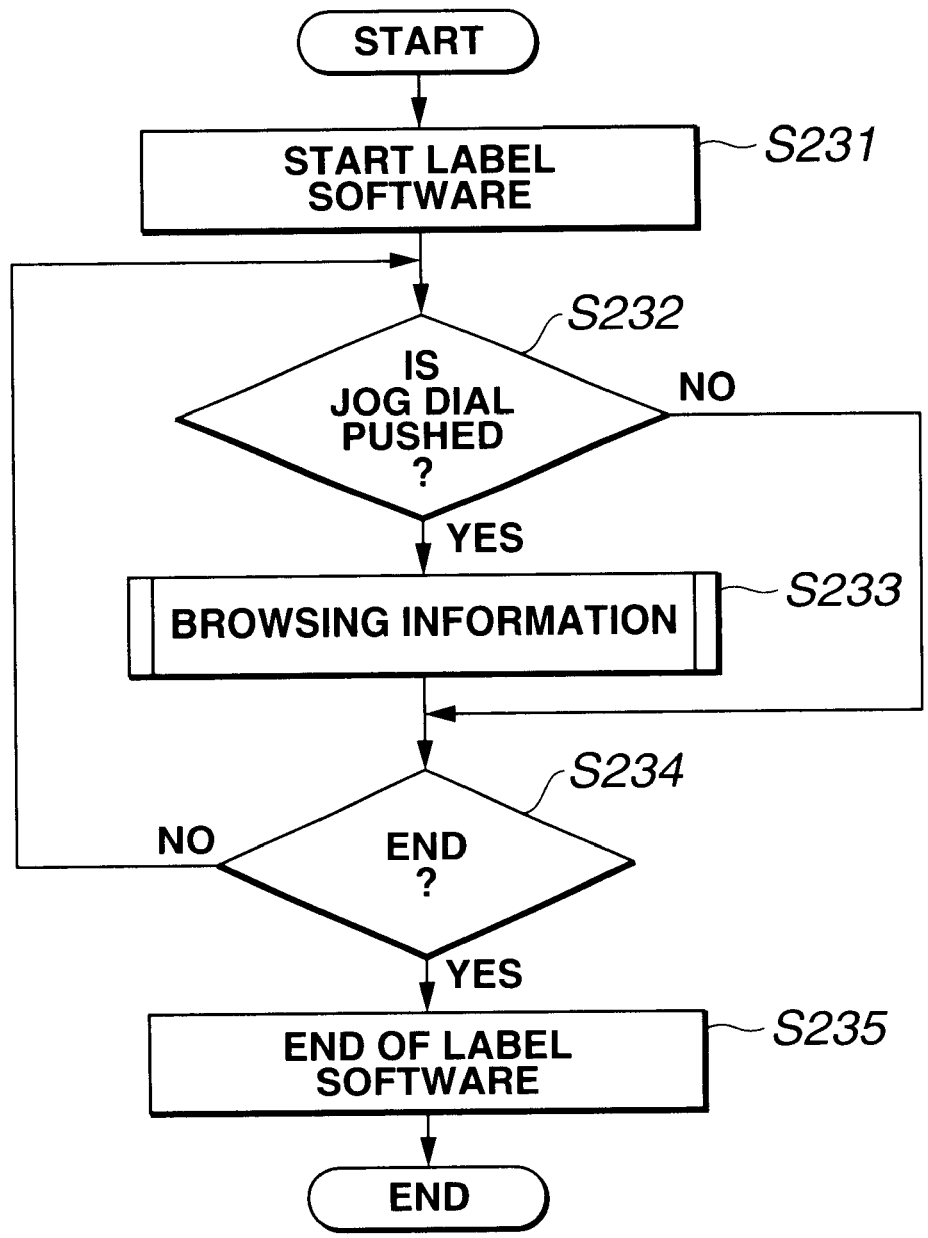
FIG. 79 is a flowchart showing the overall processing in case the processing for enabling time shift to an optional time of the present/past/future is to be realized by a jog dial operation on a CPU.

FIG. 79 shows the overall flow in case the time movement to present/past/future is to be realized by the jog dial operation. If, at step S231, the label software is started, the CPU 51 at step S232 verifies whether or not the jog dial has been thrust. If the result of check at step S232 is NO, the CPU 51 proceeds to step S234 and, if otherwise, to step S233. At step S233, the CPU 51 browses the information by rotation of the jog dial. At step S234, the CPU 51 verifies whether or not the processing has come to a close. If the result of check at step S234 is NO, the CPU 51 reverts to step S232 and, if otherwise, the CPU 51 proceeds to step S235, where the label software proceeds to terminate the label software.

Figure 80:
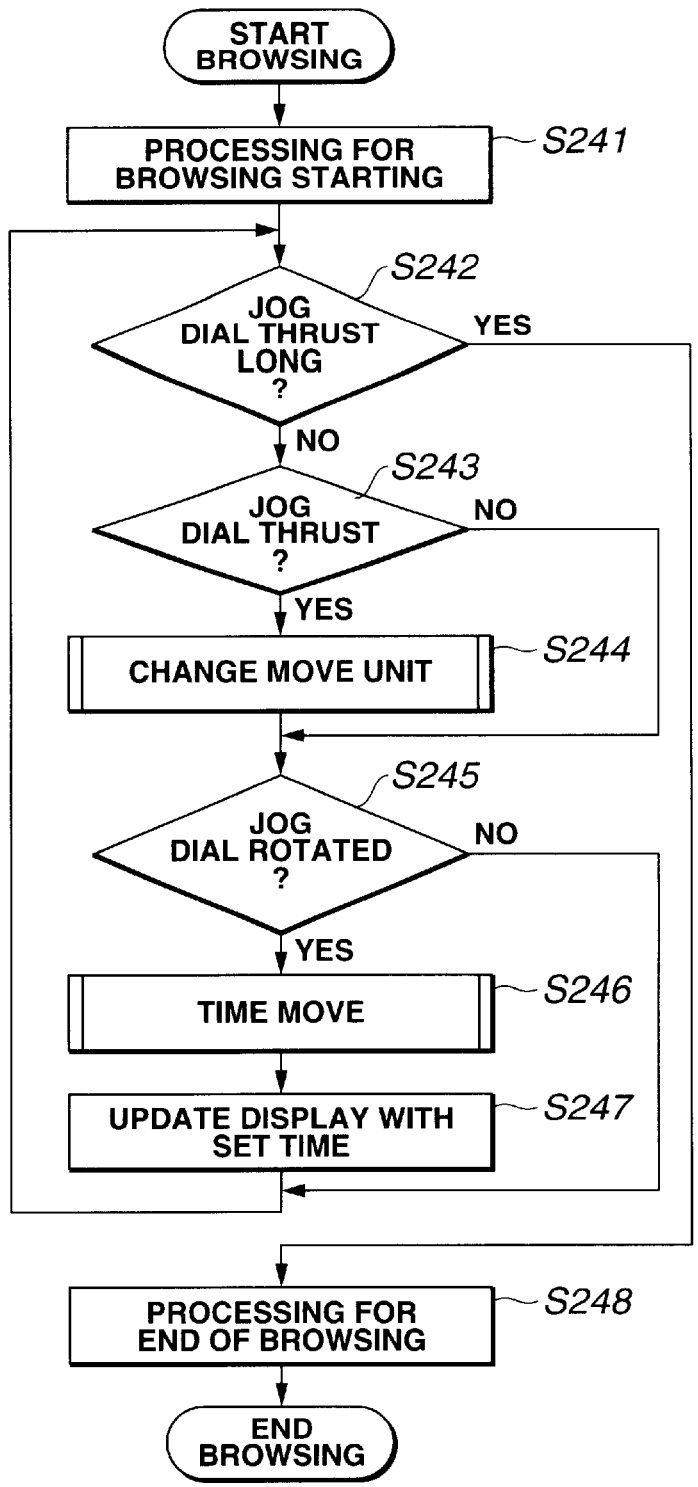
FIG. 80 is a flowchart showing details of the information browsing processing at step S233 of the flowchart of FIG. 79.

FIG. 80 shows the detailed processing flow performed at step S233 of FIG. 79. If, in FIG. 80, the browsing processing by the jog dial is started, the CPU 51 at step S242 verifies whether or not the jog dial has been pushed for long time, with the interval since pushing until release of the jog dial being not shorter than 1 sec. If the result of check at step S242 is YES, the CPU 51 terminates the browsing processing to proceed to step S234 of FIG. 79 and, if otherwise, the CPU 51 proceeds to step S243. At this step S243, the CPU 51 verifies whether or not the jog dial has been pushed, with the interval since pushing until release of the jog dial being not longer than 1 sec. If the result of check at step S243 is NO, the CPU 51 proceeds to step S245 and, if otherwise, to step S244, where the CPU 51 changes the time increasing/decreasing unit corresponding to the pushing of the jog dial. When the CPU 51 proceeds to step S245, the CPU 51 verifies whether or not rotation of the jog dial has been made. If the result of check at step S245 is NO, the CPU 51 reverts to step S242 and, if the result of check at step S245 is YES, the CPU 51 proceeds to step S246 where the CPU 51 executes time movement processing corresponding to the rotation of the jog dial. At step S247, the CPU 51 changes the display with the set time to then revert to step S242. At step S248, the CPU 51 terminates the browsing by the jog dial to proceed to the processing of step S234 of FIG. 79.

Figure 81:
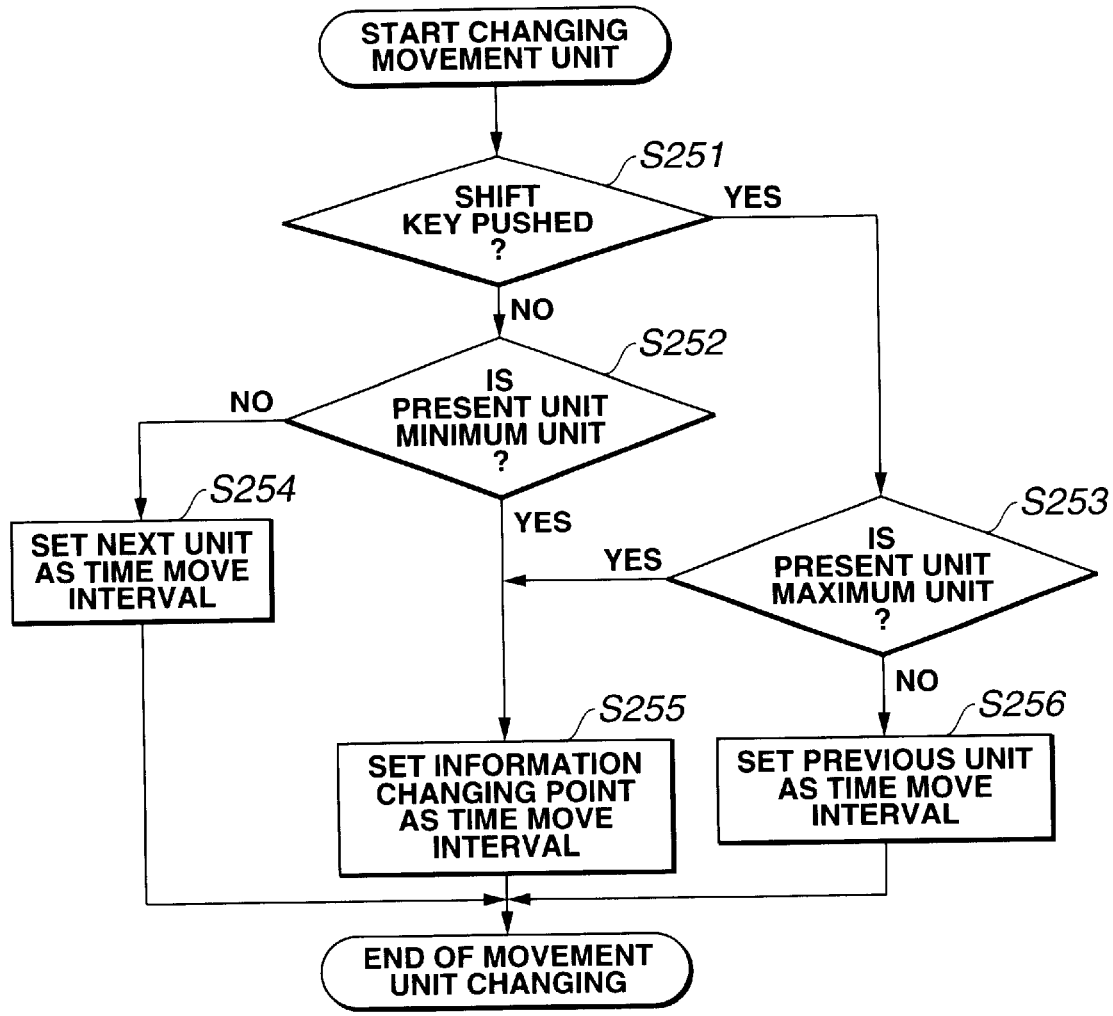
FIG. 81 is a flowchart showing details of the movement unit changing processing at step S244 of the flowchart of FIG. 80.

FIG. 81 shows the detailed processing flow of step S244 of FIG. 80. In FIG. 81, the CPU 51 verifies at step S251 whether or not the shift key has been thrust. If the result of check at step S251 is YES, the CPU 51 proceeds to step S253 and, if otherwise, to step S252. At this step S252, the CPU 51 checks whether or not the current time interval unit (time increasing/decreasing unit or step) is the minimum unit. If the result of check at step S252 is YES, the CPU 51 proceeds to step S255 and, if otherwise, to step S254. At step S253, the CPU 51 checks whether or not the current time interval unit (time increasing/decreasing unit or step) is the maximum unit. If the result of check at step S253 is YES, the CPU 51 proceeds to step S255 and, if otherwise, to step S256. At step S254, the CPU 51 sets the next unit on the operation time display unit oti as the time movement interval (time increasing/decreasing unit or time increasing/decreasing step). The CPU 51 then terminates the movement unit changing operation to proceed to step S245 of FIG. 80. At step S255, the CPU 51 sets the above-mentioned information change point as the time movement interval (time increasing/decreasing unit or time increasing/decreasing step). The CPU 51 then terminates the time movement unit changing processing to proceed to step S245 of FIG. 80. At step S256, the CPU 51 sets the previous unit of the operation time display unit oti as the time movement interval (time increasing/decreasing unit or time increasing/decreasing step). The CPU then terminates the time movement unit changing processing to proceed to step S245 of FIG. 80.

Figure 82:
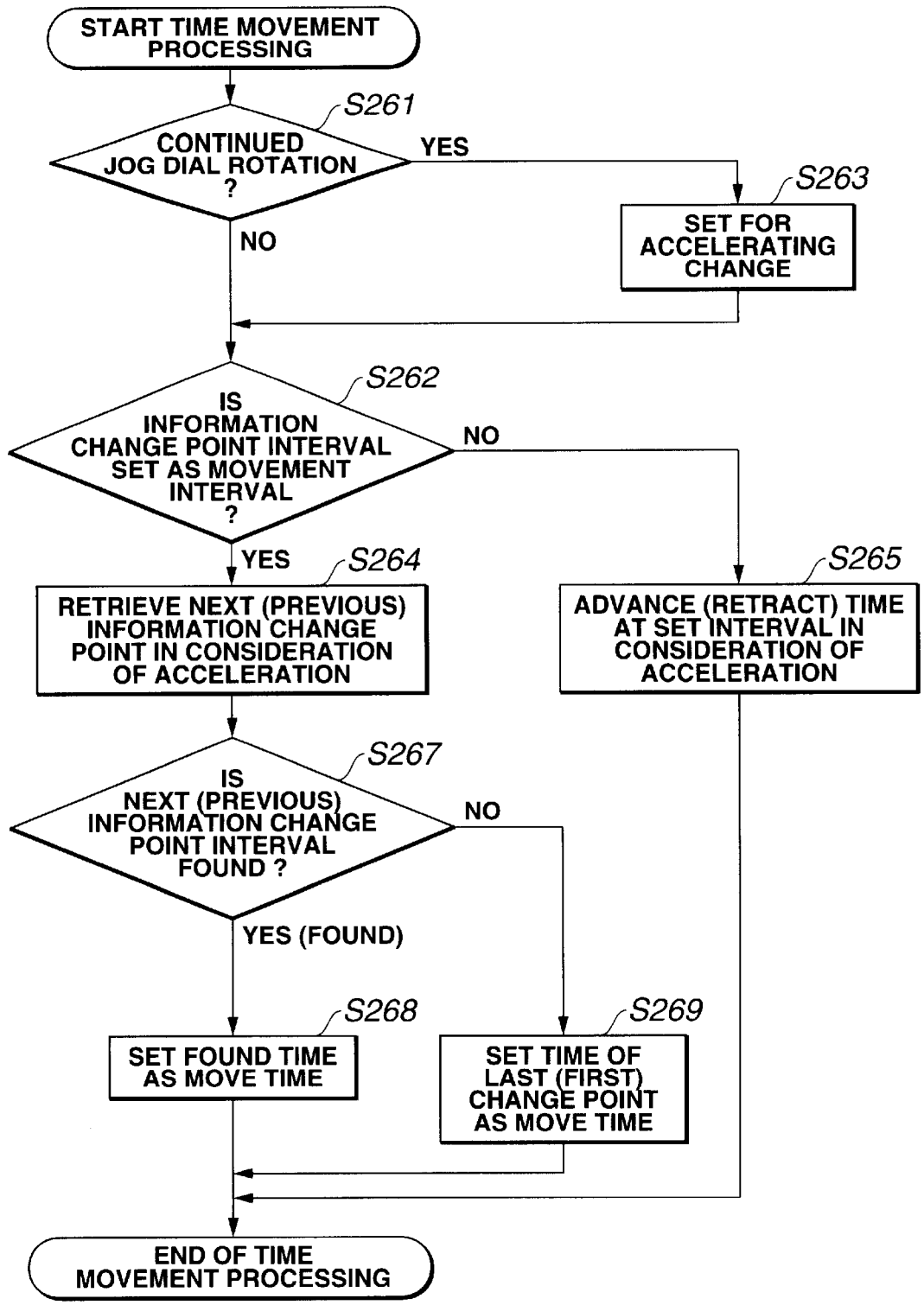
FIG. 82 is a flowchart showing details of the time movement processing at step S246 of the flowchart of FIG. 80.

FIG. 82 shows the detailed processing flow of step S246 of FIG. 80. In FIG. 82, the CPU 51 verifies at step S261 whether or not continuous jog dial rotating operation has been made. If the result of check at step S261 is YES, the CPU 51 proceeds to step S263 and, if otherwise, to step S262. At step S263, the CPU 51 sets to perform time increasing/decreasing at an accelerated pace, that is to accelerate time increasing/decreasing, in agreement with the continuous rotating processing of the jog dial, before proceeding to step S262. At step S262, the CPU 51 verifies whether or not the information changing point interval has been set as the time movement interval (time increasing/decreasing unit or time increasing/decreasing step). If the result of check at step S262 is YES, the CPU 51 proceeds to step S264 and, if otherwise, to step S265. At step S264, the CPU 51 retrieves the next (or previous) information changing point, as it takes into account the results of check at step S261, if the acceleration setting is made at step S263. The CPU 51 then proceeds to step S267. At step S265, the CPU 51 advances the time with the time interval as set, as it takes into account the results of check at step S261, if the acceleration setting is made at step S263. The CPU 51 then terminates the time movement processing to proceed to step S267 of FIG. 80. At this step S267, the CPU 51 verifies whether or not the next (or previous) information changing point has been found. If the result of check at step S267 is YES, the CPU 51 proceeds to step S268 and, if otherwise, to step S269. At this step S269, the CPU 51 sets the time of the last (or first) change point as the movement time to then terminate the time movement processing to proceed to the processing of step S247 of FIG. 80.

In the label software of the present embodiment, having the above-described functions, the time movement processing by the jog dial as discussed above can be reflected, as a jog dial guide, on the picture. Moreover, with the label software of the present embodiment, a portion of the picture (rotation animation unit ra of the time view console) can be displayed as the rotation animation, in agreement with the jog dial rotating operation, while the difference in the jog dial rotating operation can be represented by changing the direction of the rotation animation.

Moreover, in the label software of the present embodiment, the current time is represented by numerical figures on the operation time display unit oti, whilst the western calendar graph is represented on the Christian era gauge unit cg, so that these representations can be made in real-time. In addition, time changes is rendered more definite by scrolling the western calendar graph. Meanwhile, in the western calendar graph, the current time and the time of the label displayed on the desktop are indicated by different lines, such as with different colors, to enable the relationship between the current time and the display time to be recognized more easily.

Furthermore, with the label software of the present embodiment, the desktop background picture is varied with the present/past/future to render the currently feasible operations definite. For example, the situation in which correction is not possible in the past, only the label operation appointment is possible for future and all operations are feasible at present is clarified for the user by changing the desktop background picture.

Figure 84:
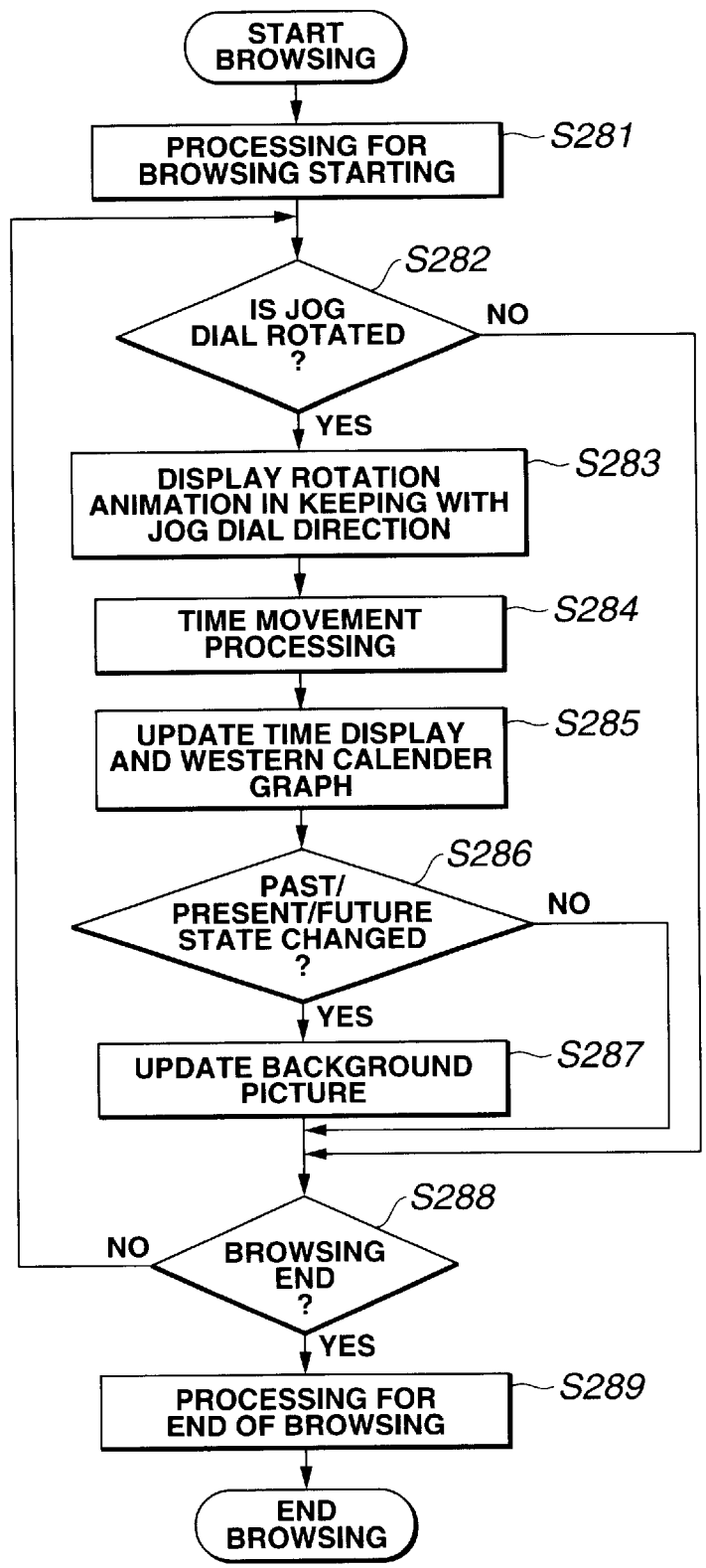
FIG. 84 is a flowchart showing details of the information browsing processing at step S273 of the flowchart of FIG. 83.
Figure 85:
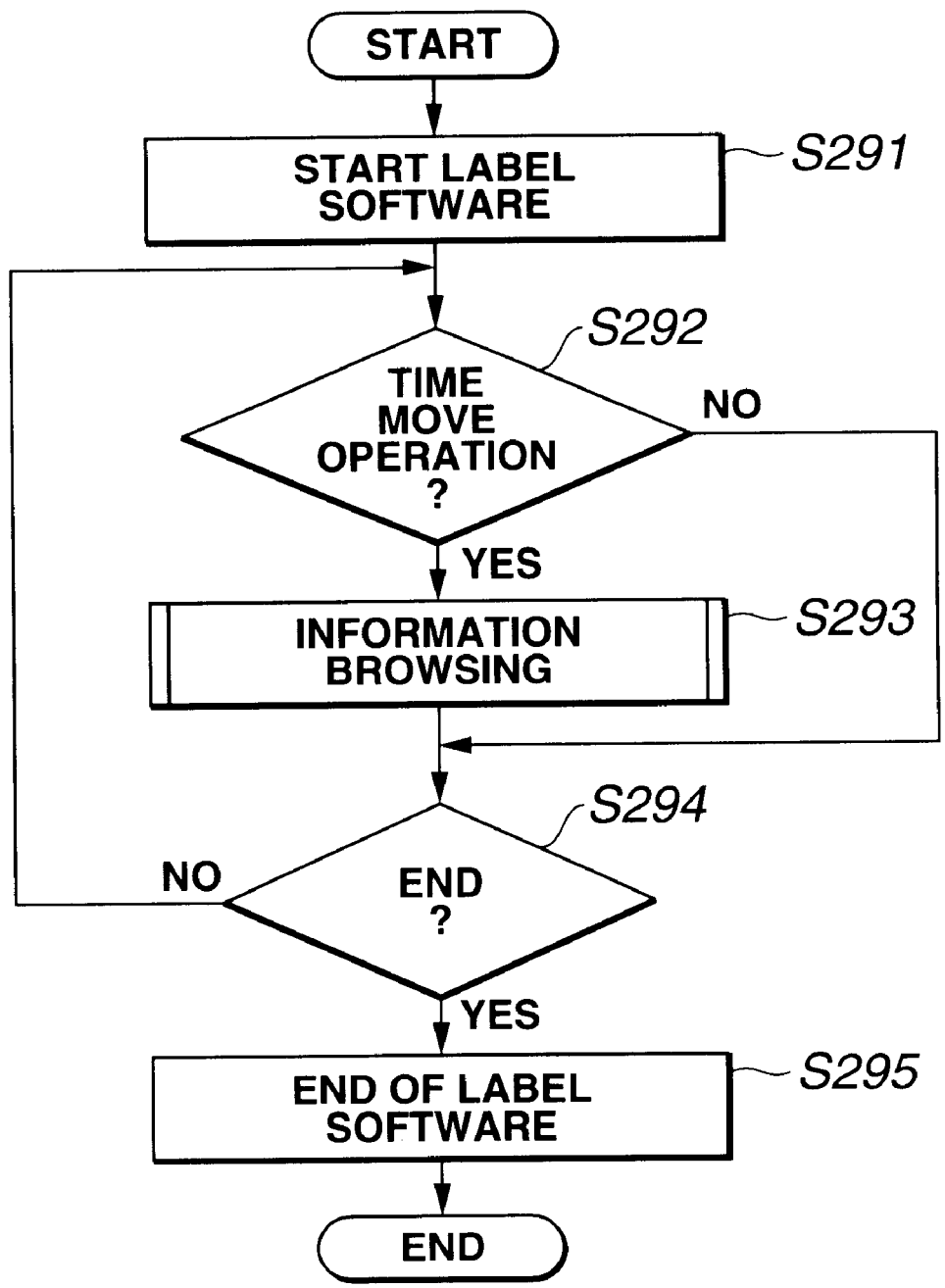
FIG. 85 is a flowchart showing the overall processing in case the function of presenting the label state to the user by changing the fringe color of the correction inhibiting label is to be implemented by a CPU.

FIGS. 84 and 85 shows the processing flow in the CPU 51 in which the displaying function of the jog dial guide or the western calendar graph is realized with the personal computer.

Figure 83:
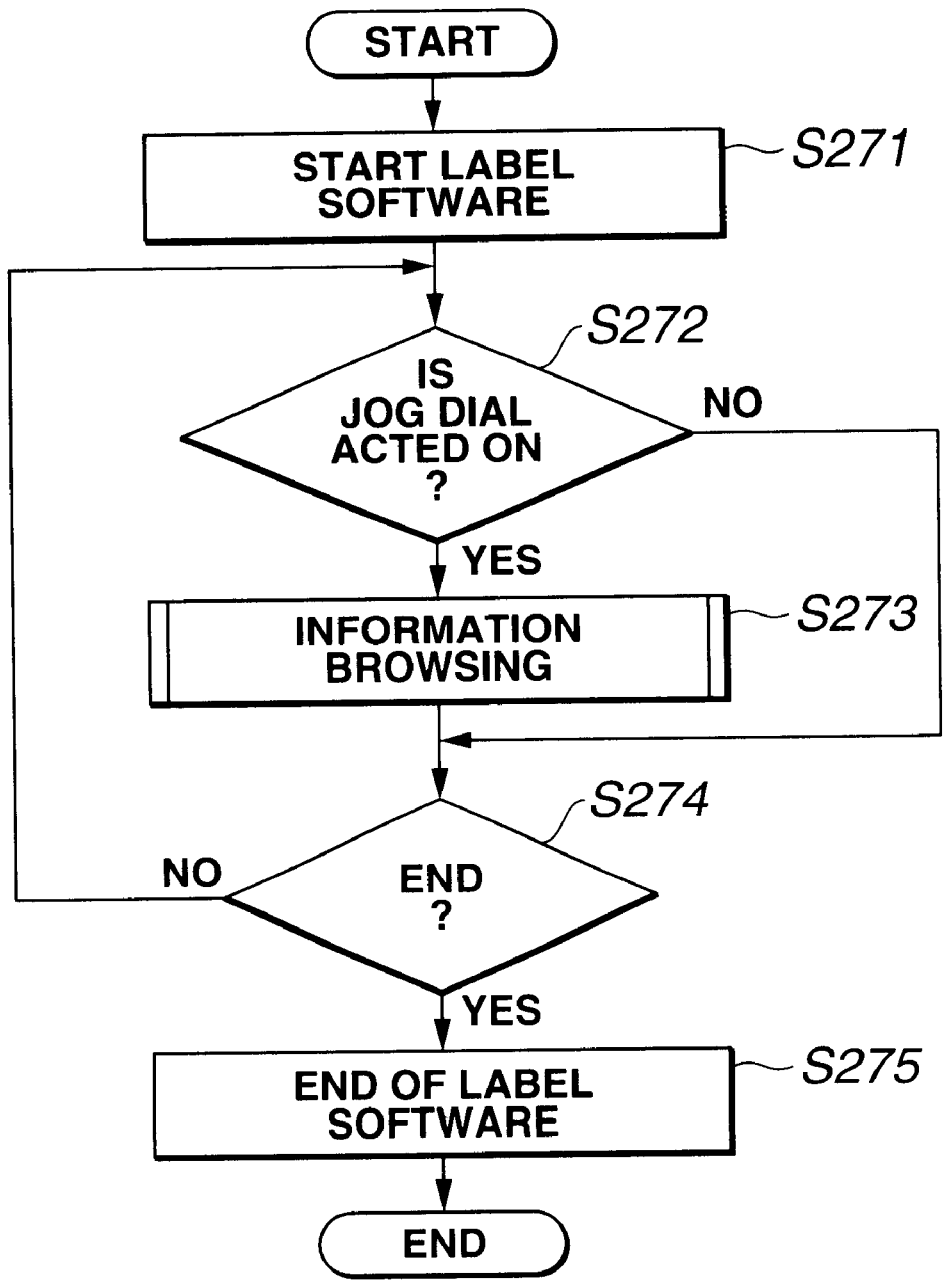
FIG. 83 is a flowchart showing the overall processing in case the processing for using the jog dial operation as a user interface for time movement is to be implemented by a CPU.

FIG. 83 shows the overall flow when the jog dial operation is used as a user interface for time movement. First, when the label software is started at step S271, the CPU 51 at step S272 verifies whether or not the jog dial has been rotated. If the result of check at step S272 is NO, the CPU 51 proceeds to step S274 and, if otherwise, to step S273. At this step S273, the CPU 51 browses the information in keeping with the rotation of the jog dial. At step S274, the CPU 51 verifies whether or not the processing has come to a close. If the result of check at step S274 is NO, the CPU 51 reverts to step S272 and, if otherwise, to step S275, where the CPU 51 terminates the label software.

FIG. 84 shows the detailed processing flow at step S273 of FIG. 83. In FIG. 84, when the browsing processing in agreement with the jog dial actuation at step S281, the CPU 51 at step S282 whether or not the jog dial has been rotated.

If the result of check at step S282 is YES, the CPU 51 proceeds to step S283 and, if otherwise, to step S288. At step S283, the CPU 51 displays the rotation animation in agreement with the direction of jog dial rotation. At step S284, the CPU 51 performs time movement in agreement with the direction and the amount of jog dial rotation. In addition, the CPU 51 at step S285 displays the time by the time movement processing and updates the western calendar graph. The CPU 51 then at step S286 checks whether or not the past/present/future state has been changed. If the result of check at step S286 is NO, the CPU 51 proceeds to step S288 and, if otherwise, to step S287, where the CPU 51 updates the background picture of the desktop picture depending on its past/present/future state to then proceed to step S288. At this step S288, the CPU 51 checks whether or not the browsing processing in keeping with the jog dial actuation is to be terminated. If the processing is verified not to be terminated, the CPU 51 reverts to step S282 and, if otherwise, the CPU 51 performs the browser terminating processing at step S289 to then proceed to the processing of step S274 of FIG. 83.

In the label software of the present embodiment, having the above-mentioned functions, the state whether or not the information of respective labels can be changed during information browsing in the past/present/future is displayed on a label to realize the function of enabling the label state to be presented to the user. For displaying the label state, an icon may be shown on a portion of the label. Alternatively, labels may also be fringed such as by changing the fringe color. If the number of label states is increased from two, namely the correctable state and the correction inhibiting state, for clarifying the reason for correction inhibition, the user is able to recognize the state more clearly.

Figure 86:
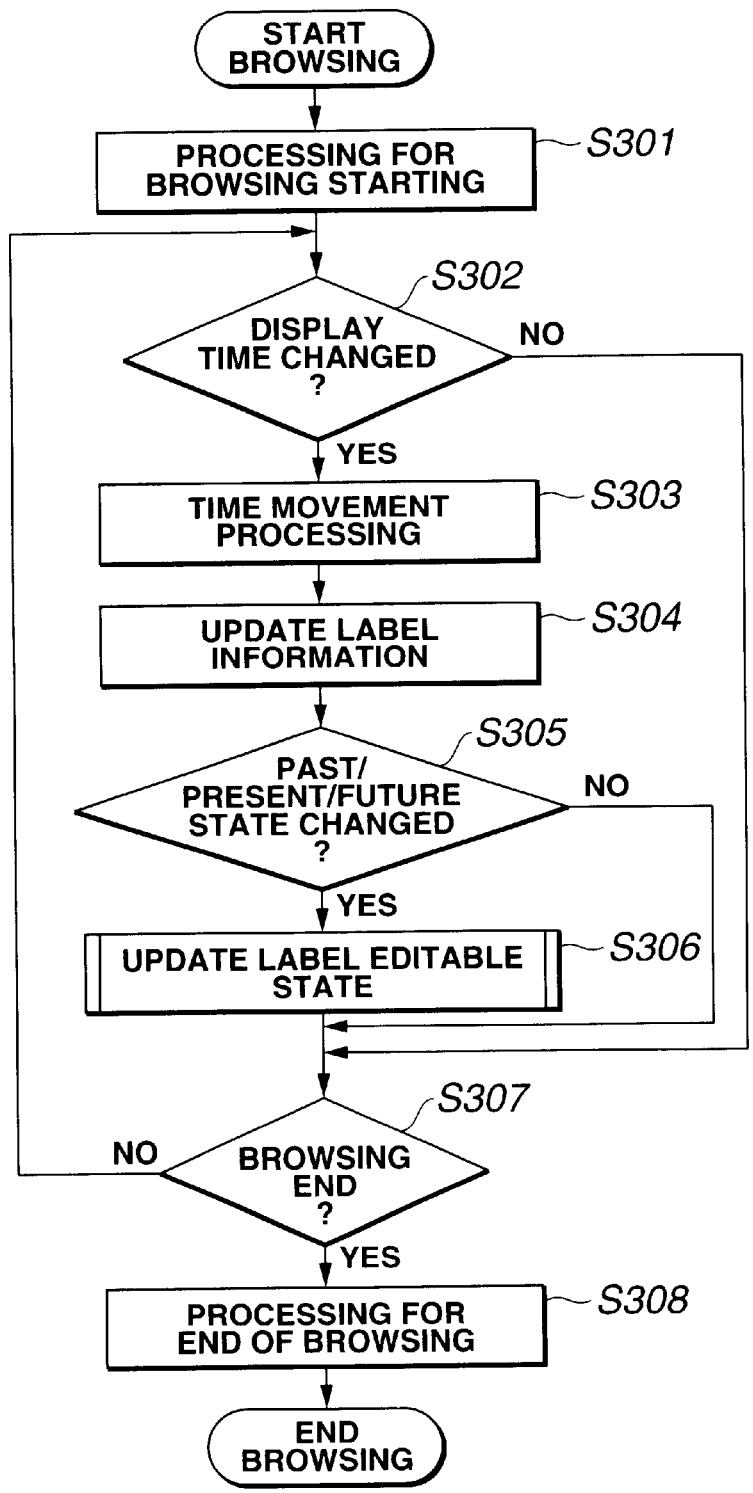
FIG. 86 is a flowchart showing details of the information browsing processing at step S293 of the flowchart of FIG. 85.
Figure 87:
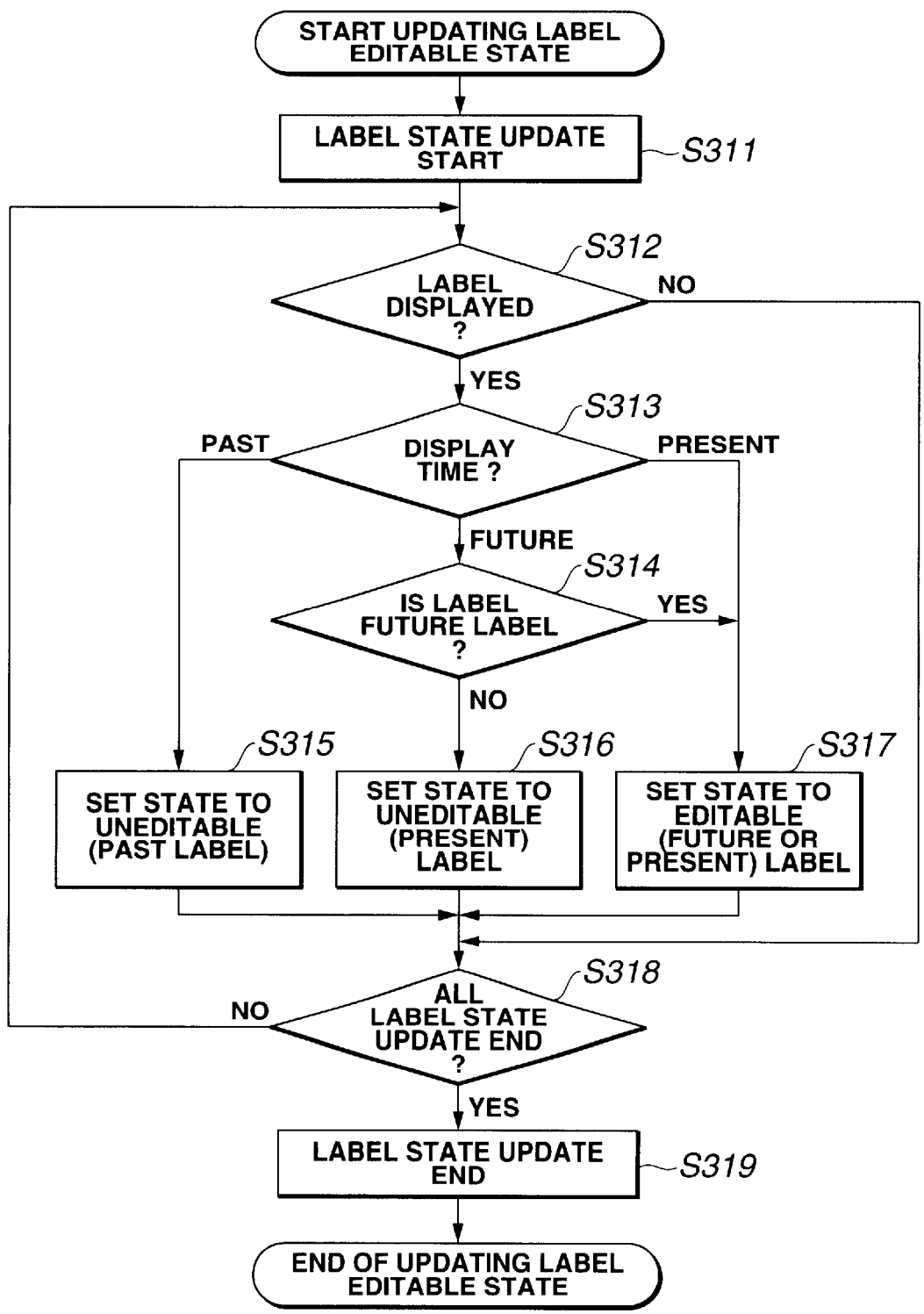
FIG. 87 is a flowchart showing details of the label editable state updating processing at step S307 of the flowchart of FIG. 86.

FIGS. 85 to 87 show processing flow in the CPU 51 in case the label state presenting function is to be realized by a personal computer using the label software of the present embodiment.

FIG. 85 shows the overall flow of the function presenting the label state to the user. When the label software is started at step S291, the CPU 51 at step S292 verifies whether or not the time movement processing has been made by rotation of the jog dial, keyboard actuation or the up/down button tub, tdb. If the result of check at step S292 is YES, the CPU 51 proceeds to step S29, where the CPU 51 performs an information browsing operation in keeping with the time movement processing. At step S294, the CPU 51 verifies whether or not the processing has come to a close. If the result of check at step S294 is NO, the CPU 51 reverts to step S292 and, if otherwise, the CPU 51 proceeds to step S295, where the CPU 51 terminates the label software.

FIG. 86 shows the detailed processing flow at step S293 of FIG. 85. In FIG. 86, if the browsing by the time movement processing at step S301 is started, the CPU 51 at step S301 verifies whether or not the display time has been changed by the time movement processing. If the result of check at step S301 is YES, the CPU 51 proceeds to step S303 and, if otherwise, to step S307. At step S303, the CPU 51 performs time movement processing consistent with the time movement processing. At step S304, the CPU 51 updates the label information. The CPU 51 then verifies at step S305 whether or not the past/present/future state has been changed. If the result of check at step S305 is NO, the CPU 51 proceeds to step S307 and, if otherwise, to step S306. At this step 5306, the CPU 51 performs the processing for updating of the label editable state, such as changing the fringe color, depending on its past/present/future state, before proceeding to step S307. At this step S307, the CPU 51 checks whether or not the browsing is to be terminated. If the result of check at step S307 is NO, the CPU 51 reverts to step S302 and, if otherwise, the CPU 51 proceeds to the processing of step S294.

FIG. 87 shows the detailed processing flow at step S306 of FIG. 86, in which, when the label state updating processing is started at step S311, the CPU 51 at step S312 verifies whether or not the label has been displayed. If the result of check at step S312 is YES, the CPU 51 proceeds to step S313 and, if otherwise, to step S318. At step S313, the CPU 51 verifies whether the display time is past, present or future. If the CPU 51 verifies that the display time is past, present or future, the CPU 51 proceeds to steps S315, 314 or 317, respectively. If the CPU 51 has verified at step S313 that the display time is future, the CPU 51 at step S314 verifies whether or not the label is a future label. If the result of check at step S314 is YES, the CPU 51 proceeds to step S317 and, if otherwise, to step S316. At step S315, the CPU 51 sets the label state to uneditable (past label) before proceeding to step S318. At step S316, the CPU 51 sets the label state to uneditable (present label) before proceeding to step S318. At step S317, the CPU 51 sets the label state to editable (present or future label) before proceeding to step S318. At step S318, the CPU 51 checks whether or not the updating processing of the entire labels has come to a close. If the result of check at step S318 is NO, the CPU 51 reverts to step S312 and, if otherwise, to step S319. At this step S319, the CPU 51 terminates the label state updating before proceeding to step S307 of FIG. 86.

In the label software of the present embodiment, a shortcut button (present button bb) for returning to the current time is provided in the time view console TVC to render it possible to revert to the present time even during browsing the past or the future.

Figure 88:
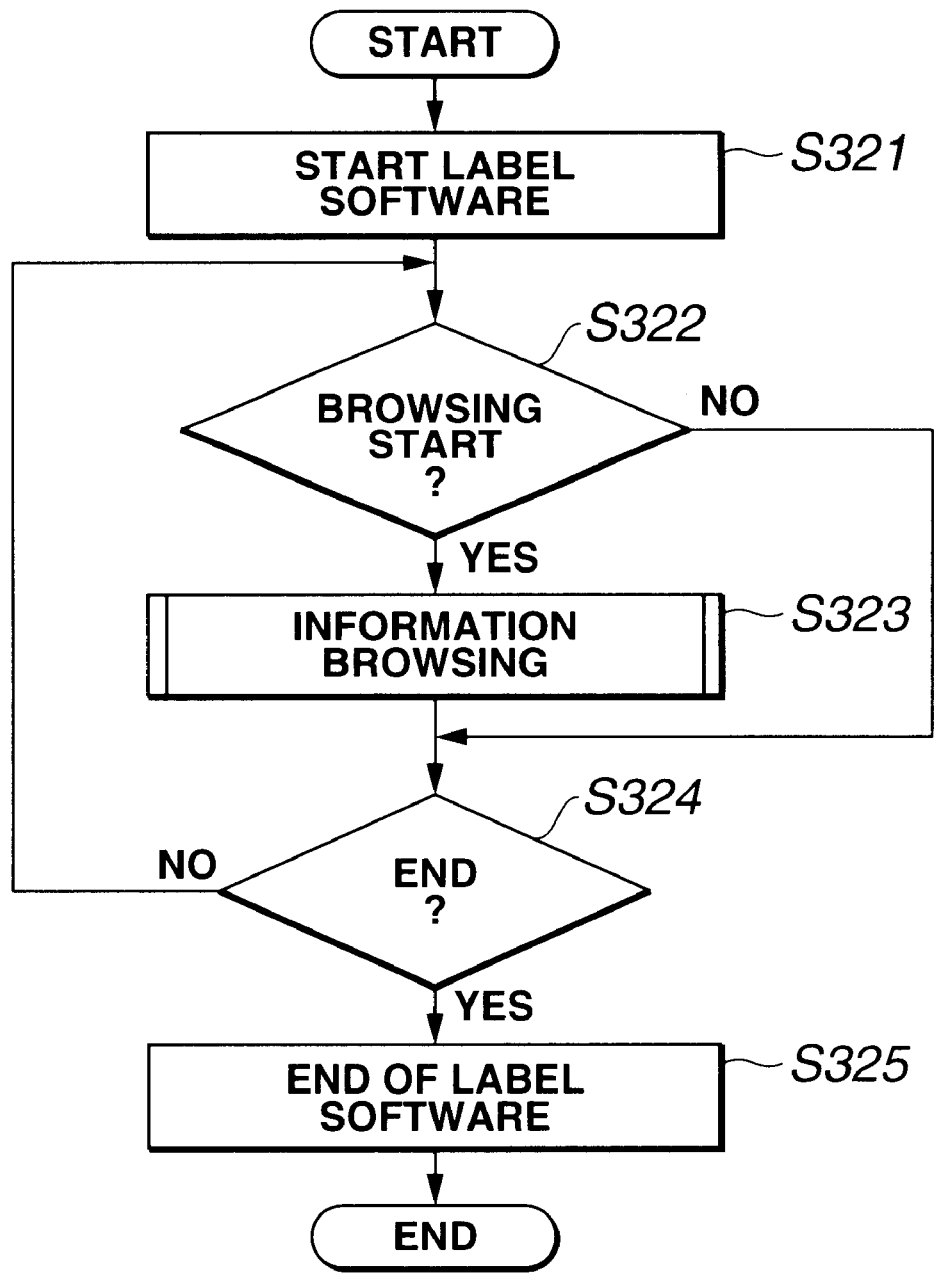
FIG. 88 is a flowchart showing the overall processing in case the function of instantly reverting to the current time by the present button of the time view console is to be implemented by a CPU.
Figure 89:
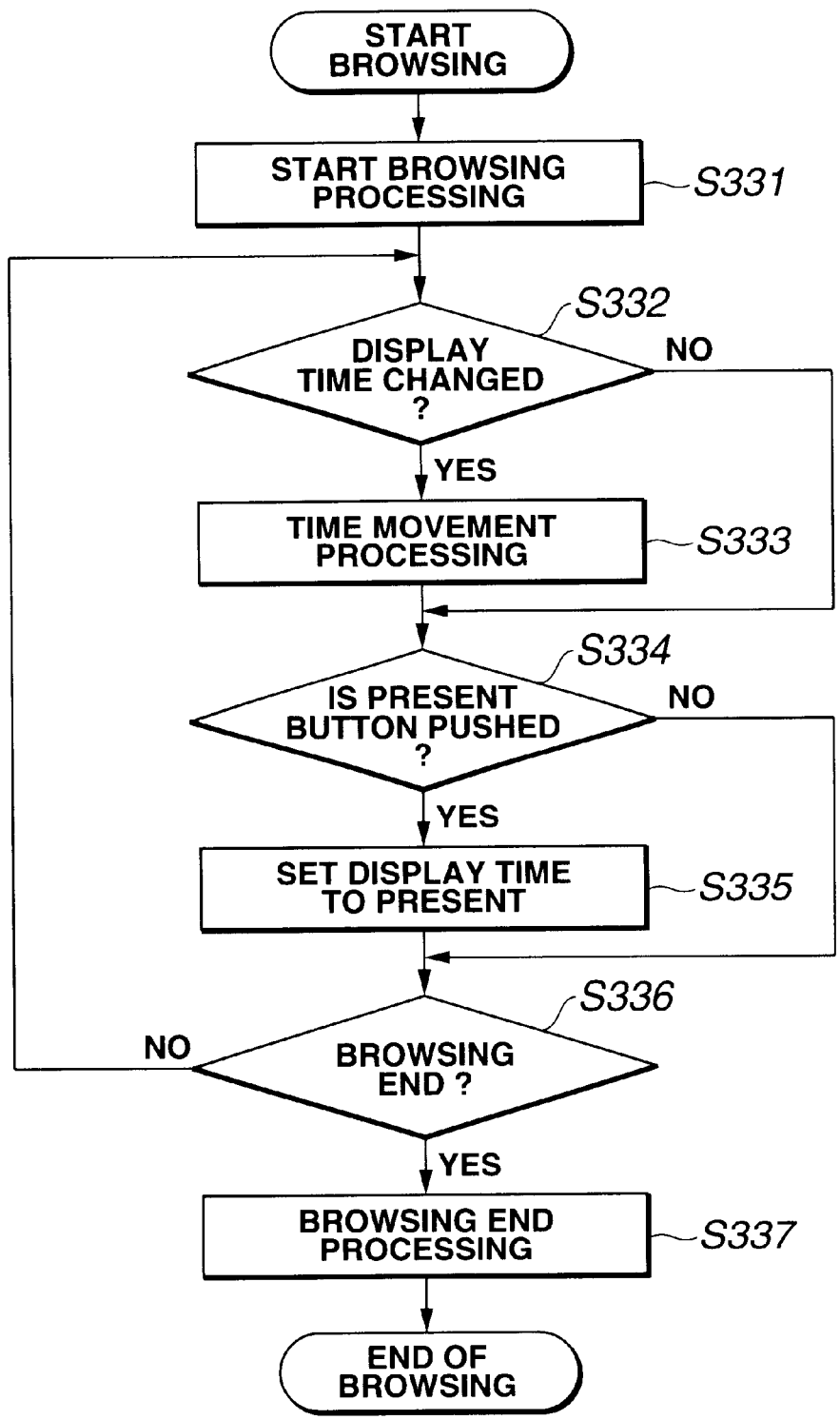
FIG. 89 is a flowchart showing details of the information browsing processing at step S323 of the flowchart of FIG. 88.

FIGS. 88 and 89 show the processing flow in the CPU 51 in case of realizing the function of the shortcut button with the personal computer by the label software of the present embodiment.

FIG. 88 shows the overall flow when reversion is to be made instantly by the present button bb of the time view console TVC. If, at step S321, the label software is started, the CPU 51 verifies whether or not the processing is the browsing is started. If the result of check at step S321 is YES, the CPU 51 proceeds to step S323 and, if otherwise, to step S324. At step S323, the CPU 51 starts browsing the information before proceeding to step S324. At this step S324, the CPU 51 checks whether or not the processing has come to a close. If the result of check at step S324 is NO, the CPU 51 reverts to step S322 and, if otherwise, to step S325, where the CPU 51 performs the label software terminating processing.

FIG. 89 shows the detailed processing flow at step S323 of FIG. 88. In FIG. 89, when the browsing is started at step S332, the CPU 51 verifies whether or not the display time has been changed. If the result of check at step S332 is YES, the CPU 51 proceeds to step S333 and, if otherwise, to step S334. At step S333, the CPU 51 performs time movement processing consistent with the time movement operation. At step S334, it is verified whether or not the present button bb has been pushed. If the result of check at step S334 is YES, the CPU 51 proceeds to step S335 and, if otherwise, to step S336. At step S335, the CPU 51 sets the display time to present to then proceed to step S336. At this step S336, the CPU 51 verifies whether or not the browsing is terminated. If the result of check at step S336 is NO, the CPU 51 reverts to step S332 and, if otherwise, the CPU 51 at step S337 performs the browsing terminating processing to then proceed to step S324 of FIG. 88.

In the label software of the present embodiment, the design of the icon IL of the label software on the task tray TT is made different in the present, past and future modes, and in the all hide states in the present mode, so that a selectable menu will be predicted even if the context menu is not displayed. Meanwhile, this method is useful not only in an application with time shift processing but also in any application where there is no main window and where the menu is allocated to the task tray icon. In an application where there is a main window, it is a frequent occurrence that the state can be displayed in the main window but the task tray icon is always apparent. Therefore, menu items can be predicted even if the main window is minimized in size, without the necessity of resetting the main window to its original size.

Figure 90:
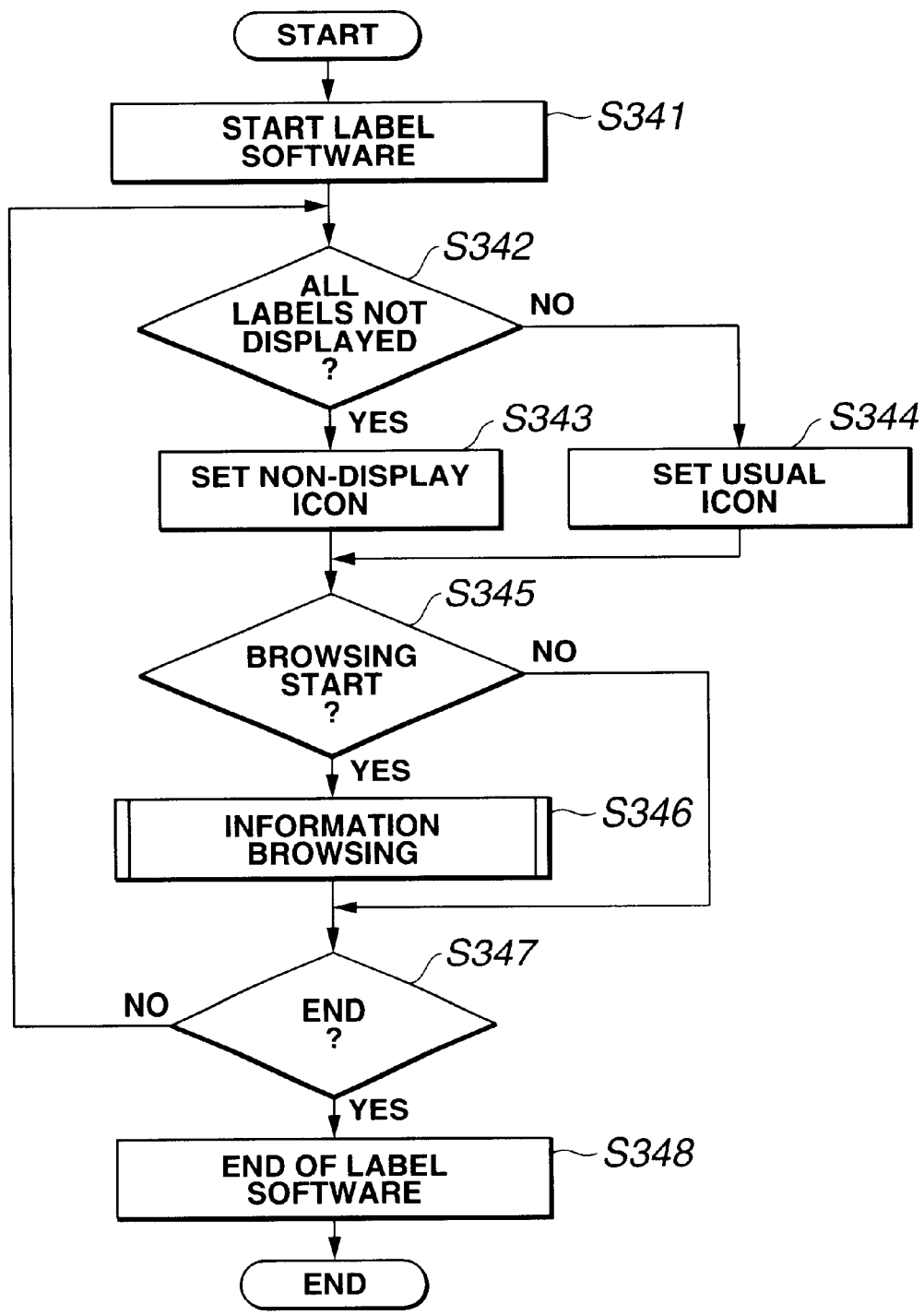
FIG. 90 is a flowchart showing the overall processing in case the function of making the task tray icon design to differ in the present, past and future modes and in the all hide state in the present mode is to be implemented by a CPU.
Figure 91:
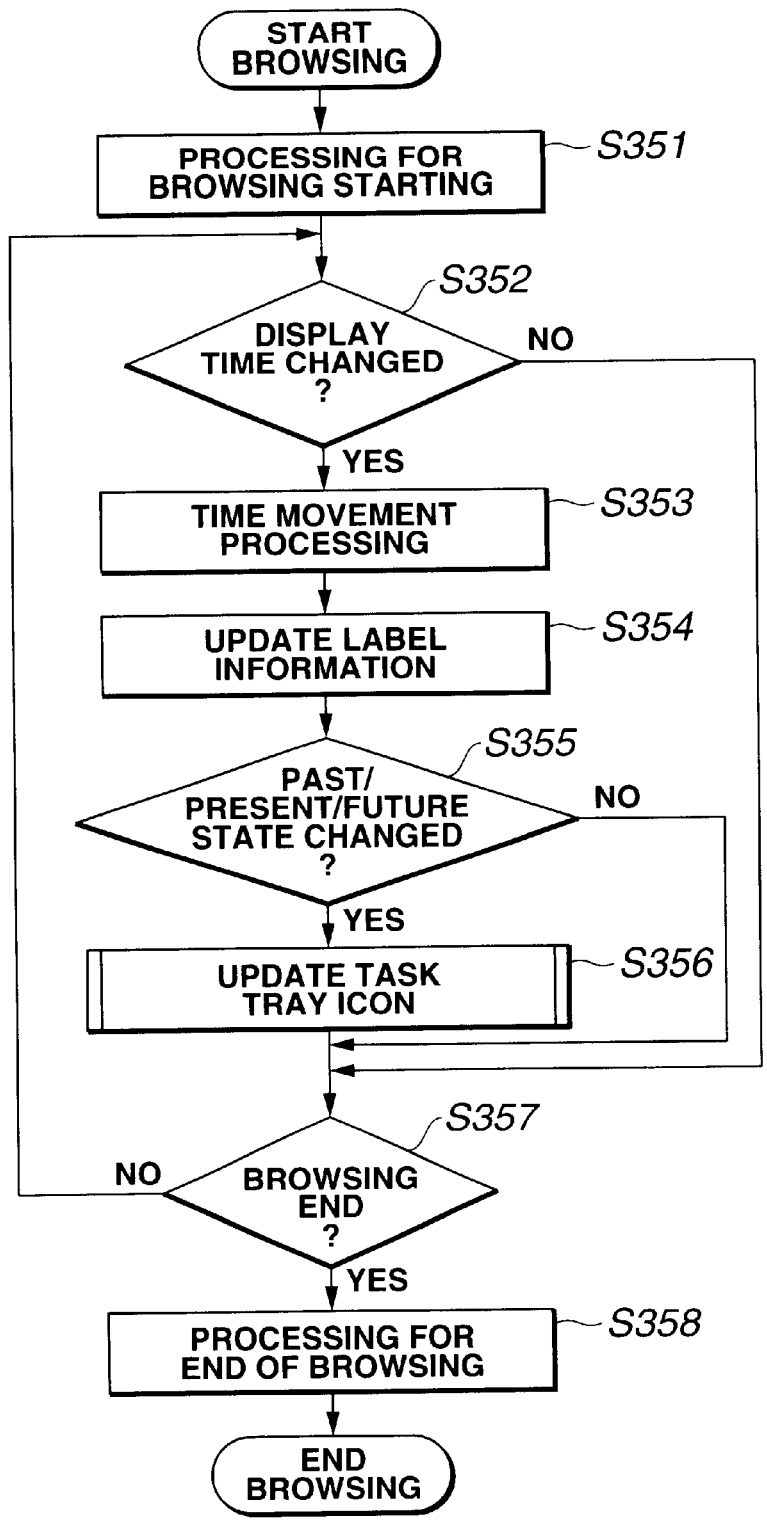
FIG. 91 is a flowchart showing details of the information browsing processing at step S346 of the flowchart of FIG. 90.
Figure 92:
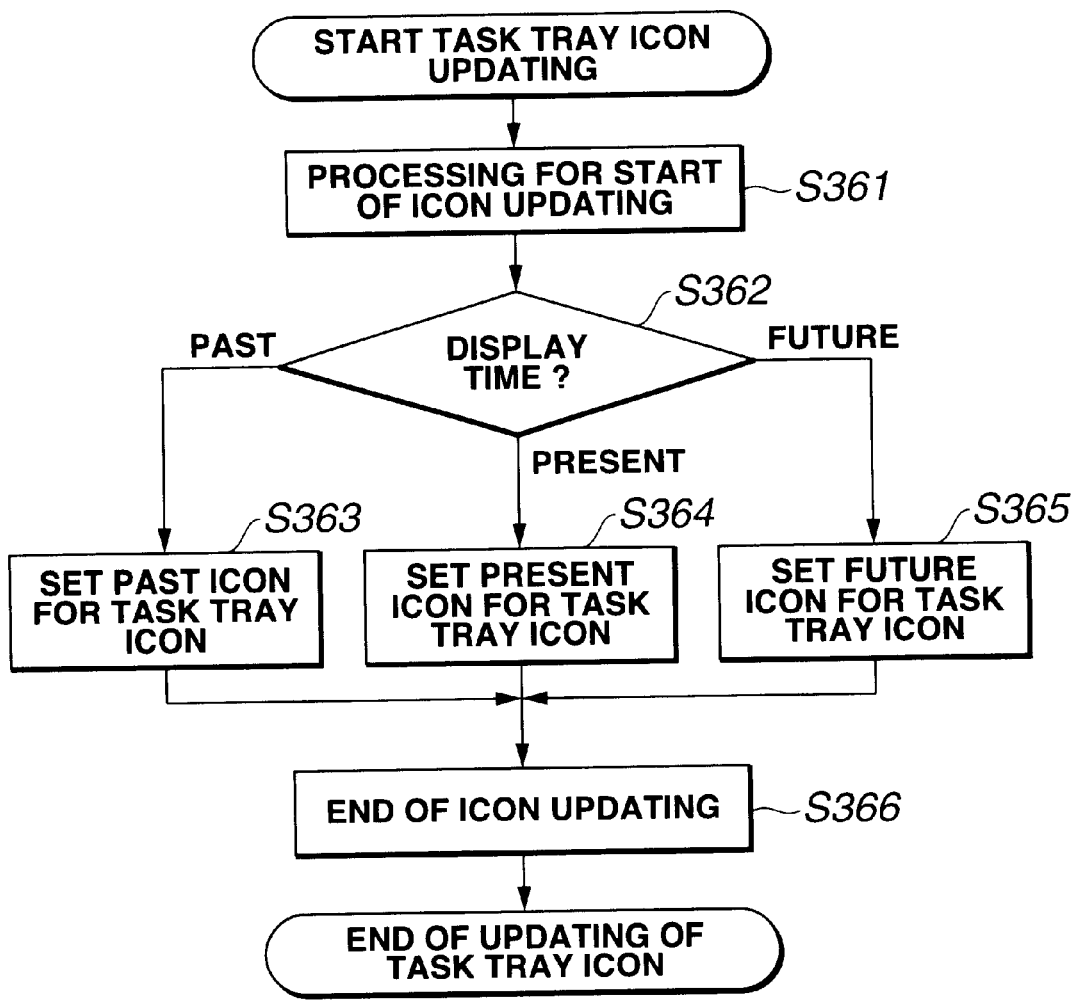
FIG. 92 is a flowchart showing details of the task tray icon updating processing at step S356 of the flowchart of FIG. 91.

The processing flow in which the function of differentiating the design of the label software icon IL on the task tray TT is realized by the personal computer is shown in FIGS. 90 to 92.

FIG. 90 shows the overall flow when the design of the label software icon IL on the task tray TT is made to differ in the present, past and future modes and in the all hide mode in the present mode. First, when the label software is started at step S341, the CPU 51 checks whether or not the entire label is in the non-displaying mode. If the result of check at step S341 is YES, the CPU 51 proceeds to step S343 and, if otherwise, to step S344. At step S343, the CPU 51 sets a non-displaying icon on the task tray TT to then proceed to step S345. At step S344, the CPU 51 sets a usual icon on the task tray TT to then proceed to step S345. At this step S345, the CPU 51 verifies whether or not the operation is browsing start. If the result of check at step S345 is YES, the CPU 51 proceeds to step S346 and, if otherwise, to step S347. At step S346, the CPU 51 starts browsing the information to then proceed to step S347. At this step S347, the CPU 51 checks whether or not the processing has come to a close. If the result of check at step S347 is NO, the CPU 51 reverts to S342 and, if otherwise, the CPU 51 proceeds to step S348, where the CPU 51 performs the label software terminating processing.

FIG. 91 shows the detailed processing flow at step S346 of FIG. 90. If, in FIG. 91, the browsing processing is started at step S351, the CPU 51 at step S352 checks whether or not the display time has been changed. If the result of check at step S352 is YES, the CPU 51 proceeds to step S353 and, if otherwise, to step S357. At step S353, the CPU 51 performs time movement processing consistent with the time movement operation. At step S354, the CPU 51 updates the label information to then proceed to step S355. At this step S355, the CPU 51 checks whether or not the past/present/future state has been changed. If the result of check at step S355 is YES, the CPU 51 proceeds to step S356 and, if otherwise, to step S357. At step S356, the CPU 51 updates the task tray icon before proceeding to step S357. At step S357, the CPU 51 checks whether or not the browsing is to be terminated. If the result of check at step S357 is NO, the CPU 51 reverts to step S352, in which case the CPU 51 performs browsing end processing to then proceed to step S374 of FIG. 90.

Figure 43B:
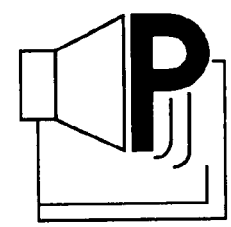
Figure 43C:
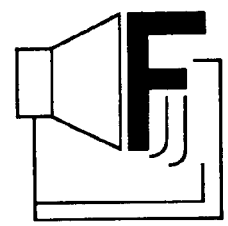
Figure 43D:
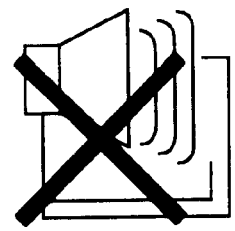

FIG. 92 shows the detailed processing at step S356 of FIG. 91. In FIG. 92, when the icon updating processing is started at step S361, the CPU 51 verifies whether the display time is past, present or future. If the CPU 51 verifies that the display time is past, present or future, the CPU 51 proceeds to steps S363, 364 or 365, respectively. At step S363, the CPU 51 sets a past icon, shown in FIG. 43b, in the label software icon IL on the task tray TT, before proceeding to step S366. At step S364, the CPU 51 sets the present icon, shown in FIG. 43a, on the label software icon IL on the task tray TT, before proceeding to step S366. S366. At step S365, the CPU 51 sets the future icon, shown in FIG. 43c, on the label software icon IL on the task tray TT, before proceeding to step S366. At this step S366, the CPU 51 terminates the icon updating processing before proceeding to step S357 of FIG. 91.

A medium used for installing the program used for implementing the above described sequence of operations to enable execution by the computer may comprise not only package mediums, such as floppy discs, CD-ROMs or DVDs, but also semiconductor memories or magnetic discs in which the program is stored transiently or permanently. The medium may also be implemented by wired or radio communication mediums, such as local area network or Internet or digital satellite broadcasting, or a variety of communication interfaces, such as routers or modems for transferring or receiving a program furnished over these communication mediums. The medium in the present invention should be interpreted broadly as meaning all of these mediums.

What is claimed is:

1. An information processing apparatus, comprising:

link information generating means for generating link information indirectly representing at least one of object information and other information;

storage means for storing information related to a pre-set processing unit, into which said at least one of object information and other information can be pasted;

regenerating means for regenerating a state of said pre-set processing unit; and acquisition means for acquiring said at least one of object information and other information based on said link information, wherein said storage means stores said pre-set processing unit, in which object information of different attributes can be pasted, in association with time information.

2. The information processing apparatus of claim 1, wherein said object information of different attributes is at least one of text information, speech information, and picture information, including moving pictures; and said pre-set processing unit includes data for displaying a label on a display picture of a display device.

3. An information processing method, comprising:

generating link information indirectly representing at least one of object information and other information;

storing information related to a pre-set processing unit, into which said at least one of object information and other information can be pasted;

regenerating a state of said pre-set processing unit; and acquiring said at least one of object information and other information based on said link information, wherein said storage step stores said pre-set processing unit, in which object information of different attributes can be pasted, in association with time information.

4. The information processing method of claim 3, wherein said object information of different attributes is at least one of text information, speech information, and picture information, including moving pictures; and said pre-set processing unit includes data for displaying a label on a display picture of a display device.

5. An information processing apparatus, comprising:

storage means for storing information related to a pre-set processing unit into which object information can be pasted, wherein said pre-processing unit corresponds to a pre-set label area displayed on a display device, said pre-set label area including less than an entirety of a display area of said display device;

link information generating means for generating link information indirectly representing said object information, wherein said link information generating means (1) generates said link information when said object information is pasted into said pre-set label area, and (2) generates pre-set message information when said object information is pasted into an area other than said pre-set label area;

regenerating means for regenerating a state of said pre-set processing unit; and acquisition means for acquiring said object information based on said link information.

6. The information processing apparatus according to claim 5, further comprising:

link content information generating means for generating content information of said link information for displaying on a display picture of a display device based on a pre-set execution request.

7. The information processing apparatus according to claim 5, wherein said link information is address information of at least one of an internal file path and a network location.

8. The information processing apparatus according to claim 5, wherein said storage means stores said pre-set processing unit, in which object information of different attributes can be pasted, in association with time information.

9. The information processing apparatus according to claim 8, wherein said object information of different attributes is at least one of text information, speech information, and picture information, including moving pictures, and said pre-set processing unit includes data for displaying a label on a display device.

10. An information processing method, comprising:

storing information related to a pre-set processing unit into which object information can be pasted, wherein said pre-processing unit corresponds to a pre-set label area displayed on a display device, said pre-set label area including less than an entirety of a display area of said display device;

generating link information indirectly representing said object information, wherein said generating means further comprises (1) generating said link information when said object information is pasted into said pre-set label area, and (2) generating pre-set message information when said object information is pasted into an area other than said pre-set label area;

regenerating a state of said pre-set processing unit; and acquiring said object information based on said link information.

11. The information processing method according to claim 10, further comprising:

generating content information of said link information for displaying on a display picture of a display device based on a pre-set execution request.

12. The information processing method according to claim 10, wherein said link information is address information of at least one of an internal file path and a network location.

13. The information processing method according to claim 10, wherein said storage step stores said pre-set processing unit, in which object information of different attributes can be pasted, in association with time information.

14. The information processing method according to claim 13, wherein said object information of different attributes is at least one of text information, speech information, and picture information, including moving pictures, and said pre-set processing unit includes data for displaying a label on a display device.

15. A computer readable medium for permitting an information processing apparatus to execute a program comprising the steps of:

storing information related to a pre-set processing unit into which object information can be pasted, wherein said pre-processing unit corresponds to a pre-set label area displayed on a display device, said pre-set label area including less than an entirety of a display area of said display device;

generating link information indirectly representing said object information, wherein said generating means further comprises (1) generating said link information when said object information is pasted into said pre-set label area, and (2) generating pre-set message information when said object information is pasted into an area other than said pre-set label area;

regenerating a state of said pre-set processing unit; and acquiring said object information based on said link information.

16. An information processing apparatus, comprising:

storage means for storing information related to a label into which object information can be pasted, wherein said label corresponds to a pre-set label area displayed on a display device, said pre-set label area including less than an entirety of a display area of said display device;

link information generating means for generating link information representing said object information when said object information is pasted on the pre-set label area displayed on the display device, wherein said link information generating means generates pre-set message information when said object information is associated with an area other than said pre-set label area displayed on said display device;

regenerating means for regenerating a state of the label; and acquisition means for acquiring said object information based on the link information.

* * * * *

UNITED STATES PATENT AND TRADEMARK OFFICE
CERTIFICATE OF CORRECTION

PATENT NO. : 6,816,870 B1
DATED : November 9, 2004
INVENTOR(S) : Takanori Nishimura et al.

It is certified that error appears in the above-identified patent and that said Letters Patent is hereby corrected as shown below:

Column 4,
Line 36, please change "recording and" to -- recording time and --,
Line 51, please move entire "FIG. 59 shows an…" line to next line down to make new paragraph.

Column 5,
Line 12, please change "ala" to -- alarm --,

Column 9,
Line 13, please change "541E" to -- 54E --.

Column 10,
Line 58, please change "off  The" to -- off. The --,
Line 67, please change "programable" to -- programmable --.

Column 21,
Line 31, please change "wt" to -- wm --.

Column 24,
Line 40, please change "link" to -- lirk --.

Column 28,
Line 1, please change "naine" to -- name --,
Line 36, please change "tine" to -- time --.

Column 47,
Line 64, please change "5306" to -- S306 --.

Signed and Sealed this

Tenth Day of May, 2005

JON W. DUDAS
*Director of the United States Patent and Trademark Office*